US012497801B2

(12) United States Patent
Manssourian

(10) Patent No.: US 12,497,801 B2

(45) Date of Patent: Dec. 16, 2025

(54) RETAINER MECHANISM

(71) Applicant: Grigooris Manssourian, Glendale, CA (US)

(72) Inventor: Grigooris Manssourian, Glendale, CA (US)

( * ) Notice: Subject to any disclaimer, the term of this patent is extended or adjusted under 35 U.S.C. 154(b) by 344 days.

(21) Appl. No.: 17/836,097

(22) Filed: Jun. 9, 2022

(65) Prior Publication Data

US 2022/0412135 A1 Dec. 29, 2022

Related U.S. Application Data

(60) Provisional application No. 63/215,485, filed on Jun. 27, 2021.

(51) Int. Cl.

*E05B 15/00* (2006.01)

*B65F 1/16* (2006.01)

(52) U.S. Cl.

CPC ........ *E05B 15/0093* (2013.01); *B65F 1/1615* (2013.01); *B65F 1/1646* (2013.01); *B65F 2210/148* (2013.01); *E05B 15/0046* (2013.01)

(58) Field of Classification Search

CPC .. E05C 19/00; E05B 15/0093; E05B 65/5292; B65F 2210/148; B65F 1/1615; E05F 1/02

See application file for complete search history.

(56) References Cited

U.S. PATENT DOCUMENTS

| | | | | |
|---|---|---|---|---|
| 5,149,153 A * | 9/1992 | Drewry | B65F 1/1615 292/341.15 |
| 5,224,744 A * | 7/1993 | Michelutti | B65F 1/1615 292/234 |
| 5,683,126 A * | 11/1997 | De Vivo | B65F 1/1615 292/210 |
| 9,856,079 B2 | 1/2018 | Manssourian | |
| 10,618,730 B2 | 4/2020 | Manssourian | |
| 10,900,255 B2 * | 1/2021 | Fink | B65F 1/1615 |
| 2010/0102575 A1 * | 4/2010 | Ferkovich | B65F 1/1615 292/259 R |
| 2010/0117379 A1 * | 5/2010 | Mitchell | E05B 85/02 292/201 |
| 2014/0069926 A1 * | 3/2014 | Michael | E05C 19/12 220/326 |
| 2014/0299602 A1 * | 10/2014 | Manssourian | B65F 1/1615 16/349 |
| 2016/0257491 A1 * | 9/2016 | Manssourian | B65F 1/1615 |
| 2017/0320666 A1 * | 11/2017 | Reeb | B65F 1/1615 |
| 2022/0106112 A1 * | 4/2022 | Martin, II | E05B 15/0093 |

FOREIGN PATENT DOCUMENTS

| | | | |
|---|---|---|---|
| AU | 2008200939 A1 * | 9/2008 | |
| FR | 2844257 A1 * | 3/2004 | B65F 1/1615 |
| WO | WO-2005111348 A1 * | 11/2005 | B65F 1/1615 |
| WO | WO-2008135313 A2 * | 11/2008 | B65F 1/1615 |

* cited by examiner

*Primary Examiner* — Kristina R Fulton

*Assistant Examiner* — Emily G. Brown

(74) *Attorney, Agent, or Firm* — Peter Ganjian; Patent Law Agency, LLC

(57) ABSTRACT

A retainer mechanism, comprising a first engagement assembly that is configured to be actively moved to one of a hold or a release state of the first engagement assembly, and a second engagement assembly that is configured to be passively moved to one of a hold or a release state of the second engagement assembly.

50 Claims, 61 Drawing Sheets

436

634

RETAINER MECHANISM

CROSS-REFERENCE TO RELATED APPLICATIONS

This application claims the benefit of priority of U.S. Utility Provisional Patent Application 63/215,485, filed 27 Jun. 2021, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relates to a retainer mechanism and, more particularly, to a retainer mechanism for actively securing a lid of a container and for passively (and automatically) self-releasing the lid to fully open when and as a result of the container appropriately tilted to a particular orientation for unhindered, unobstructed emptying of the container.

Description of Related Art

Conventional retainer mechanisms that passively (and automatically) self-release when and as a result of the appropriately tilting to a particular orientation are well known and have been in use for a number of years. Non-limiting examples of such conventional retainer mechanisms are disclosed in both U.S. Pat. No. 9,856,079 to Manssourian and U.S. Pat. No. 10,618,730 to Manssourian, the entire disclosures of both of which are expressly incorporated by reference in their entirety herein.

Regrettably, the conventional retainer mechanisms include a lever assembly with an elongated lever that may be easily manipulated by animals or humans to be moved from a hold position to a release position to thereby provide unwanted access to a bin, and further very much prone to breakage.

Additionally, the full exposure of the elongated lever of the conventional retainer mechanisms to environmental elements (snow, ice, etc.) tends to degrade its operations. For example, snow or icy conditions tend to freeze the movement of the elongated lever and hinder proper operations of the conventional retainer mechanisms.

A further drawback to conventional retainer mechanisms is that when the container falls backwards or sideways, the retainer mechanism moves to a release position as a result of "jolt" of hitting the ground.

Accordingly, in light of the current state of the art and the drawbacks to current retainers mentioned above, a need exists for a retainer mechanism that would prevent unwanted opening of the lid whether intentional or accidental while passively (and automatically) self-releasing the lid to fully open when and as a result of the retainer mechanism is appropriately tilted to a first orientation for unhindered, unobstructed emptying of the container.

BRIEF SUMMARY OF THE INVENTION

A non-limiting, exemplary aspect of an embodiment of the present invention provides a retainer mechanism, comprising:

a first engagement assembly that is configured to be actively moved to one of a hold or a release state of the first engagement assembly; and a second engagement assembly that is configured to be passively moved to one of a hold or a release state of the second engagement assembly.

Another non-limiting, exemplary aspect of an embodiment of the present invention provides a retainer mechanism, comprising:

an adjusting member;

a first engagement assembly that is configured to be actively moved to one of a hold or a release position to hold or release the adjusting member; and the second engagement assembly is configured to be passively moved to one of a hold or a release position to hold or release the adjusting member.

Another non-limiting, exemplary aspect of an embodiment of the present invention provides a retainer mechanism, comprising:

a retainer member having:

a first engagement assembly is configured to be actively moved to one of a hold or a release position to hold or release an adjusting member; and a second engagement assembly that is configured to be passively moved to one of a hold or a release position to hold or release the adjusting member.

Another non-limiting, exemplary aspect of an embodiment of the present invention provides a retainer mechanism, comprising:

a retainer member; and an adjusting member associated with the retainer member;

the retainer member accommodates a first engagement assembly and a second engagement assembly;

the first engagement assembly is configured to be actively moved to one of a hold or a release position to hold or release the adjusting member; and the second engagement assembly is configured to be passively moved to one of a hold or a release position to hold or release the adjusting member.

Another non-limiting, exemplary aspect of an embodiment of the present invention provides a retainer mechanism, comprising:

a retainer member having:

an external engagement assembly that is actively moved to one of a hold or release states to a hold or release an adjusting member;

an internal engagement assembly that is passively moved to a release state to release the adjusting member when the retainer member is moved to a first orientation, independent of the status of the states of the external engagement assembly.

Another non-limiting, exemplary aspect of an embodiment of the present invention provides a retainer mechanism, comprising:

an external engagement assembly that is actively moved to one of a hold or a release position to a hold or release an adjusting member;

the external engagement assembly is securely locked by an external lock mechanism in the hold position to hold the adjusting member; and an internal engagement assembly that is passively moved to a release position to release the adjusting member when the retainer member is tilted to a first orientation, independent of a lock status of the external engagement assembly.

Another non-limiting, exemplary aspect of an embodiment of the present invention provides a retainer mechanism, comprising:

a retainer member; and an adjusting member associated with the retainer member;

the retainer member includes:

an external engagement assembly that is actively moved to one of a hold or release positions to hold or release the adjusting member;

an internal engagement assembly that is passively moved to one of a hold or release positions to hold or release the adjusting member, independent of the external engagement assembly;

wherein:

the retainer member passively releases the adjusting member when the retainer member is tilted to a first orientation, independent of the external engagement assembly.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 5G-1 to 5I-2 are non-limiting, exemplary illustration of the retainer member shown in FIGS. 1A to 5F-2 and their respective sectional views in accordance with one or more embodiments of the present invention;

DETAILED DESCRIPTION OF THE INVENTION

Figure 1A:
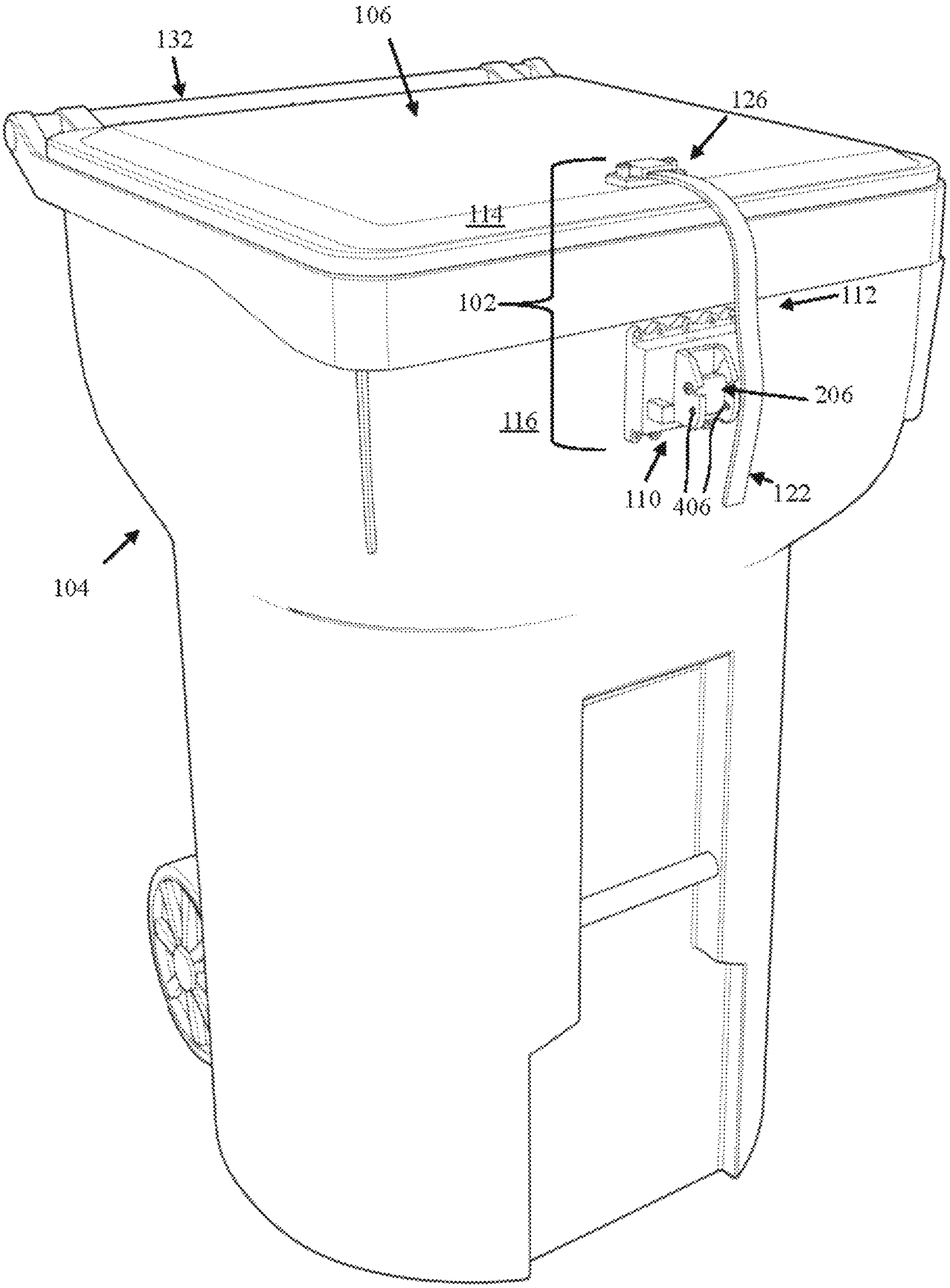
FIGS. 1A to 1M are non-limiting, exemplary illustrations of a retainer mechanism, progressively showing securing and eventual release of a lid of a trash bin in accordance with one or more embodiments of the present invention.
Figure 1B:
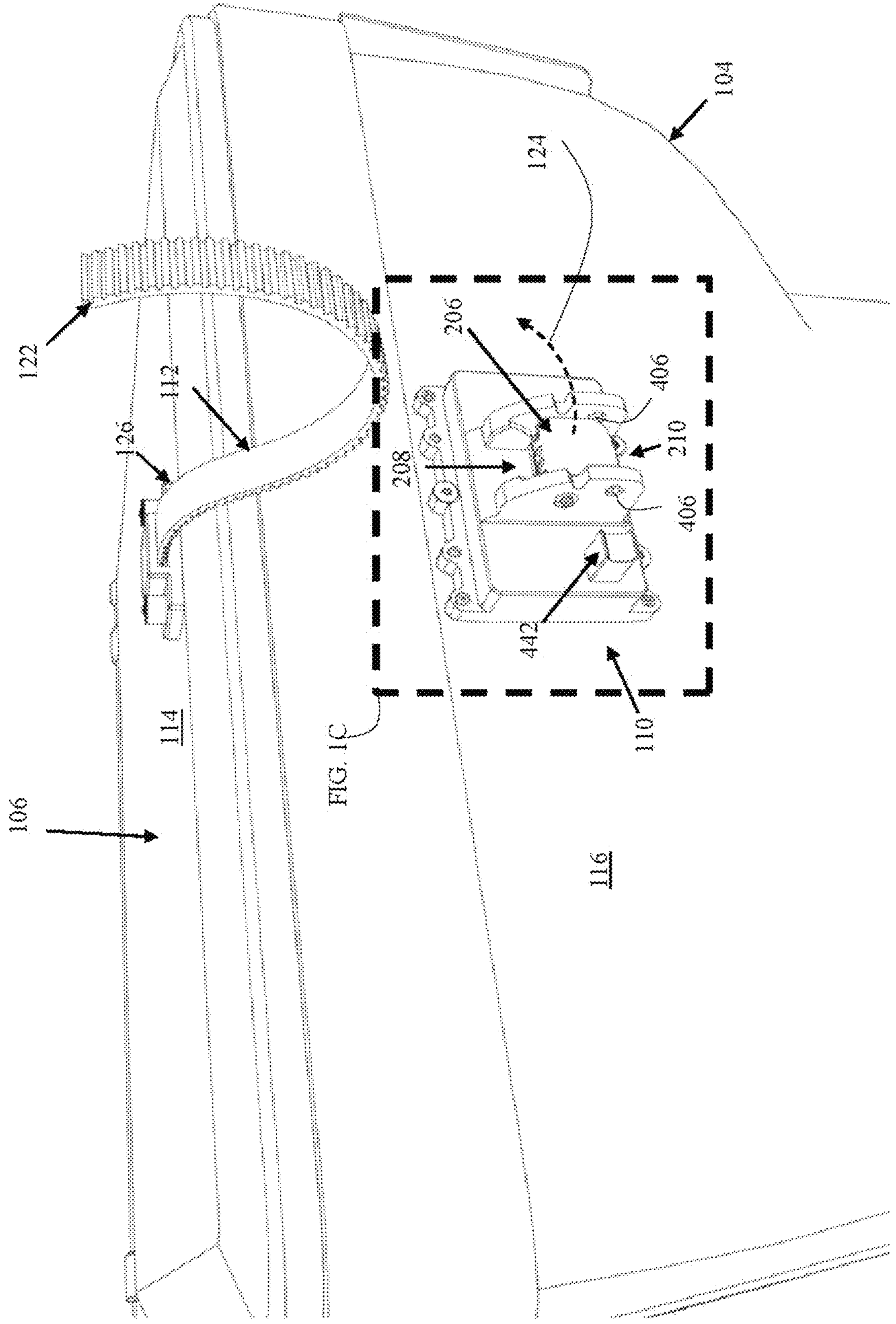

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

Unless otherwise noted and distinguished specifically, throughout the disclosure, the use of specific terms such as a bin, trash bin, container, receptacle, can, trashcan (residential or commercial), etc. are considered as synonymous and interchangeable and hence, should be construed as equivalent. The applicant has elected to use these synonymous terms merely for an easier read of the specification and claims.

One or more embodiments of the present invention may use the phrase form factor as the physical size and or shape of various members of the one or more embodiments of the present invention.

One or more embodiments of the present invention may use the term "lock", which depending on the context, may be interpreted as conventional "lock-and-key" mechanism or, alternatively as a mere "latch" type interlock mechanism.

One or more embodiments of the present invention provides a device for actively securing or tightly holding down a lid of a bin even if the bin is overfilled (for compacting the content) and for passively (and automatically) self-releasing the lid to fully open when and as a result of the device appropriately tilted to a particular orientation (e.g., first orientation) for unhindered, unobstructed emptying of the bin.

One or more embodiments of the present invention may be used to compact content of an overfilled bin, securing content of the bin even if the lid of the bin is not fully closed due to bin overfill. It should be apparent to those skilled in the art that obviously the container may be actively opened so long as the retainer mechanism is not locked by a lock-and-key mechanism.

Further, one or more embodiments of the present invention provide a device that prevents unwanted opening of the lid whether intentional or accidental while passively (and automatically) self-releasing the lid to fully open when and as a result of the retainer mechanism is appropriately tilted to a first orientation for unhindered, unobstructed emptying of the container.

In general, the disclosed embodiments of the present invention are lightweight, and easily install on most containers without requiring any special equipment. Disclosed embodiments of the present invention are comprised of mechanism with minimal parts and simple movements, easily usable by most.

One or more embodiments of the present invention or parts thereof may be retrofitted with any existing container or be manufactured as part of container itself. For example, a mounting support (detailed below) may be molded with the bin (or adapted to be integral with the bin), with a lever and other components affixed or mounted onto the mounting support.

FIGS. 1A to 1M are non-limiting, exemplary illustrations of a retainer mechanism, progressively showing securing and eventual release of a lid of a trash bin in accordance with one or more embodiments of the present invention.

A retainer mechanism 102 of an embodiment of the present invention is comprised of a retainer member 110 illustrated as associated with a front side 116 of a bin 104, and a distal end 126 of an adjusting member 112 associated with a front side 114 of lid 106 of bin 104. Lid 106 is hinged 132 at one side of an opening 150 of bin 104 forming a hinged lid 106, with adjusting member 112 associated with free, open front side 114 (the "closing side") of lid 106. The manner of securing or mounting adjusting mechanism 112 to lid 106 is well known and conventional.

Lid 106 may easily be secured and tightly held down in relation to bin 104 when adjusting member 112 is associated with retainer member 110. That is, in this non-limiting, exemplary embodiment, even if bin 104 is overfilled with content, lid 106 may still be easily secured and tightly held down in relation to bin 104 by associating adjusting member 112 with retainer member 110 (which would in fact, aid in further compacting content of bin 104). Accordingly, retainer member 110 holds and securely maintains adjusting member 112 at a fixed position along a length of adjusting member 112, which, in turn, holds and securely maintains lid 106 in relation to bin 104.

The adjustable features or aspects of adjusting member 112 in relation to retainer member 110 enables retainer mechanism 102 to maintain the hold position of lid 106 even if bin 104 is overfilled. In other words, retainer member 110 holds and securely maintains adjusting member 112 at a fixed position along a length of adjusting member 112, which, in turn, holds and securely maintains lid 106 in relation to an opening of the overfilled bin 104, further compacting and securing content of bin 104 as the adjusting member 112 is secured in relation to retainer member 110.

It should be noted that adjusting member 112 may comprise of any flexible material, non-limiting examples of which may include a strap or the like that may comprise of materials or combination of materials such as polyester, polyurethane, leather, rubber, plastic, nylon, polyethylene, polypropylene, Acrylonitrile butadiene styrene (ABS), Polyvinyl chloride (PVC), Polyethylene terephthalate (PET), Polyoxymethylene (POM), also known as ACETAL, Polycarbonate, Polystyrene, thermoplastic elastomers, etc. and optionally any of the above such materials may be strengthened by embedded or woven steel or fiber strands in a well known conventional manner. Less preferably, adjusting member 112 may comprise of webbing strap or other existing flexible strap with sufficient strength.

In general, retainer member 110 is comprised of substantially rounded smooth edges, and its dimensions may be varied. Material used for retainer member 110 may be comprised of any metallic material, plastic or others so long as the material has substantial structural integrity in terms of strength, durability, etc. so that retainer member 110 can withstand holding forces when adjusting member 112 is pulled through retainer member 110 to tightly hold lid 106 in relation to bin 104. It should be noted the parts or components constituting retainer member 110 may each comprise of different material so long as they exhibit minimal flexure.

Figure 1C:
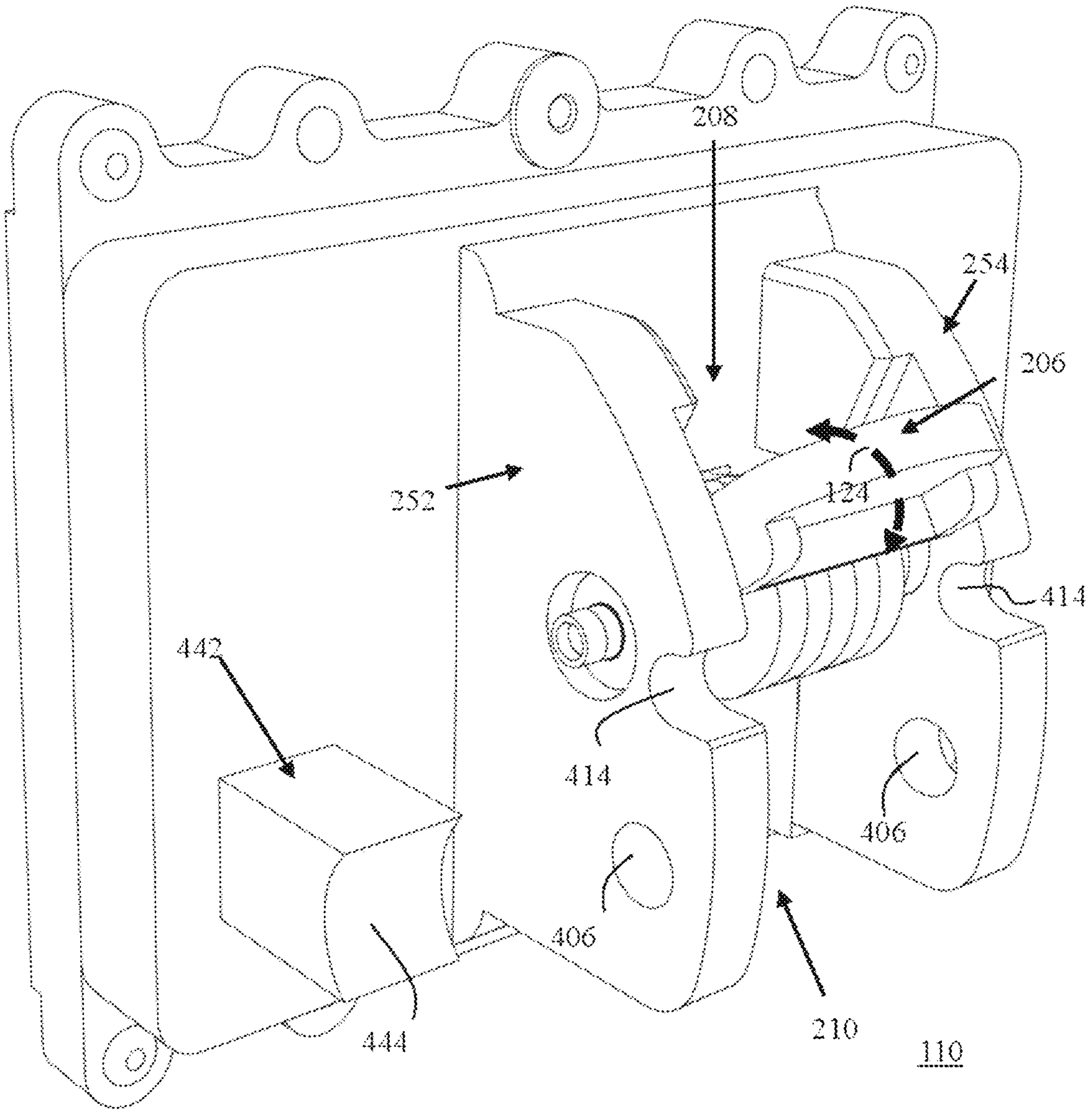
Figure 1D:
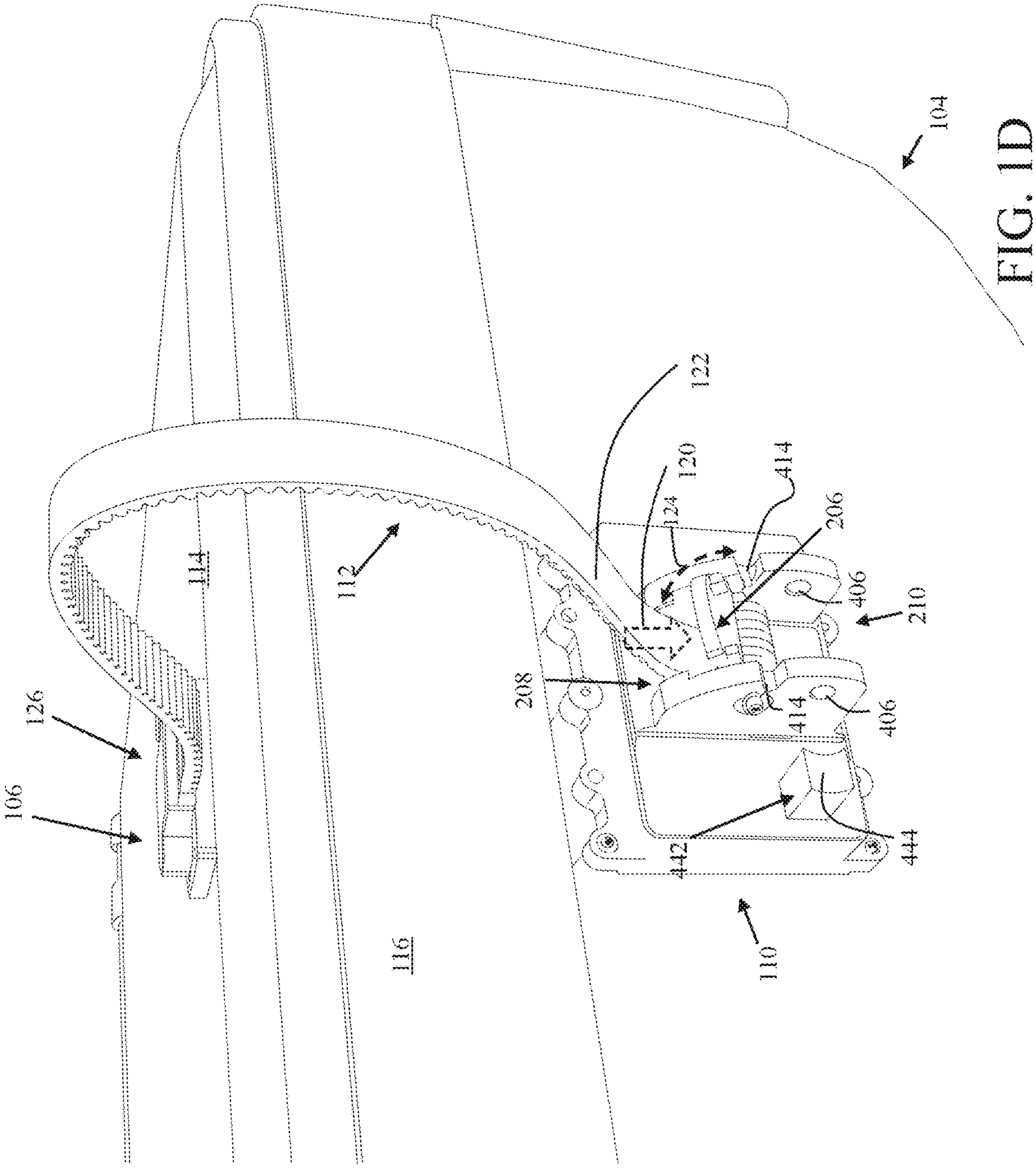
Figure 1E:
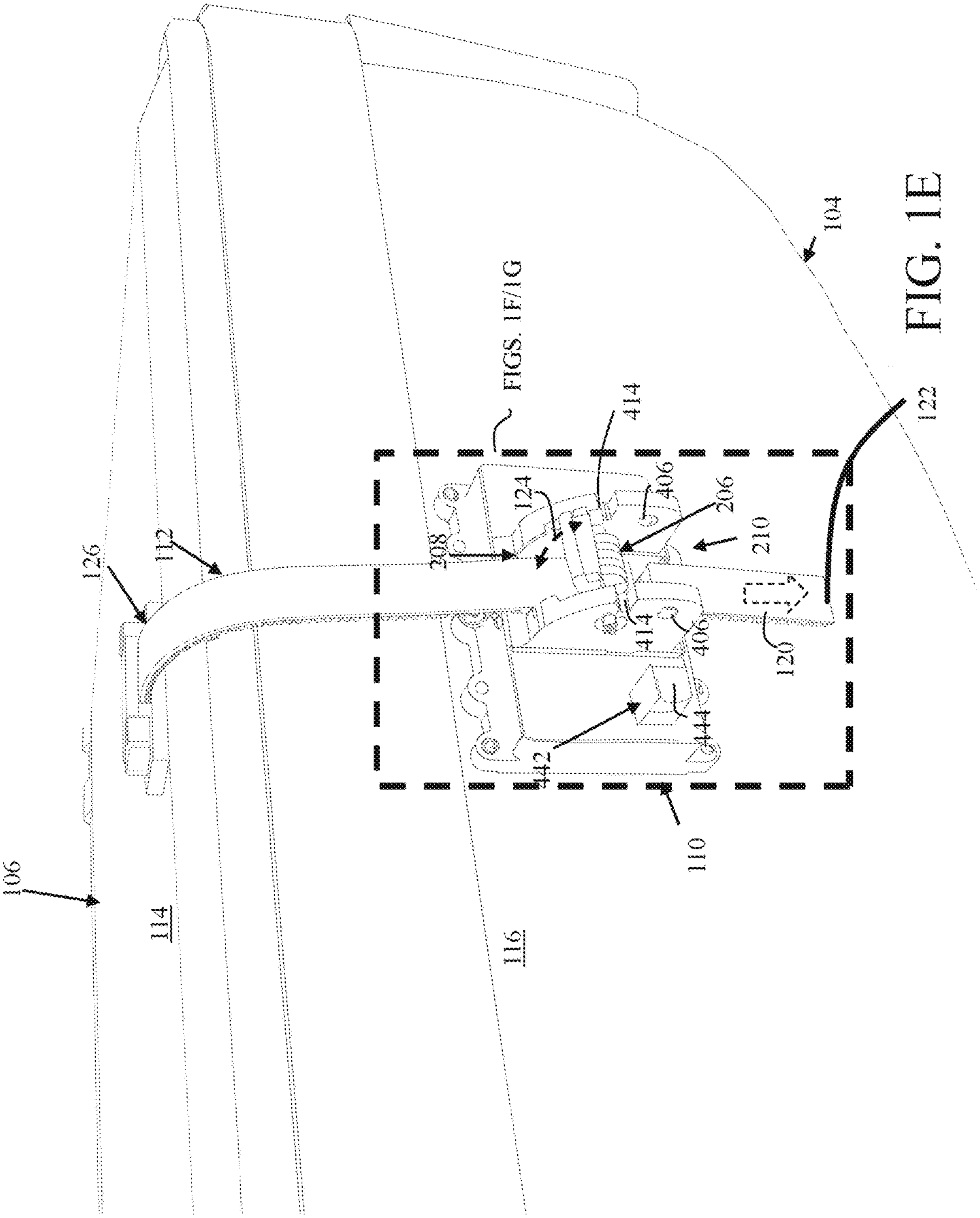
Figure 1F:
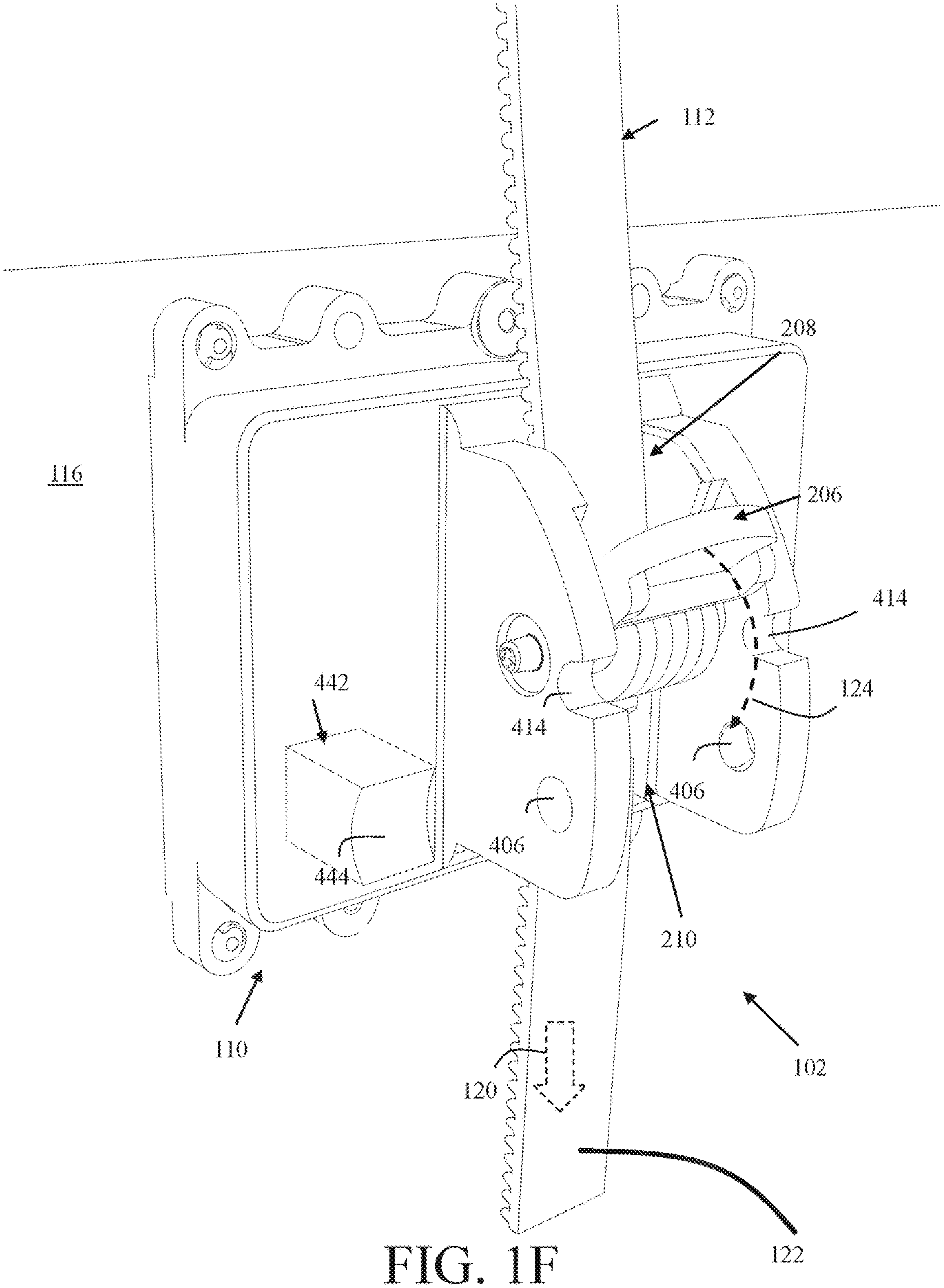
Figure 1G:
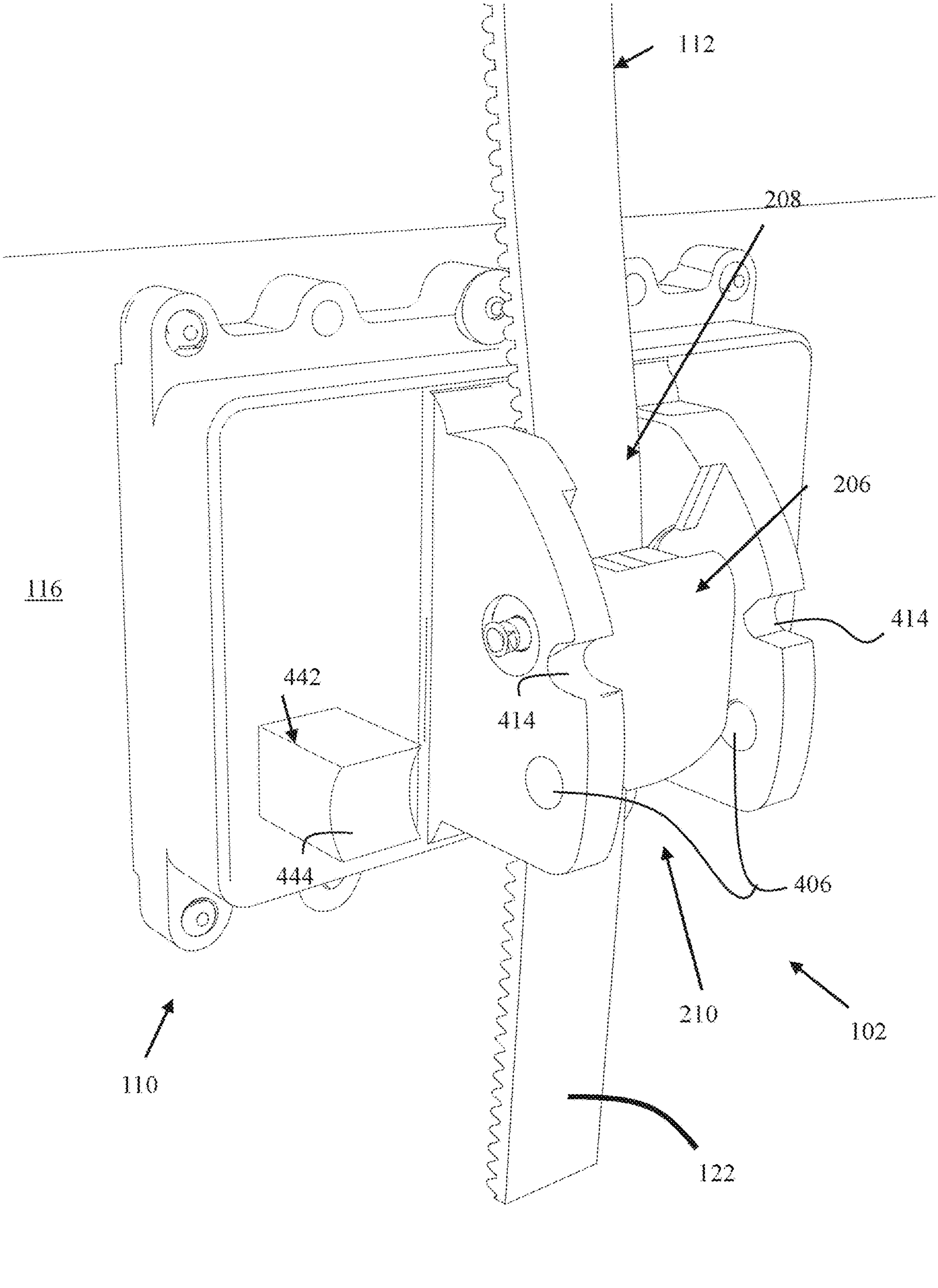
Figure 1H:
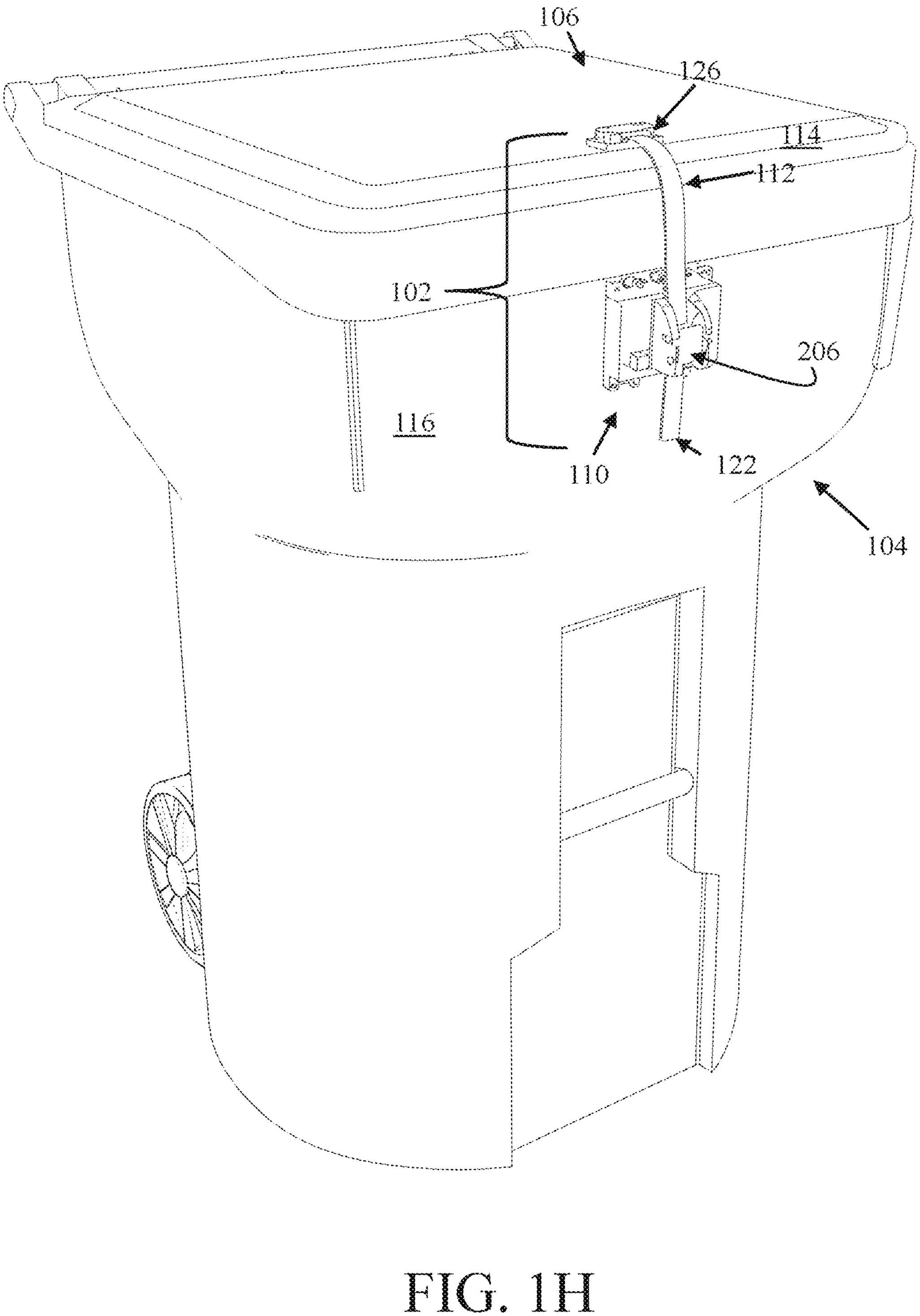
Figure 1I:
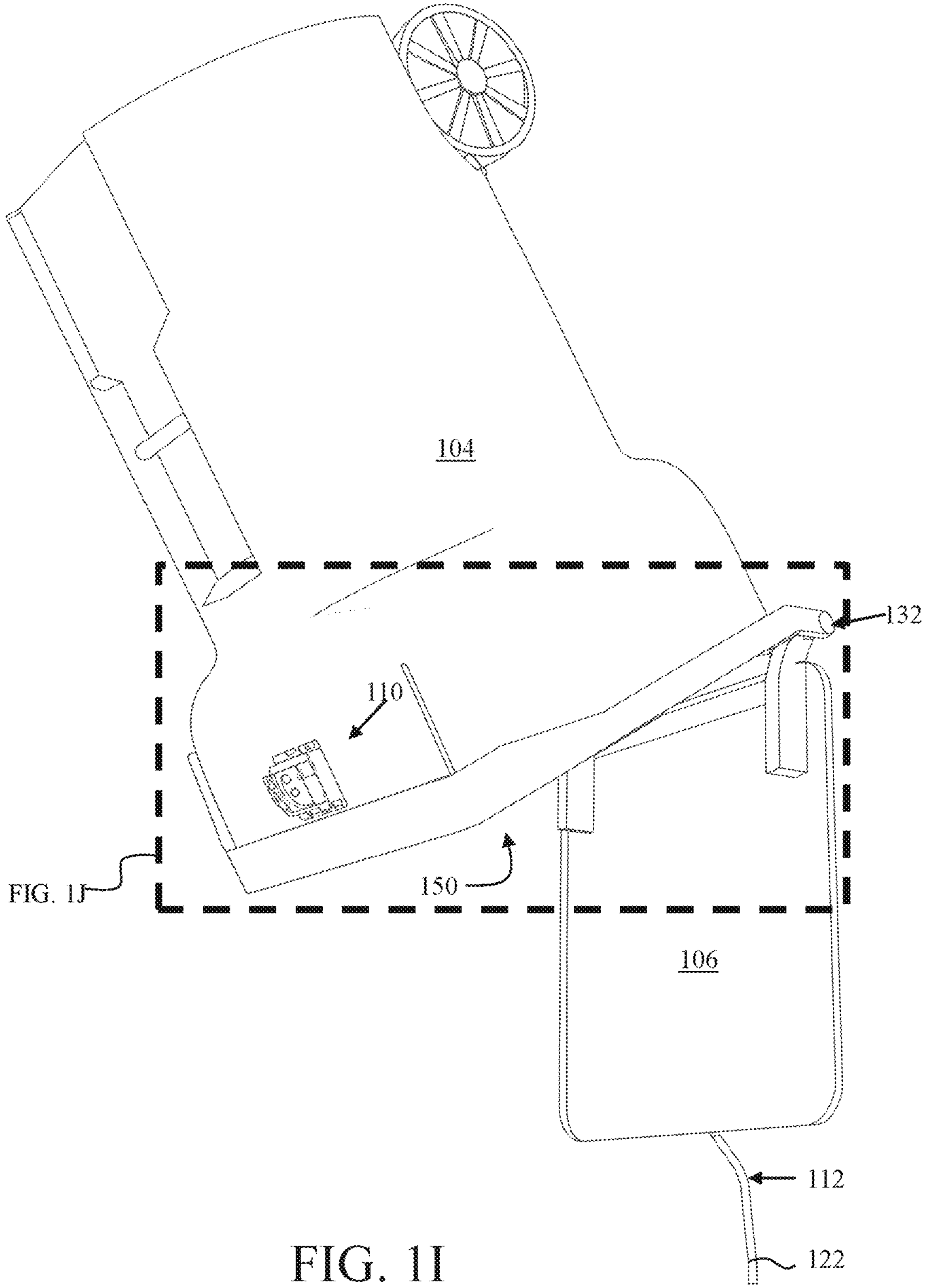
Figure 1J:
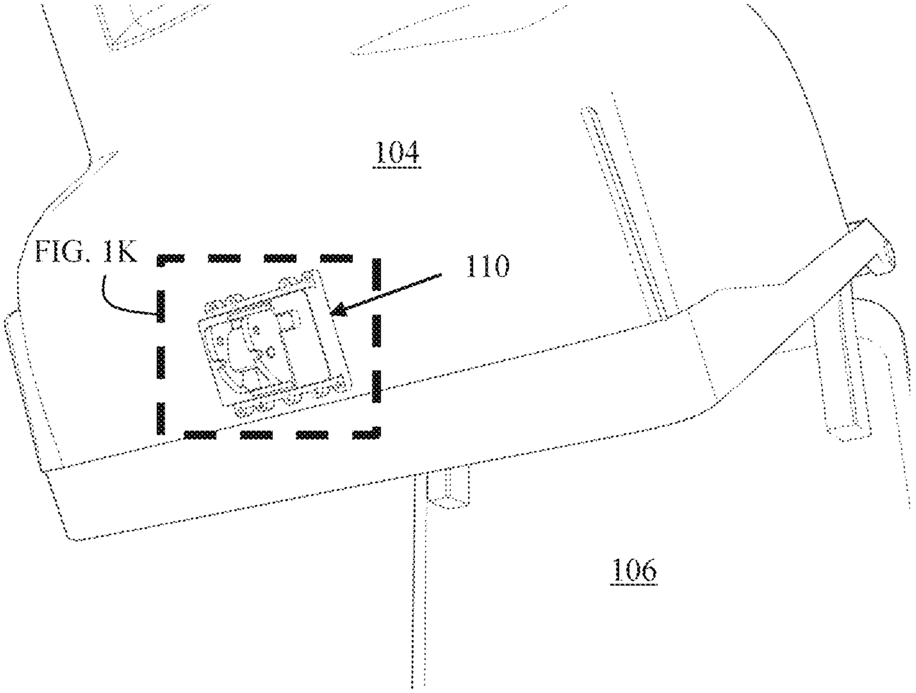
Figure 1K:
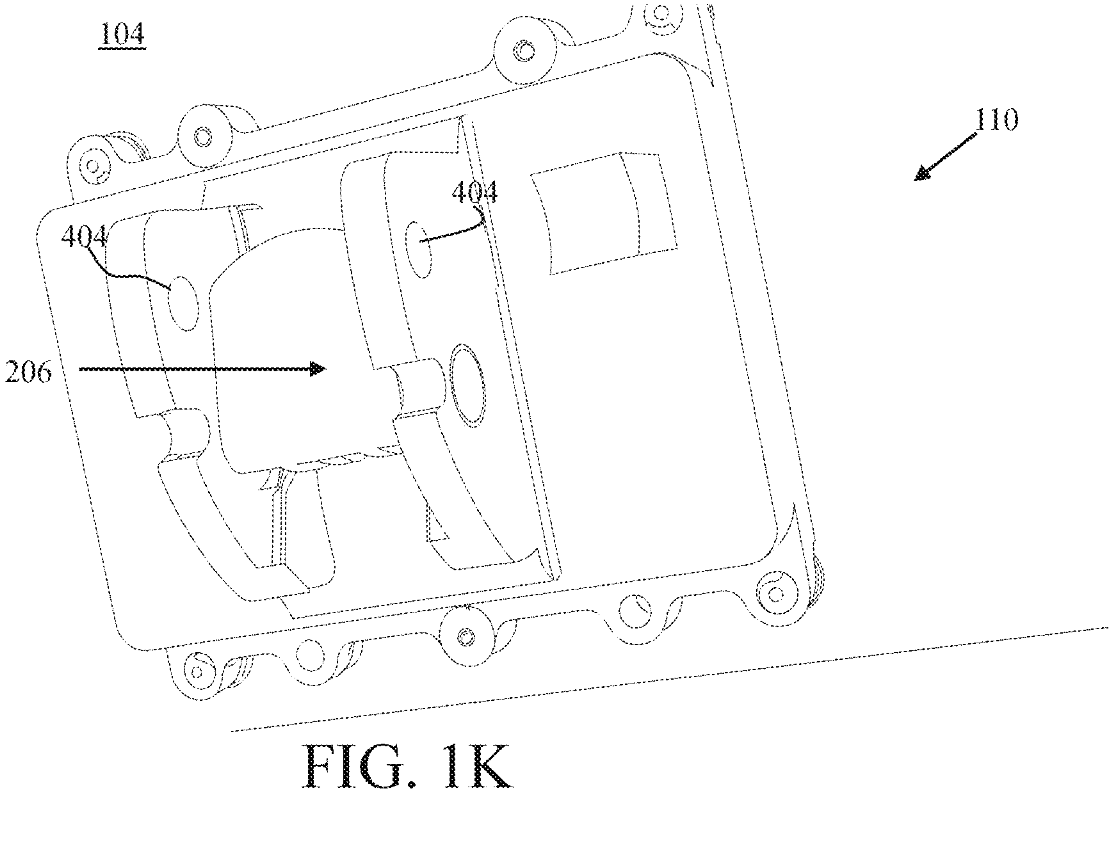

Retainer member 110 passively releases adjusting member 112 when retainer member 110 is tilted to a first orientation (or direction) only (as shown in FIGS. 11 to 1K), which, in turn, frees lid 106 to open.

If bin 104 is not tilted to the first orientation, retainer member 110 maintains its engagement or "grip" with adjusting member 112, securely holding and maintaining adjusting member 112 at a fixed or hold position to maintain lid 106 in a closed or hold position. When bin 104 is at an orientation other than the first orientation (i.e., bin 104 is not at the first orientation), then it is either at a second orientation, which is the rest vertical position as shown in FIG. 1A, or has fallen or tilted backward, sideways, forward, etc.

Adjusting member 112 is passed through retainer member 110, which maintains adjusting member 112 at a desired position (e.g., length, tightness, etc.). When bin 104 is picked up and tilted to the first orientation to be emptied, a second (or internal) engagement assembly 416 of retainer member 110 passively moves to a release position or state, and allows the release of adjusting member 112 to allow lid 106 to "fling" open, even if a first (external) engagement assembly 206 of retainer mechanism 102 is locked in hold position or state.

In other words, retainer member 110 includes an internal engagement assembly 416, which is passively moved (due to gravity) to a release position when retainer member 110 is tilted to a first orientation to passively release adjusting member 112. Accordingly, and as further detailed below, retainer member 110 includes a first or external engagement assembly 206 that is actively moved to one of hold or release positions or states to hold or release adjusting member 112, and further includes a second or internal engagement assembly 416 that is passively moved to a release position or state to release adjusting member 112 when retainer member 110 is tilted to a first orientation (FIGS. 1I to 1K). If bin 104 is tilted to any other orientation, retainer member 110 will not passively release adjusting member 112, which will maintain lid 106 in a hold position, securely keeping content inside bin 104.

Retainer mechanism 102 may be used to actively secure or tightly hold down lid 106 of bin 104 and for passively (and automatically) self-release lid 106 to fully open when and as a result of retainer mechanism 102 appropriately tilting to a particular orientation (first orientation) for unhindered, unobstructed emptying of bin 104 of its content.

External engagement assembly 206 of retainer member 110 of retainer mechanism 102 may be first moved along a reciprocating path 124 to a disengagement or release position or state, with a free end 122 of adjusting member 112 maneuvered in the direction illustrated by arrow 120 through an insertion side 208 and out extraction side 210 of retainer member 110. Free end 122 of adjusting member 112 out from the extraction side 210 may be pulled on further to further tighten the hold position of lid 106 in relation to bin 104. It should be noted that obviously, "extraction" does not mean "to pull free and separate."

Accordingly, retainer member 110 of retainer mechanism 102 has insertion side 208 that receives free end 122 of adjusting member 112 in the direction of the indicated arrow 120, and extraction side 210 from which adjusting member 112 is pulled in the direction of arrow 120, and extracted or pulled out to tighten the hold position of lid 106 of bin 104. In general, adjusting member 112 is maneuvered at insertion side 208 and inserted to pass underneath first engagement assembly 206, while first or external engagement assembly 206 is in the disengaged or release position, and exit out extraction side 210.

It should be noted that external engagement assembly 206 may move along reciprocating path 124 to the illustrated disengagement or release position by users or moved to engagement or hold position by users. The external engagement assembly will not move freely once engaged with adjusting member 112. As further detailed below, external engagement assembly 206 need not move to the disengagement or release position to allow adjusting mechanism 112 to be released, even if retainer mechanism 102 is tilted to the appropriate first orientation.

Depending on the degree of tightness desired, pulling onto free end 122 of adjusting member 112 from extraction side 210 of retainer member 110 would lower (pull in) lid 106 to a further closed position and if bin 104 is overfilled with content, lid 106 would simply compact the content.

As further illustrated, once adjusting member 112 is pulled to a desired degree of tightness out from extraction side 210 of retainer member 110, external engagement assembly 206 is simply moved along the reciprocating path 124 to an engagement or hold position or state as illustrated, retaining and holding adjusting member 112 at the desired tightness.

As further detailed below, the position or the state of external engagement assembly 206 is no longer relevant when bin 104 is forward tilted and substantially upside down to empty out content in normal operation (i.e., first orientation). External engagement assembly 206 will remain at the hold position or state (as shown in FIGS. 1I, 1J, 1K, 1L, and 1M) once engaged with adjusting member 112.

The release of the adjusting member 112 to free lid 106 to move to a fully open position is dependent on a second (or an internal) engagement assembly 416, which passively (and automatically) self-releases to a disengagement or release position or state, disengaging retainer member 110 engagement from adjusting member 112 to free lid 106 to a fully open position as shown.

The motion of lid 106 to open position pulls out free end 122 of adjusting member 112 from insertion side 208 of retainer member 110, completely disengaging adjusting member 112 from retainer member 110, which allows for unhindered, unobstructed emptying of bin 104 of its content.

Figure 1L:
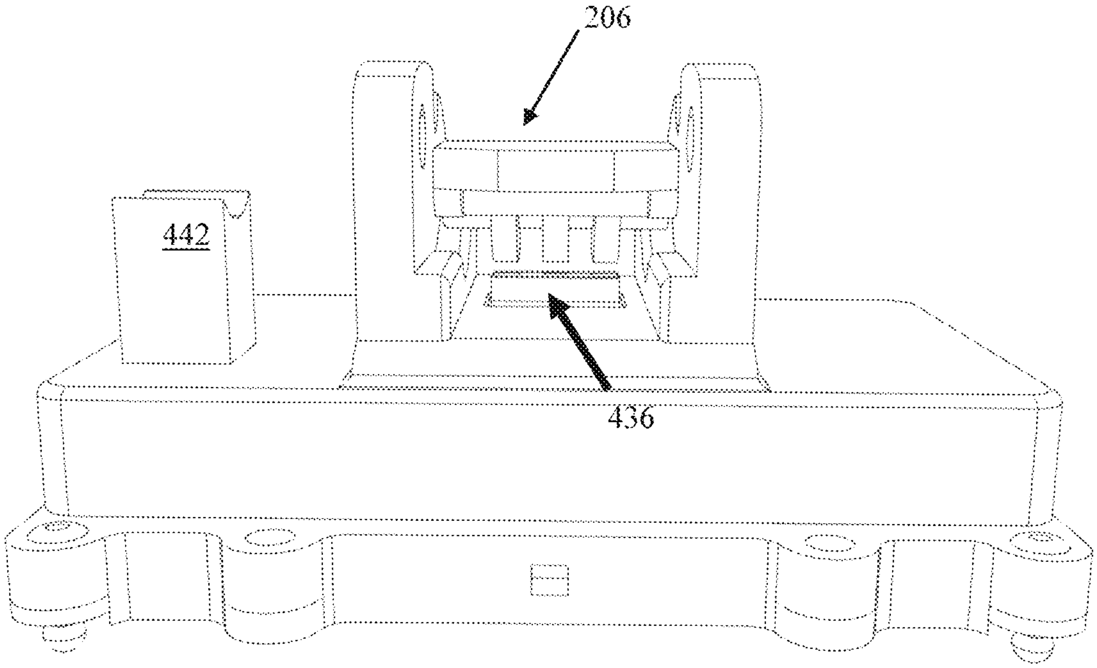
Figure 1M:
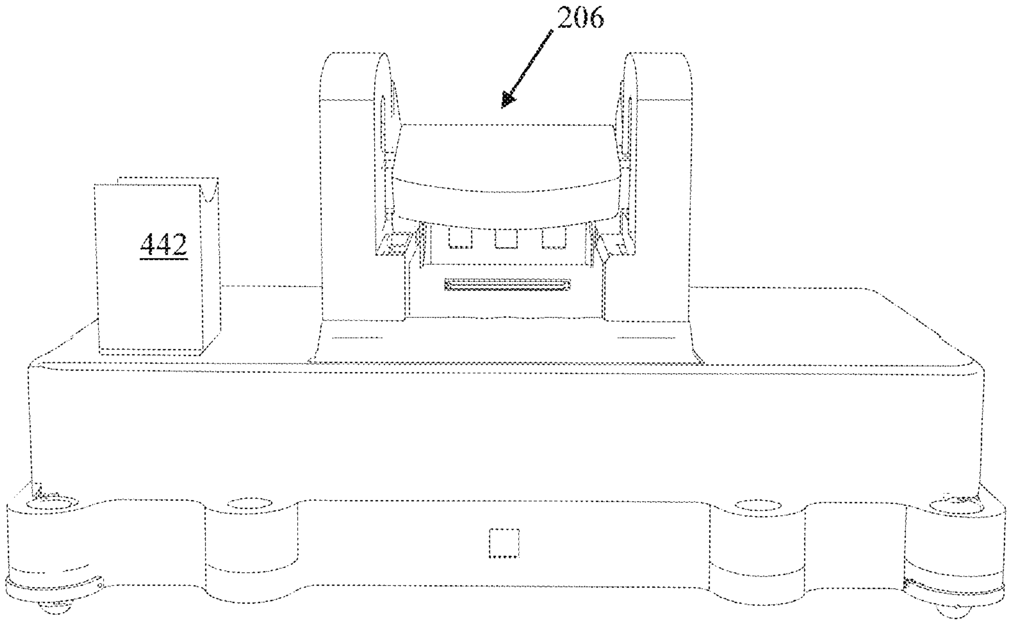

As best shown in FIGS. 1L and 1M and further detailed below, external engagement assembly 206 may passively remain at the hold position or even locked in that hold state (FIGS. 2A to 3M), while an internal engagement member 436 of second (or internal) engagement assembly 416 is passively moved from hold state (FIG. 1M) to a release position (FIG. 1M). Accordingly, FIG. 1L illustrates both external engagement assembly 206 and internal engagement assembly 416 in a hold state while FIG. 1M illustrates external engagement assembly 206 in hold state but internal engagement assembly 416 in release state. In other words, when bin 104 is forward tilted and substantially upside down to empty out content in normal operation (the first orientation), internal engagement assembly 416 is passively moved to release position (as shown in FIG. 1M), regardless of the position or state of the external engagement assembly 206.

FIGS. 2A to 2E are non-limiting, exemplary illustrations of the retainer mechanism shown in FIGS. 1A to 1K, showing release of a lid of a trash bin even when the lid is optionally locked with a first lock mechanism in accordance with one or more embodiments of the present invention.

As illustrated in FIGS. 2A to 2E, external engagement assembly 206 may optionally be securely locked in its hold state by a lock mechanism 404. Locking of external engagement assembly 206 would prevent unwanted movement of external engagement assembly 206 from its hold position to a release position to thereby block unwanted access to bin 104. In other words, lock mechanism 404 when in the lock state locks and prevents movement of first engagement assembly 206 from the hold position to the release position, while second engagement assembly 416 independent of the first engagement assembly 206 passively moves from the hold position to the release position to release the adjusting mechanism without first engagement assembly 206 being unlocked when and as a result of retainer mechanism 110 appropriately tilted to a particular orientation (first orientation). The lock mechanism 404 may be a pad lock, push lock, or the like.

As shown, shackle 402 of lock mechanism 404 blocks the movement of the external engagement assembly 206 from its hold position or state. As detailed below, retainer member 110 is provided with a pair of aligned lock opening 406 through which shackle 402 of lock mechanism 404 is inserted, with shackle 402 covering over a free edge 408 of an external engagement lever 410 (FIG. 2B) of external engagement assembly 206.

Figure 2A:
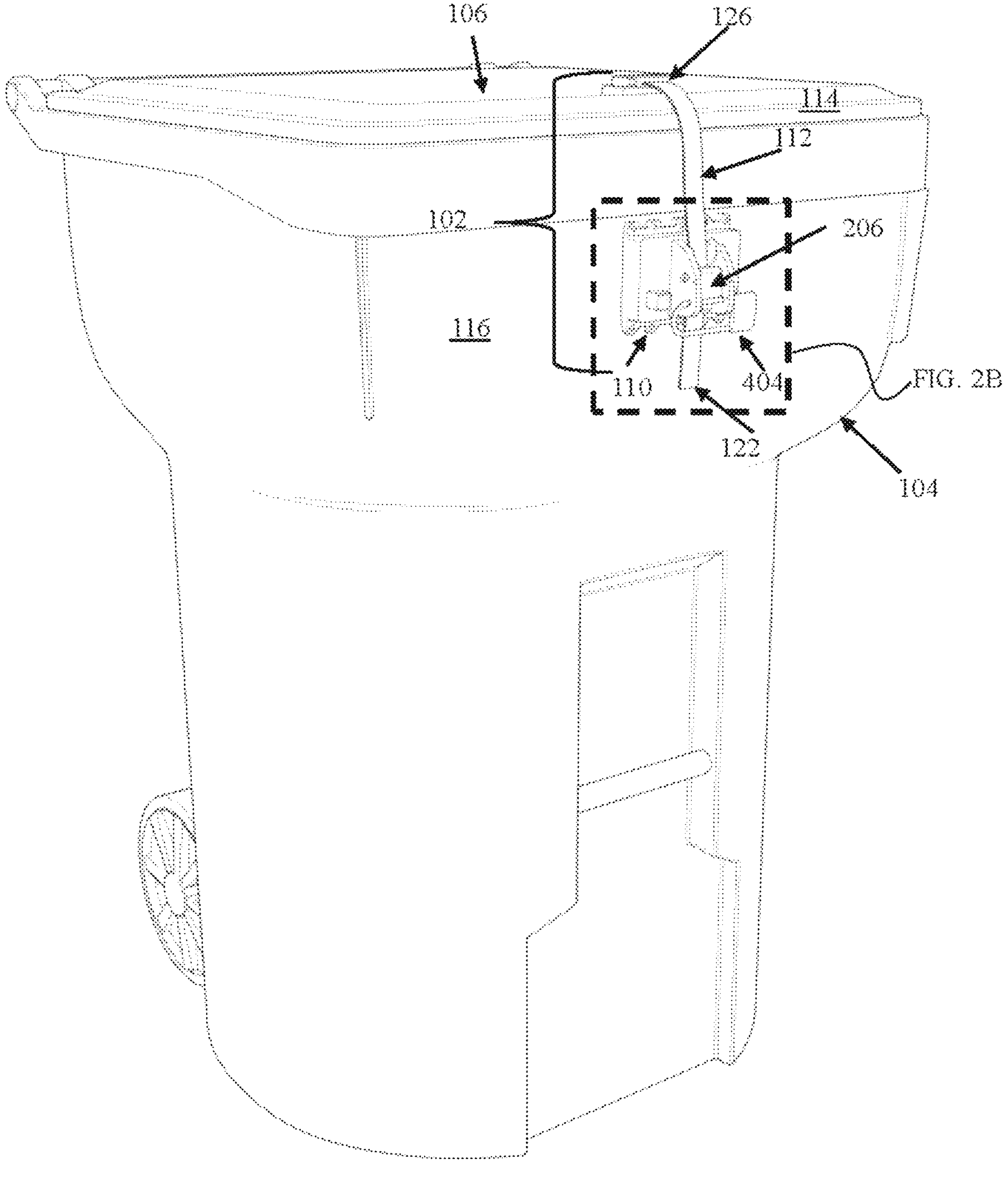
FIGS. 2A to 2E are non-limiting, exemplary illustrations of the retainer mechanism shown in FIGS. 1A to 1M, showing release of a lid of a trash bin even when the lid is optionally locked with a first lock mechanism in accordance with one or more embodiments of the present invention.
Figure 2B:
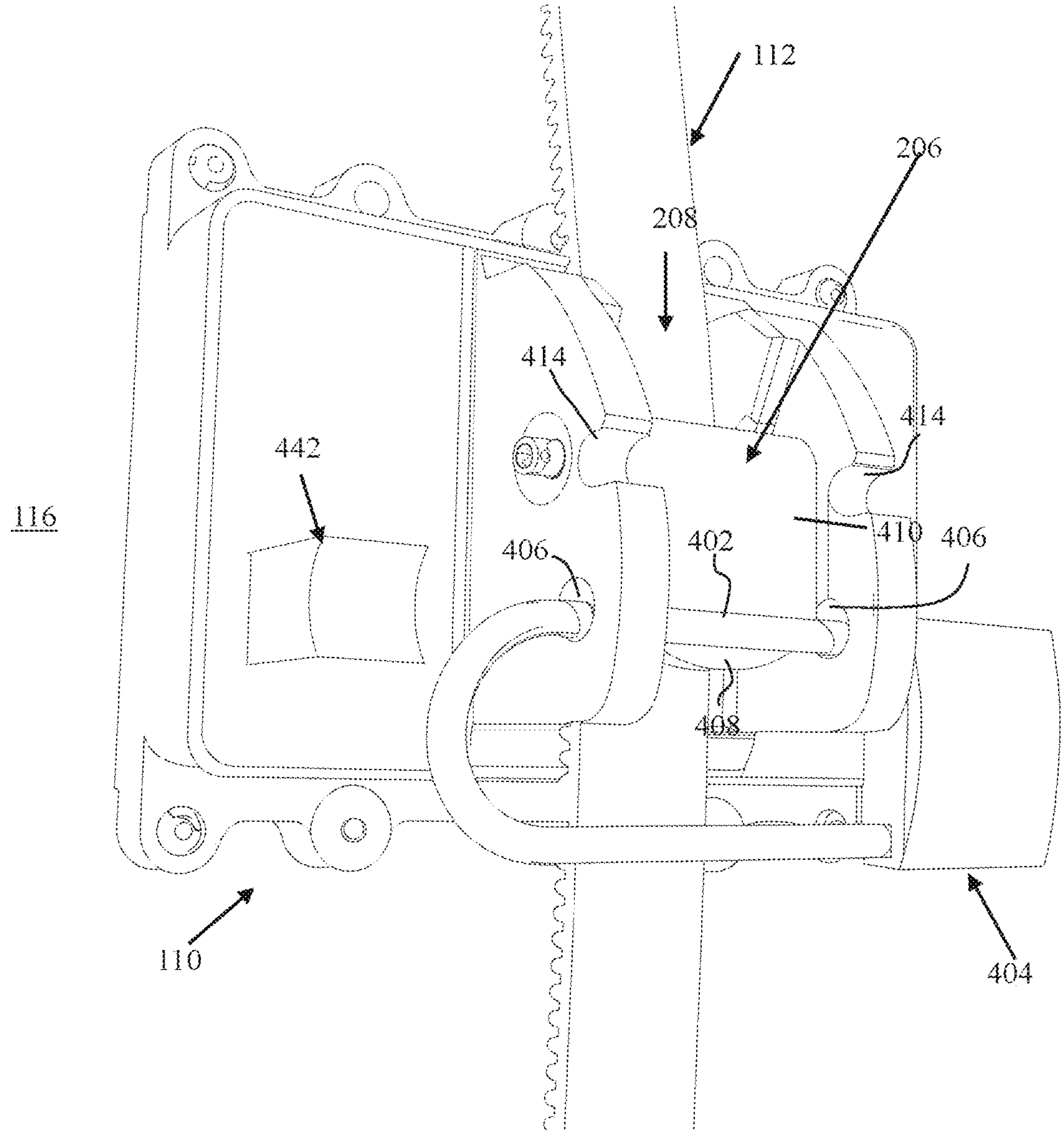
Figure 2C:
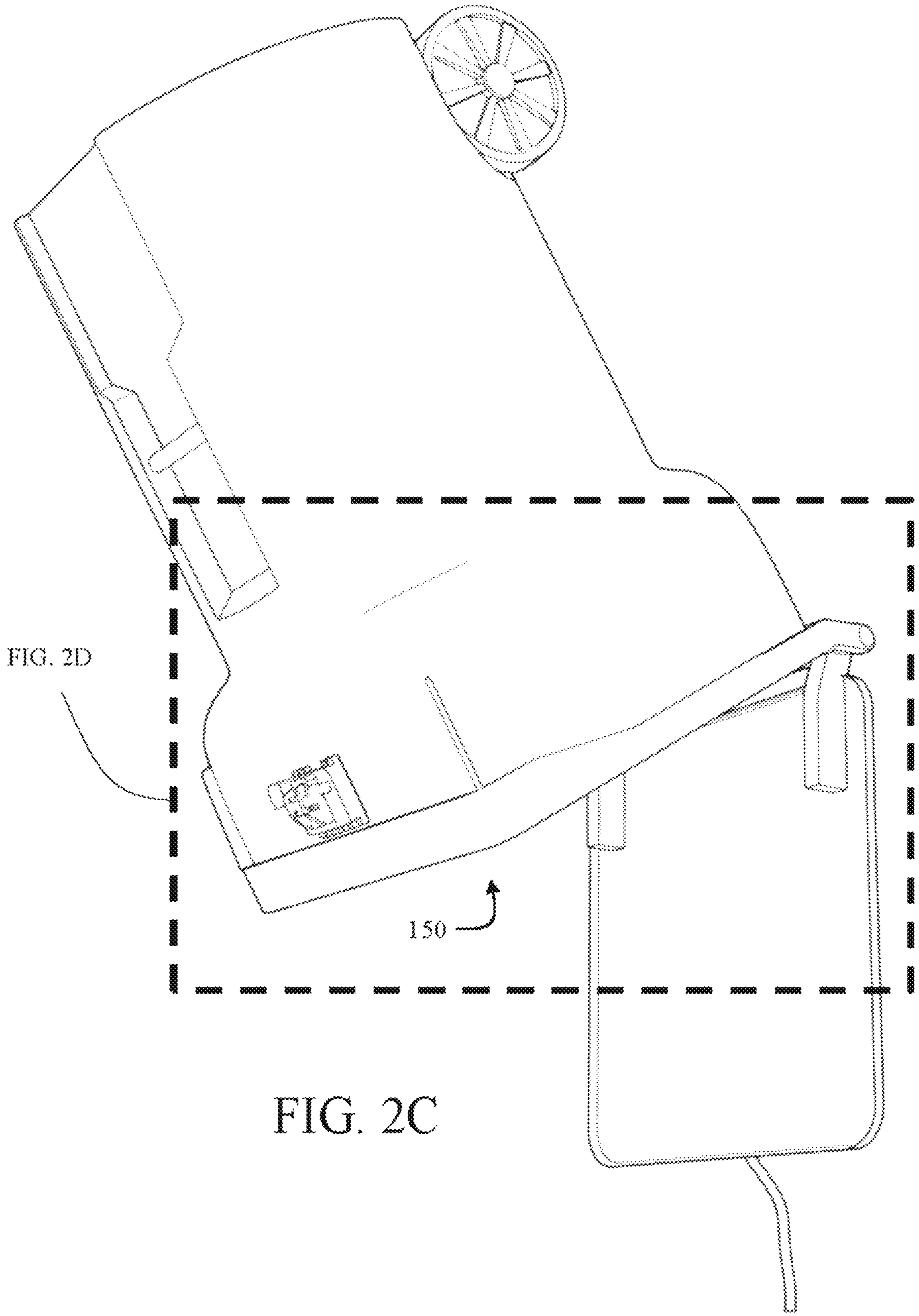
Figure 2D:
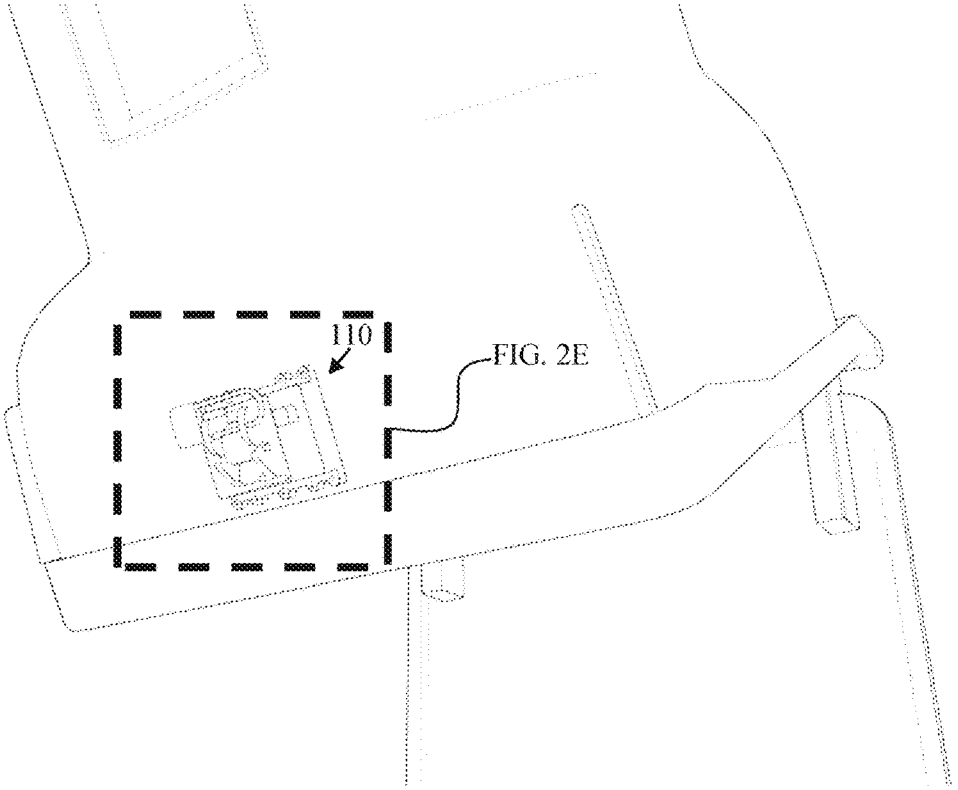
Figure 2E:
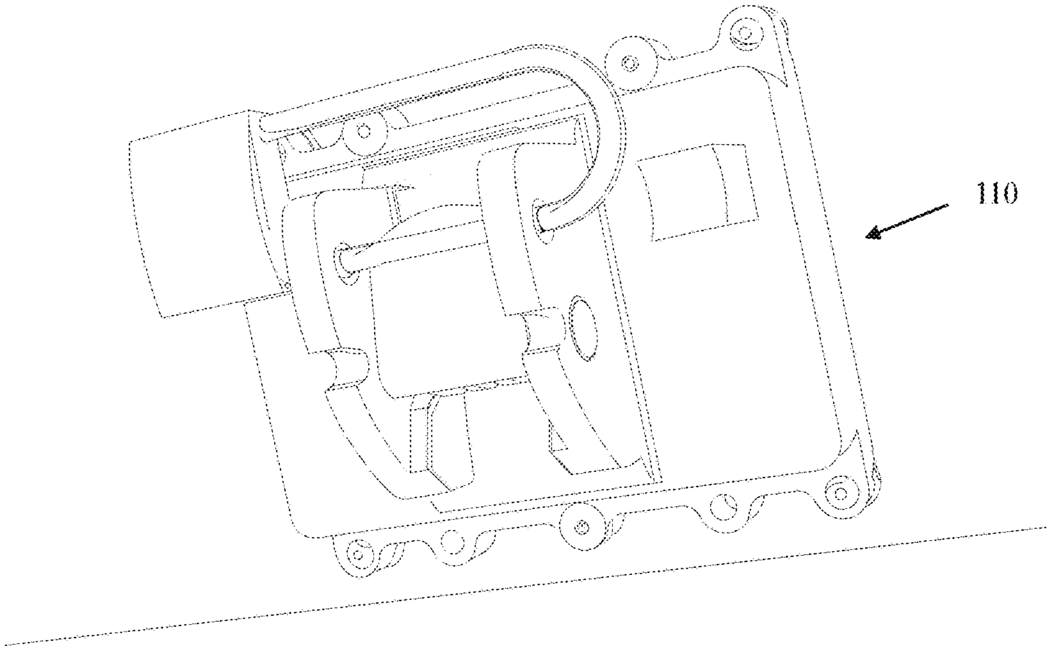

As illustrated in FIGS. 2C, 2D, and 2E, external engagement assembly 206 need not be unlocked from its hold state by lock mechanism 404 in order for lid 106 of bin 104 to open if bin 106 is tilted to the first orientation.

Retainer mechanism 102 when locked prevents unwanted opening of lid 106 whether intentional or accidental by lock 404 while passively (and automatically) self-releasing adjusting mechanism 112 to allow lid 106 to fully open when and as a result of the retainer mechanism appropriately tilted to the first orientation for unhindered, unobstructed emptying of the container, even if external engagement assembly 206 is locked as shown.

FIGS. 3A to 3M are non-limiting, exemplary illustrations of the retainer mechanism shown in FIGS. 1A to 2E, showing release of a lid of a trash bin even when the lid is locked with a second lock mechanism in accordance with one or more embodiments of the present invention.

In this non-limiting, exemplary instance, instead of using removable lock mechanism 404, a push lock mechanism 404*a* may be used where it may be fixed onto retainer member 110 using an optional mounting adapter 418. Alternatively, retainer member 110 may be manufactured with a mounting adapter integrated with the unit as an extension of side wall supports 252 or 254.

Retainer member 110 includes a pair of aligned recesses 414, one of which may be used to function as a relief for fasteners (e.g., rivets) 420 of lock mechanism 404*a* as shown. In other words, recesses 414 are to ensure the rivet are not interfering with the operations of retainer mechanism 102 and provide clearance while allowing mounting adapter 418 to be secured flatly against lateral side walls or supports 252 or 254 of retainer member 110. As detailed below, lateral side walls or supports 252 and 254 are identical mirror images.

As shown, shank or plunger 422 of push lock mechanism 404*a* covers over external engagement lever 410 of external engagement assembly 206 to thereby lock external engagement assembly 206 into its hold state.

As shown, push lock 404*a* may be secured onto retainer member 110 via a single, integral piece mounting adapter 418, which includes a first portion (mounting portion) 424 that may optionally comprise of a contour that generally matches a contour of exterior facing side of lateral support walls 252 and 254 of retainer member 110.

Mounting adapter 418 further includes a securing portion 426 that may optionally comprise of a contour that generally matches a contour of connector flange 428 of push lock 404*a*. It should be noted that any shape mounting adapter 418 may be used so long as lock mechanism 404*a* is properly mounted to allow for proper operations of both the lock 404*a* and retainer mechanism 102.

As further illustrated, securing portion 426 of mounting adapter plate 418 includes a first and a second securing openings 430, and a lock plunger opening 432. First and second securing openings 430 receive fasteners (e.g., rivets as shown) 420 whereas lock plunger opening 432 allows for the free back and forth movement of lock plunger 422.

Further, included is a pivot axel opening 434 that is aligned with one of the pivot axel openings 264 or 266 of one of the lateral support walls 252 or 254, which enable a pivot axel (or pin) 242 of external engagement lever 410 of external engagement assembly 206 to be used to fix adapter plate 416 and lock combination to lateral support walls 252 or 254 of retainer member 110, while allowing free movement of external engagement lever 410 along reciprocating path 124.

As further illustrated, cylindrical body 446 of lock mechanism 404 rests on an optional lock support 442, with a top end 444 that is configured (e.g., rounded recess or concaved) to support cylindrical body 446. Lock support 442 is optional since adapter plate 418 has sufficient strength to fully support push lock 404*a*.

It should be noted that recesses 414 (as shown in FIGS. 1C and 1E) that are used as clearance reliefs for rivets for mounting push lock 404*a* may be eliminated. Instead, adapter plate 418 may be modified to shift or move first and second securing openings 430 above and clear of top of lateral side walls or supports 252 or 254, while maintaining pivot axel opening 434 of adapter plate 418 at the same position. Obviously lock plunger opening 432 will also be shifted in the same direction and distance as the first and second securing openings 430 so as to retain the geometric relationship. Stated simply, width 644 (FIG. 3M) of adapter plate 418 may be extended (increased) to a point where first and second securing openings 430 clear the top of lateral side walls or supports 252 or 254, while maintaining first portion (mounting portion) 424 of adapter plate 418 (including the position of the pivot axel opening 434) the same as shown.

Figure 3A:
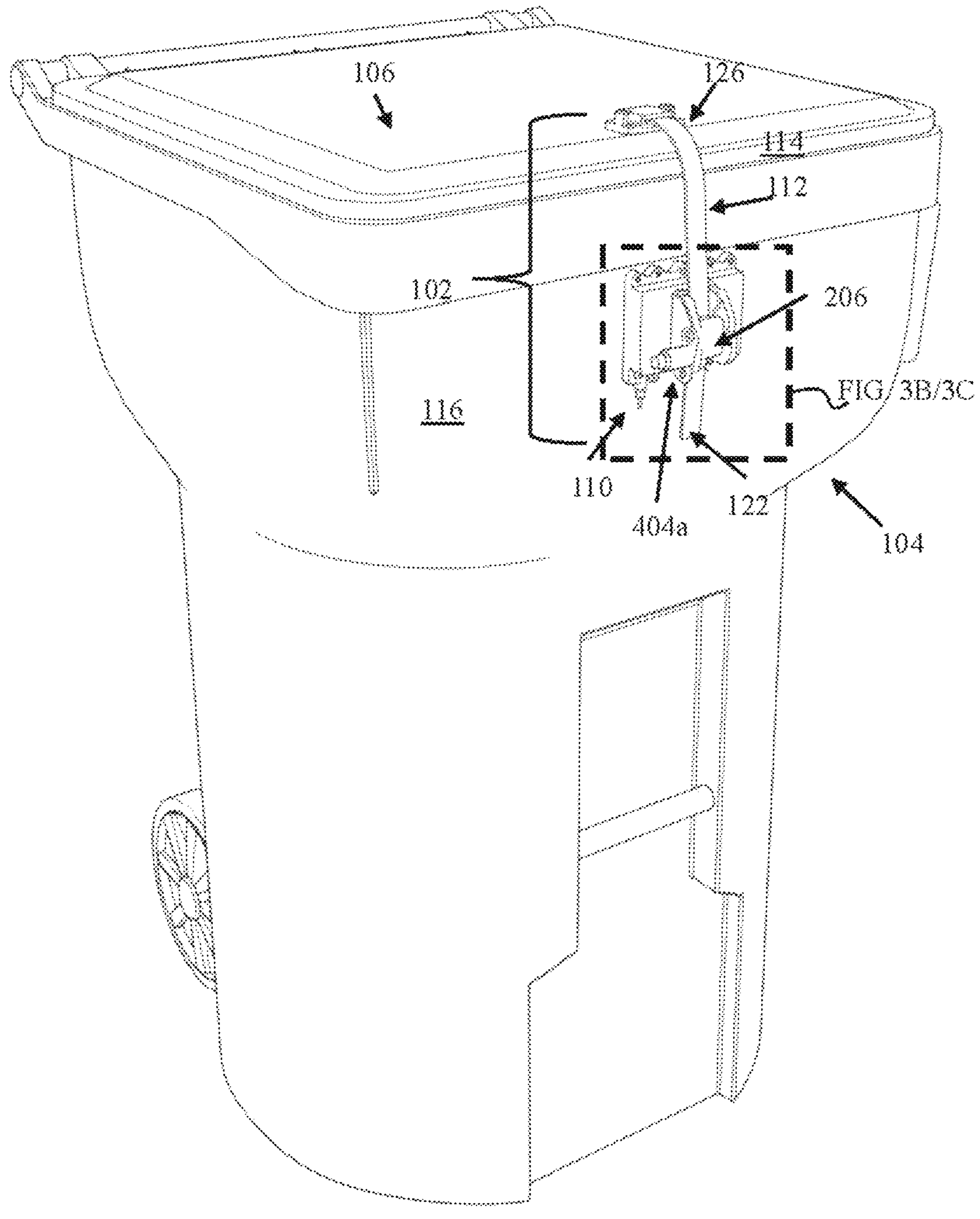
FIGS. 3A to 3M are non-limiting, exemplary illustrations of the retainer mechanism shown in FIGS. 1A to 2E, showing release of a lid of a trash bin even when the lid is locked with a second lock mechanism in accordance with one or more embodiments of the present invention.
Figure 3B:
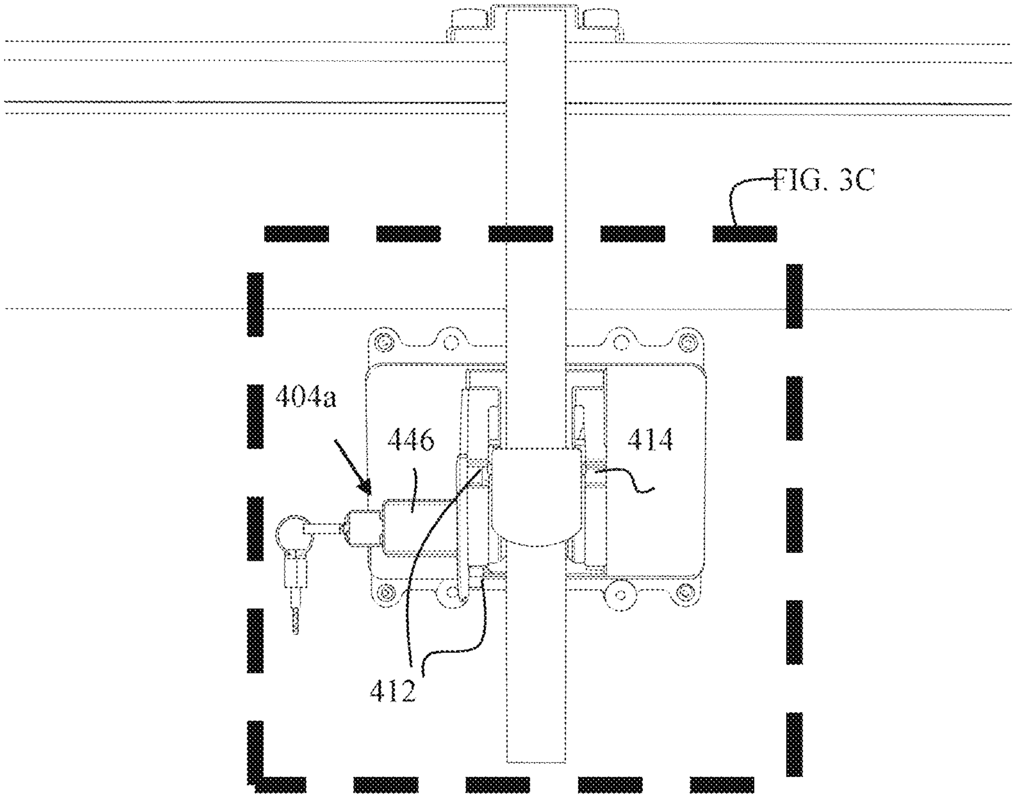
Figure 3C:
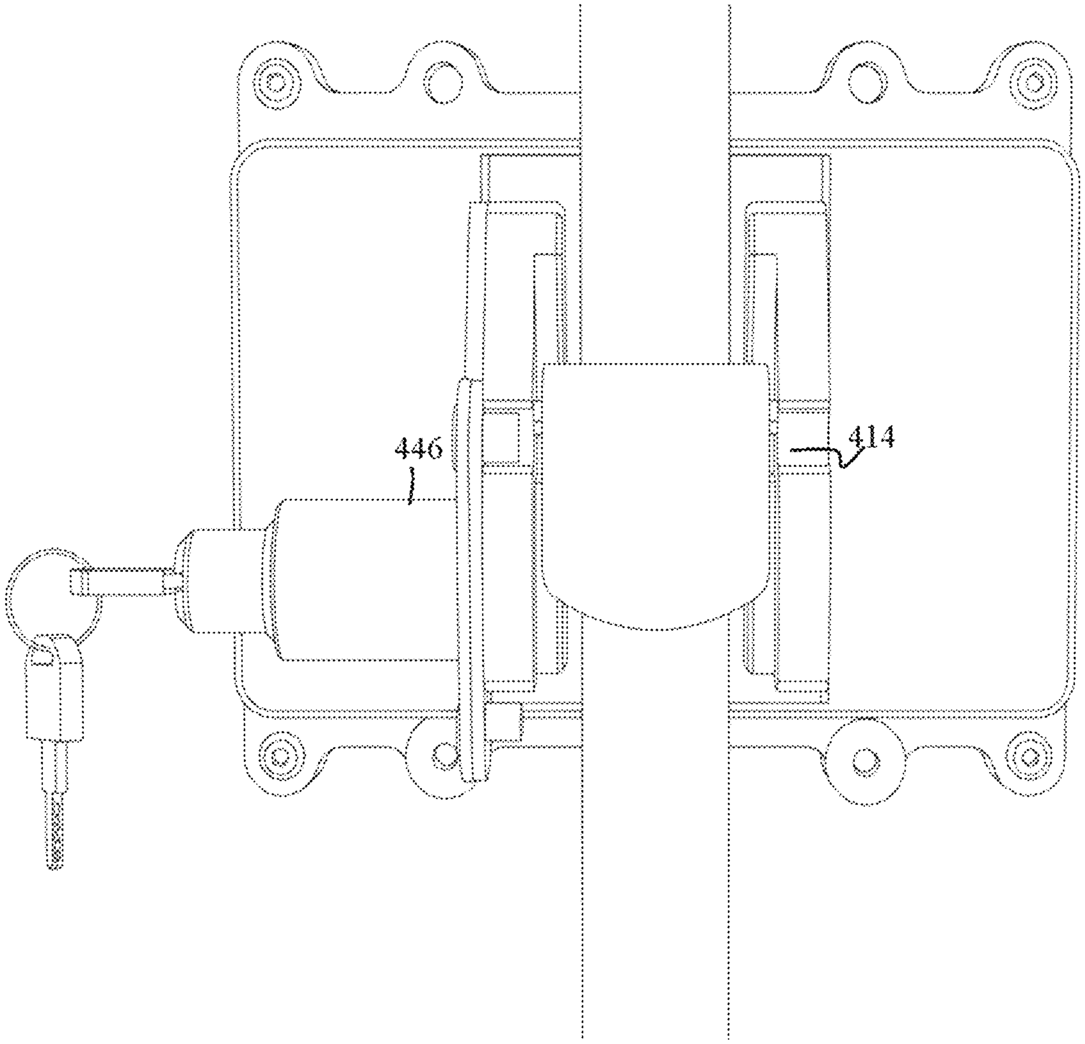
Figure 3D:
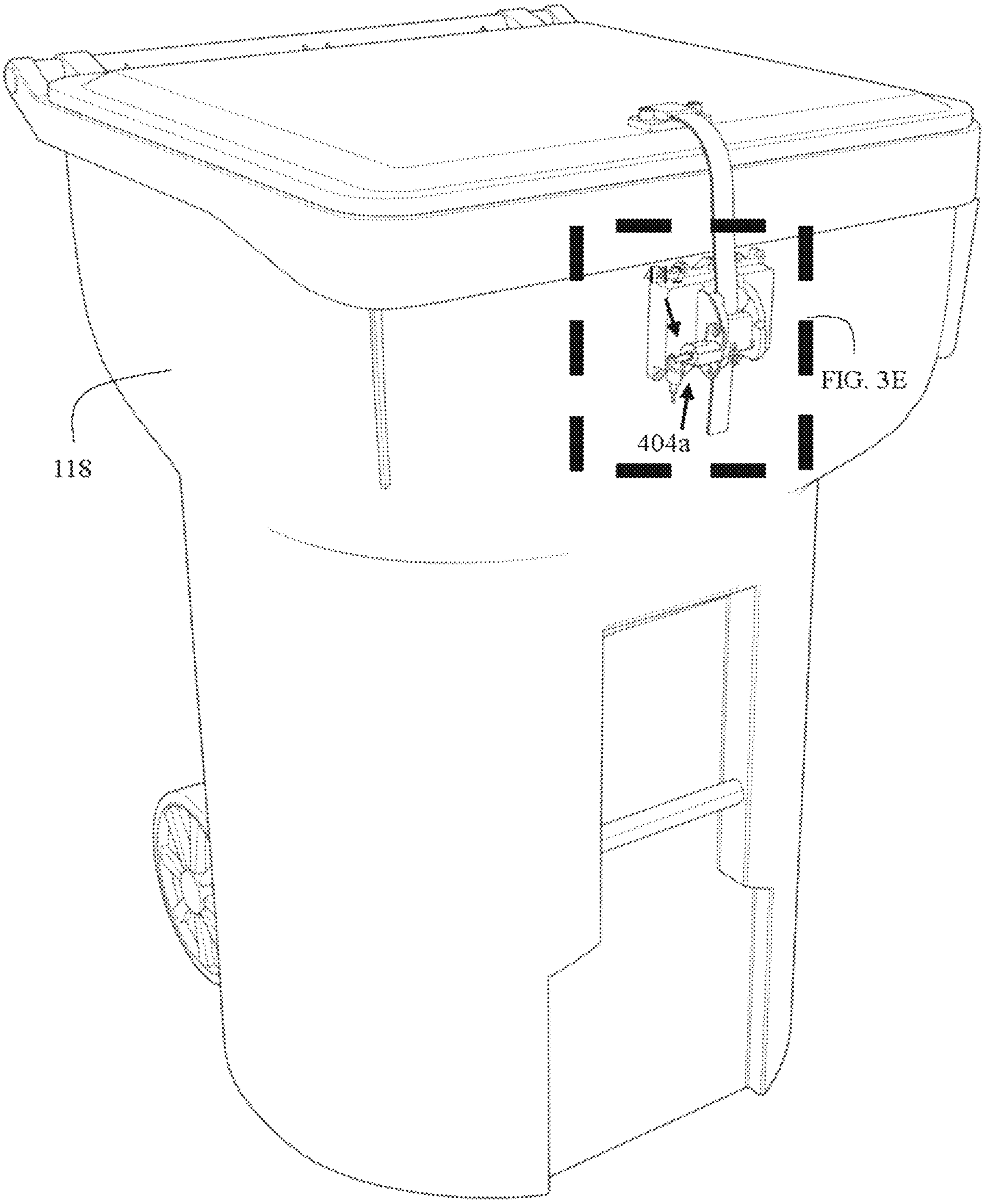
Figure 3E:
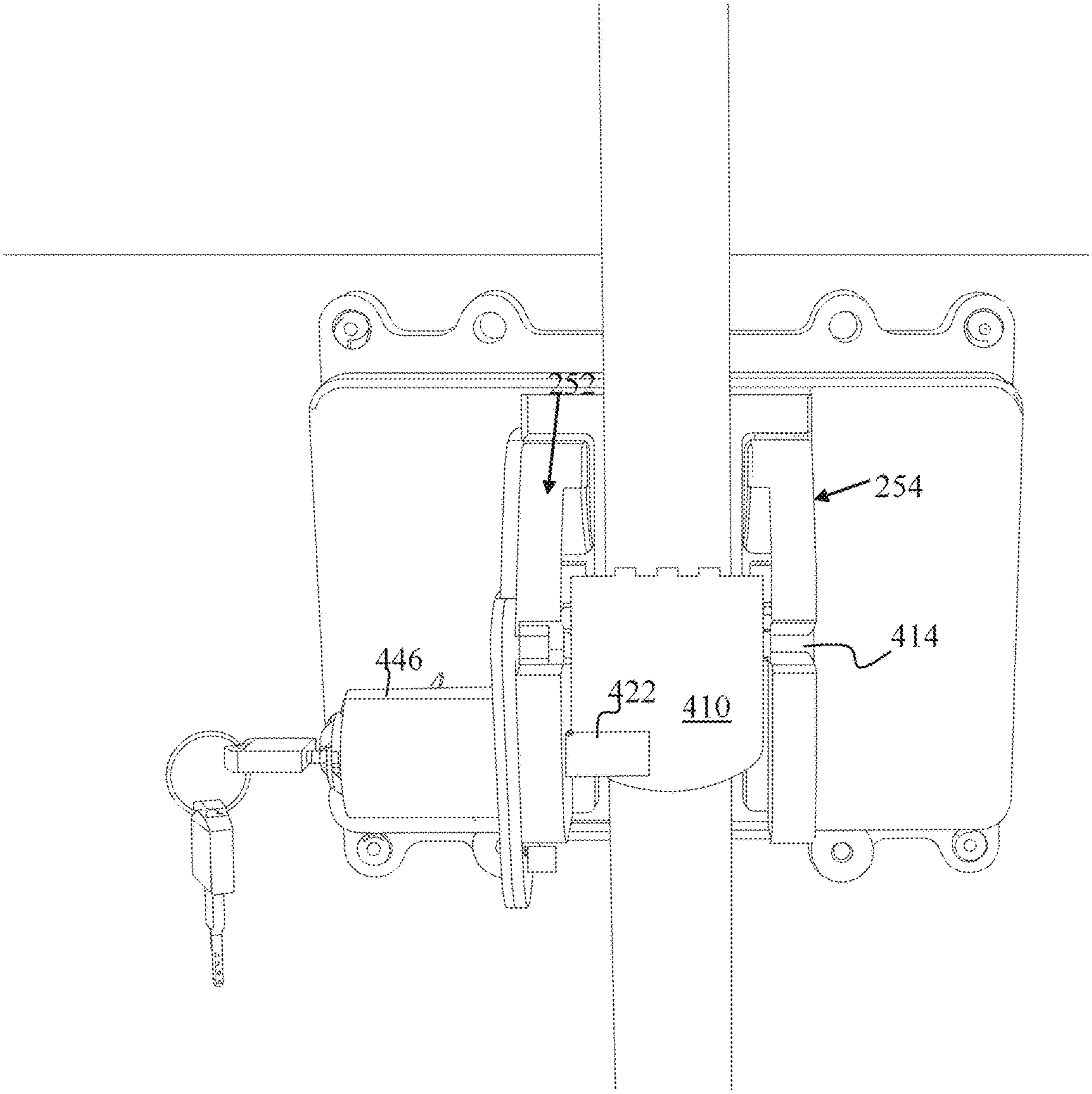
Figure 3F:
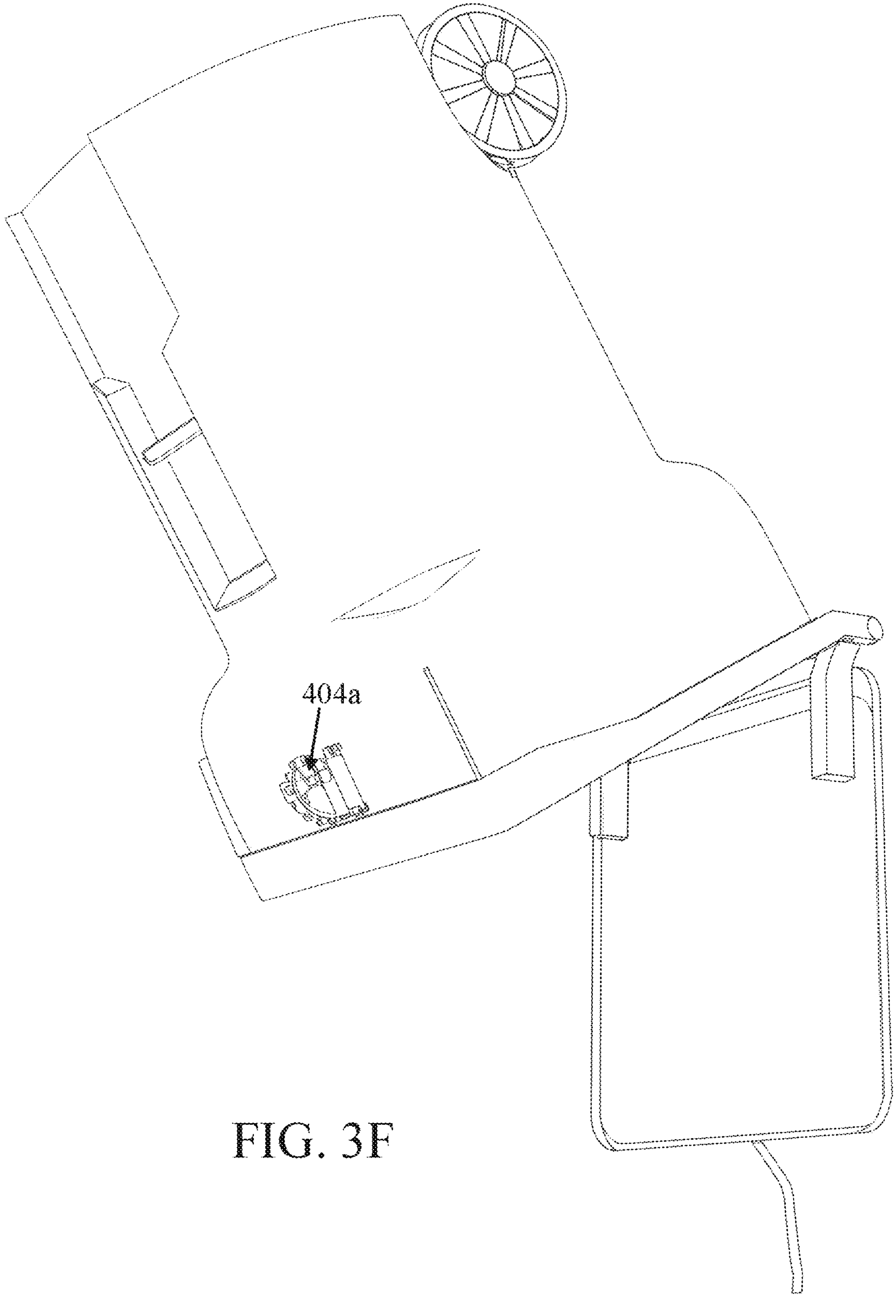
Figure 3G:
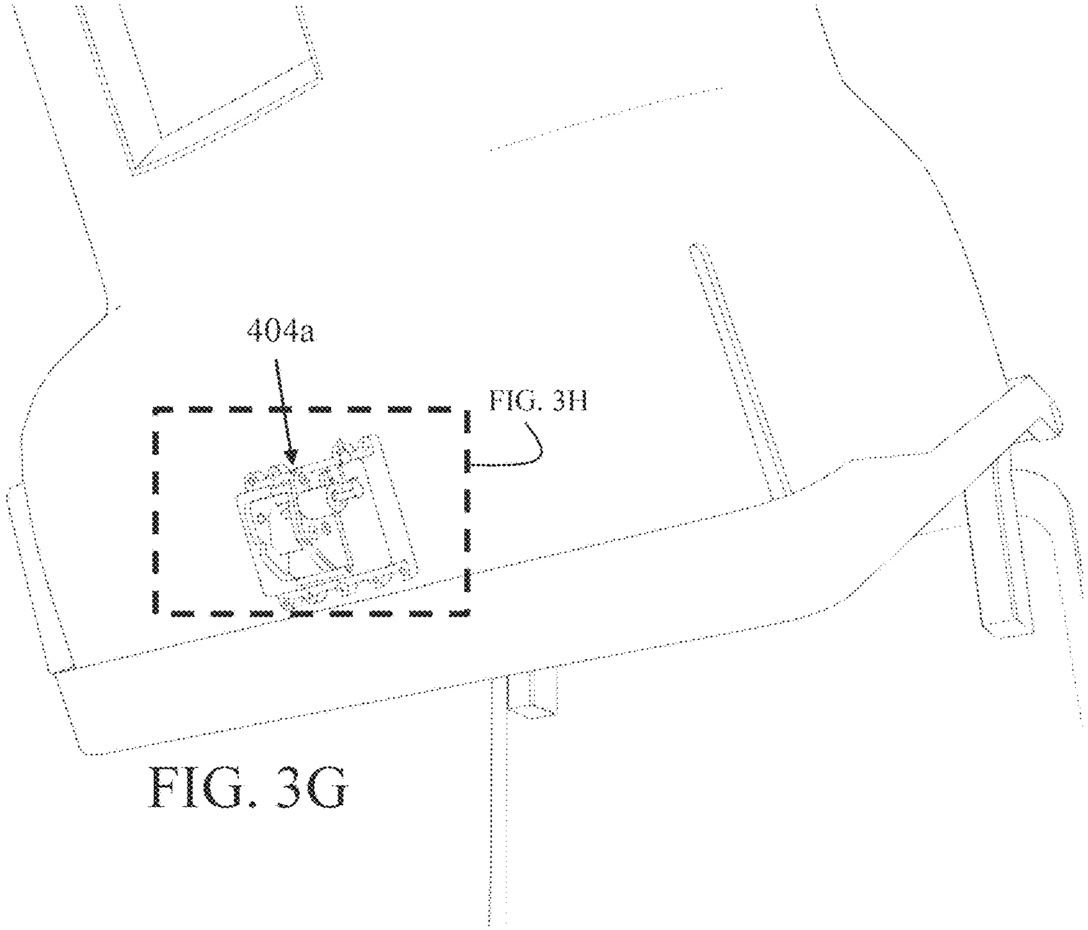
Figure 3H:
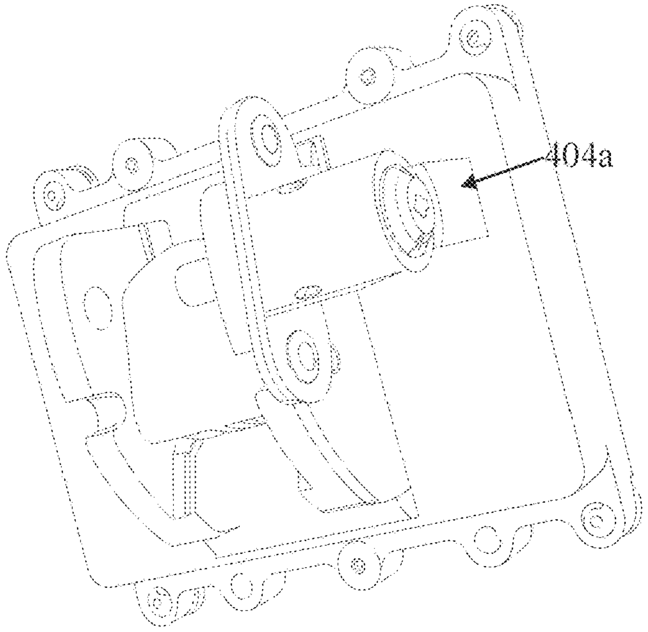
Figure 3I:
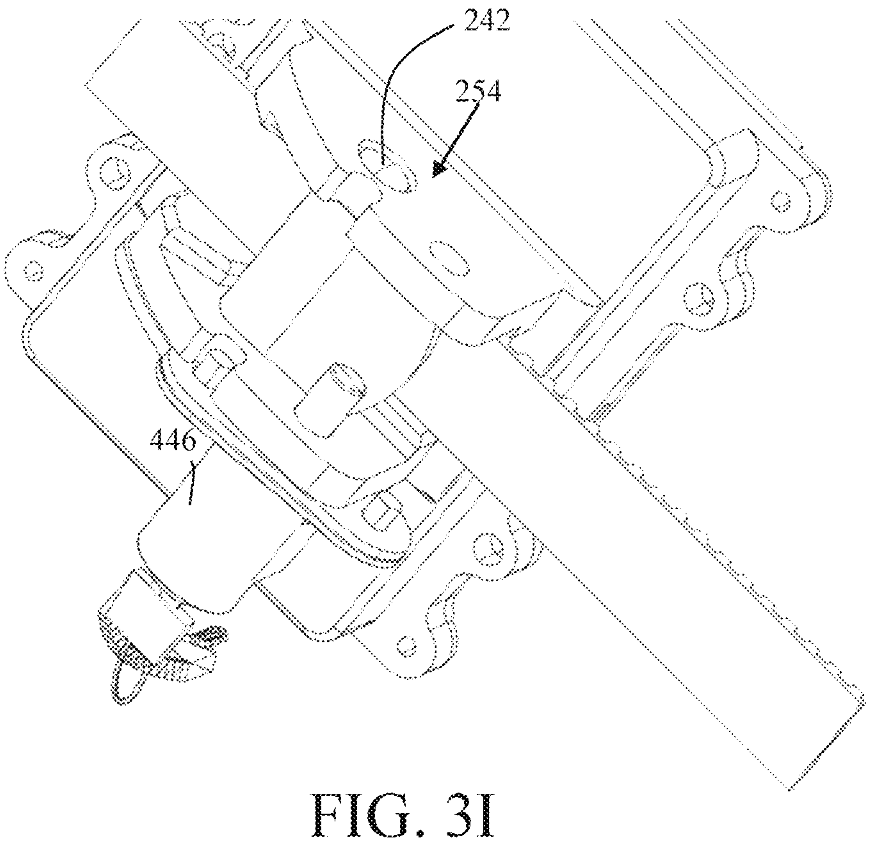
Figure 3J:
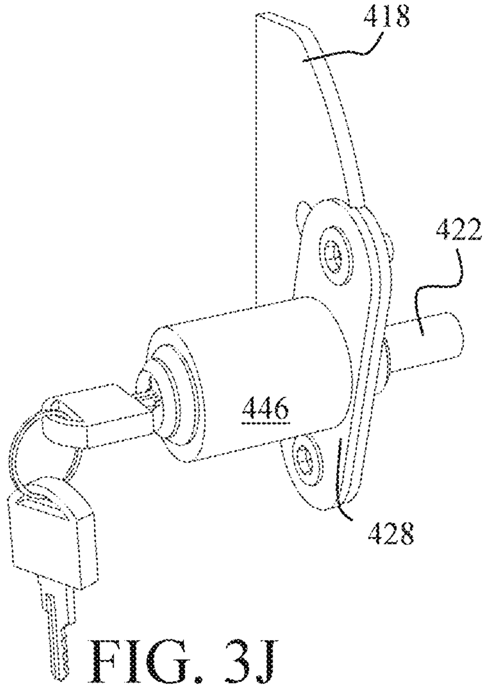
Figure 3K:
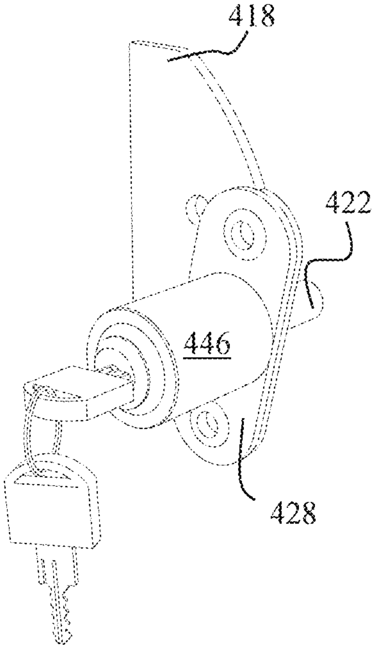
Figure 3L:
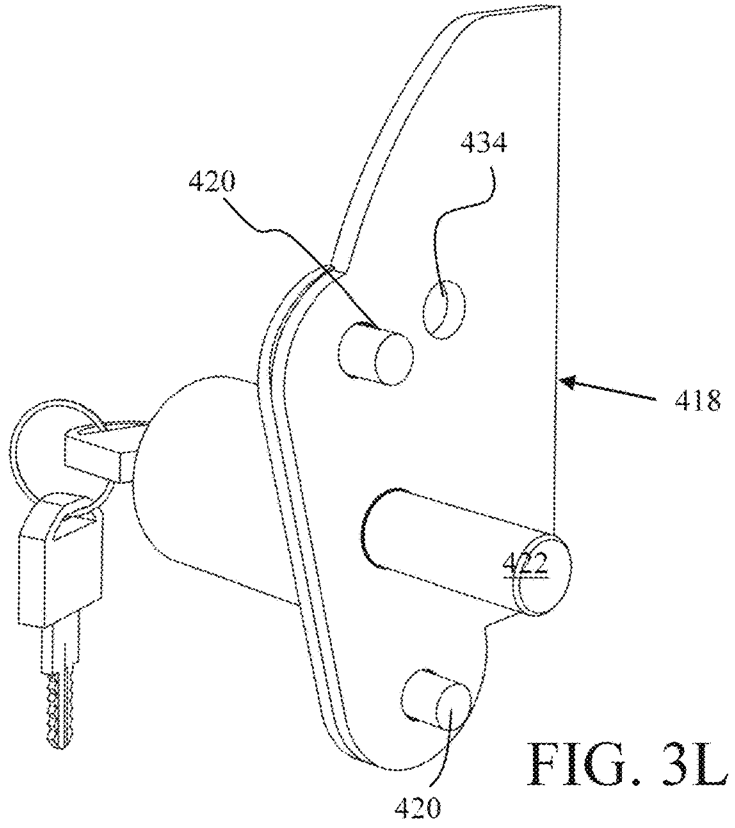
Figure 3M:
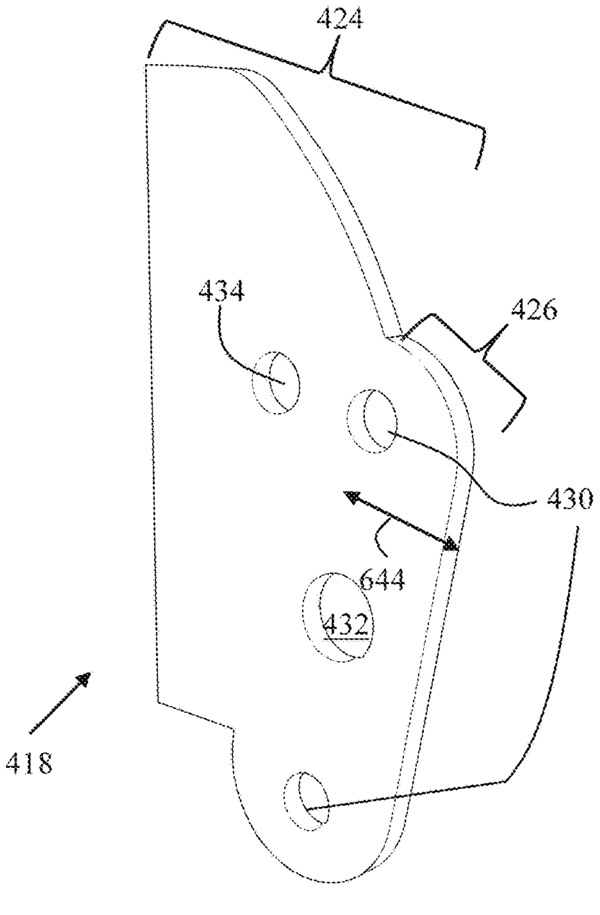

It should be noted that to prevent animals to simply move external engagement assembly 206 to release position, a removable solid object (e.g., a rod) may be inserted within the pair of aligned openings 406 of retainer member 110 to block movement of external engagement assembly 206 instead of lock mechanisms 404 or 404*a*. As indicated above, locking external engagement assembly 206 in its hold state would still allow opening of lid 106 when and as a result of retainer mechanism 102 is appropriately tilted to the first orientation (FIGS. 3F to 3H).

As indicated above, use of any lock or interlock mechanism such as a simple rod are all optional and hence, with or without locks, lid 106 will open when and as a result of retainer mechanism 102 is appropriately tilted to the first orientation. Stated otherwise, the state or position of external engagement assembly 206 (hold or release) has no impact on the state (hold or release) of adjusting mechanism 112 when bin 104 is tilted to the first orientation for emptying of bin 104, which would allow adjusting mechanism 112 to be released and lid 106 of bin 104 be opened.

Accordingly, one or more embodiments of the present invention provide a retainer mechanism 102 that allows for actively securing lid 106 by a user for holding and maintaining content of bin 104 even if container 104 is overfilled and for passively (and automatically) self-releasing lid 106 to fully open when and as a result of retainer mechanism 102 appropriately tilted to the first orientation for unhindered, unobstructed emptying of container 104. However, while lid 106 of bin 104 is secured by retainer mechanism 102, if bin 104 is tilted and falls onto any one of its sides, lid 106 will remain secure, and continue to hold and maintain content of bin 104.

Accordingly, adjusting member 112 is passively (automatically) released only when and only as a result of retainer mechanism 102 being tilted to the first orientation where internal engagement assembly 416 of retainer mechanism 102 is able to passively move to a disengaging or release position. In other words, internal engagement assembly 416 is moved when retainer member 110 is tilted to the first orientation to passively release adjusting member 112. That is, external engagement assembly 206 is actively moved to one of hold or release positions to hold or release adjusting member 112, but internal engagement assembly 416 is passively moved to a release position release adjusting member 112 when retainer member 110 is tilted to a first orientation. It should be noted that for all the disclosed embodiments throughout the disclosure, once the container is placed back on the ground in normal, vertical orientation or rest position as shown in FIGS. 1A, 1H, 2A, 3A, 3D (i.e., the second orientation), internal engagement assembly 416 "resets" to the original hold state or position passively.

FIGS. 4A to 4E are non-limiting exemplary exploded view illustrations of the various components of the retainer member shown in FIGS. 1A to 3M in accordance with one or more embodiments of the present invention. The exploded view shown in FIGS. 4A to 4E illustrate disassembled, separated components that show the cooperative working relationship, orientation, positioning, and exemplary manner of assembly of the various components of the retainer member in accordance with one or more embodiments of the present invention, with each component detailed below.

As illustrated in FIGS. 1A to 4E, retainer mechanism 102 of the present invention is comprised of retainer member 110 and an adjusting member 112. As further detailed below, retainer member 110 houses a first (or external) engagement assembly 206 and a second (or internal) engagement assembly 416.

More specifically, retainer member 110 is comprised of a housing assembly having a cover 202 that forms a component of external engagement assembly 206 and a base-plate 204 that forms a component of internal engagement assembly 416.

First or external engagement assembly 206 further includes an external engagement lever 410 that is securely and moveably mounted on cover 202 via pivot axel (or pin) 242, enabling external engagement lever 410 to move along reciprocating path 124.

Figure 5A:
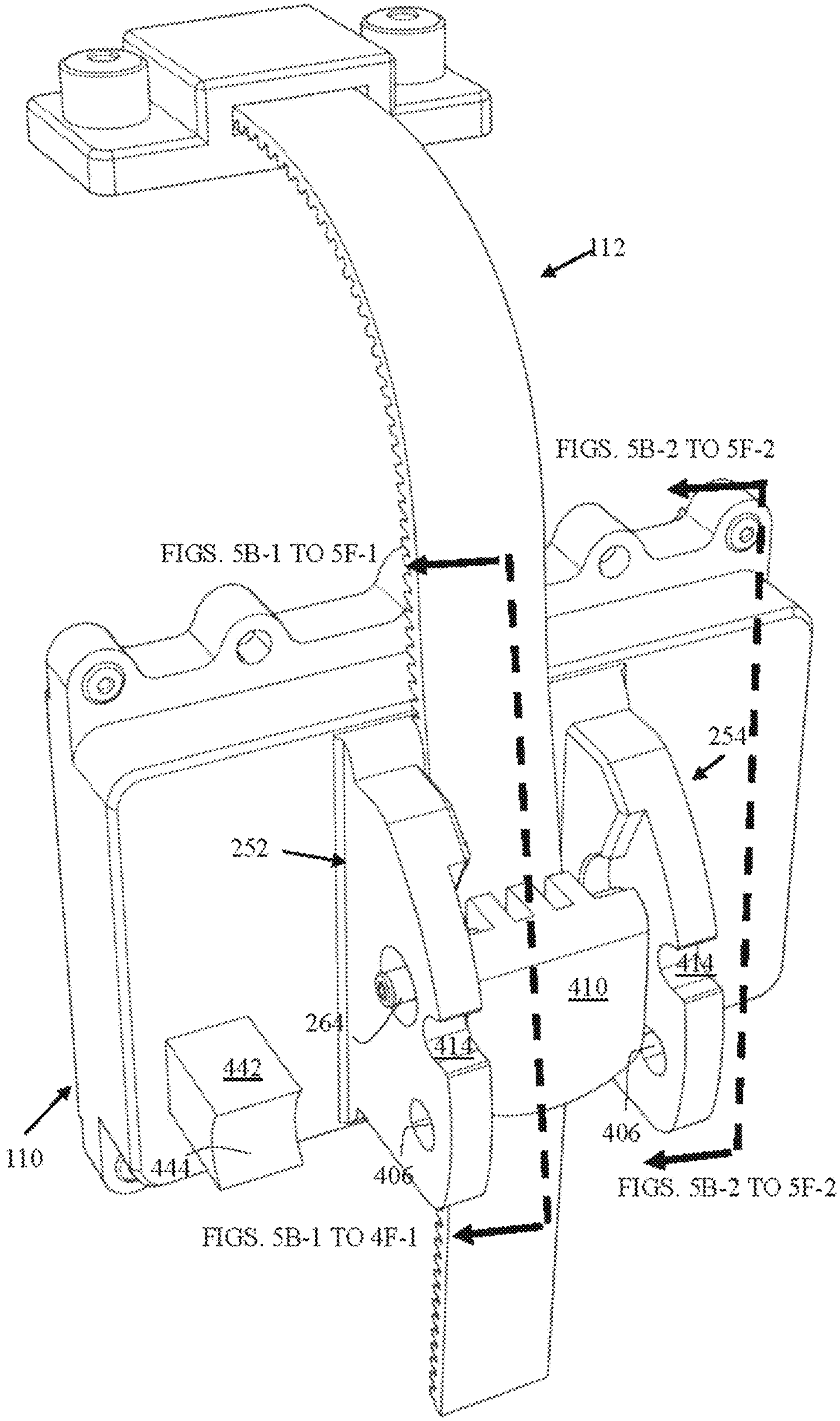
FIG. 5A is a non-limiting, exemplary illustration of the retainer mechanism shown in FIGS. 1A to 4E but without the bin in accordance with one or more embodiments the present invention.
Figures 1, 5B:
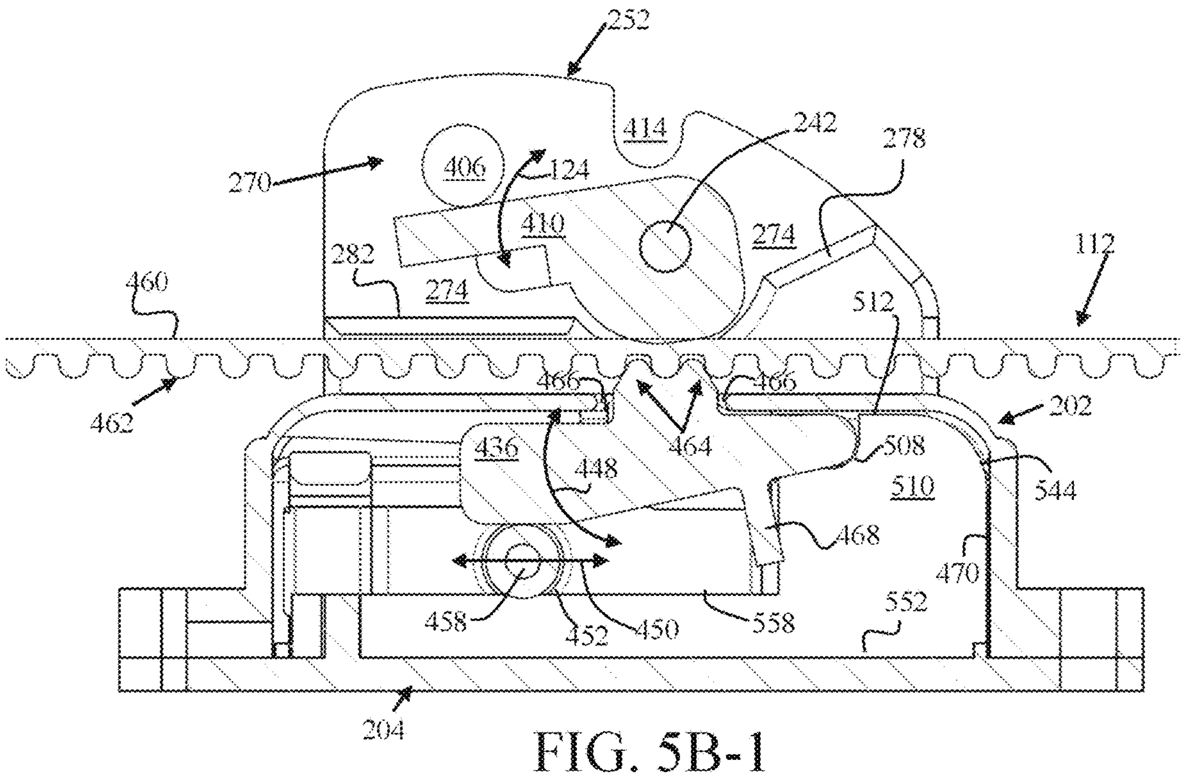
FIGS. 5B-1 to 5F-2 are non-limiting, exemplary illustration of the sectional views of the retainer mechanism shown in FIGS. 1A to 5A, progressively illustrating disengagement of the adjusting mechanism from retainer member while external (or first) engagement assembly is in hold position.
Figures 2, 5B:
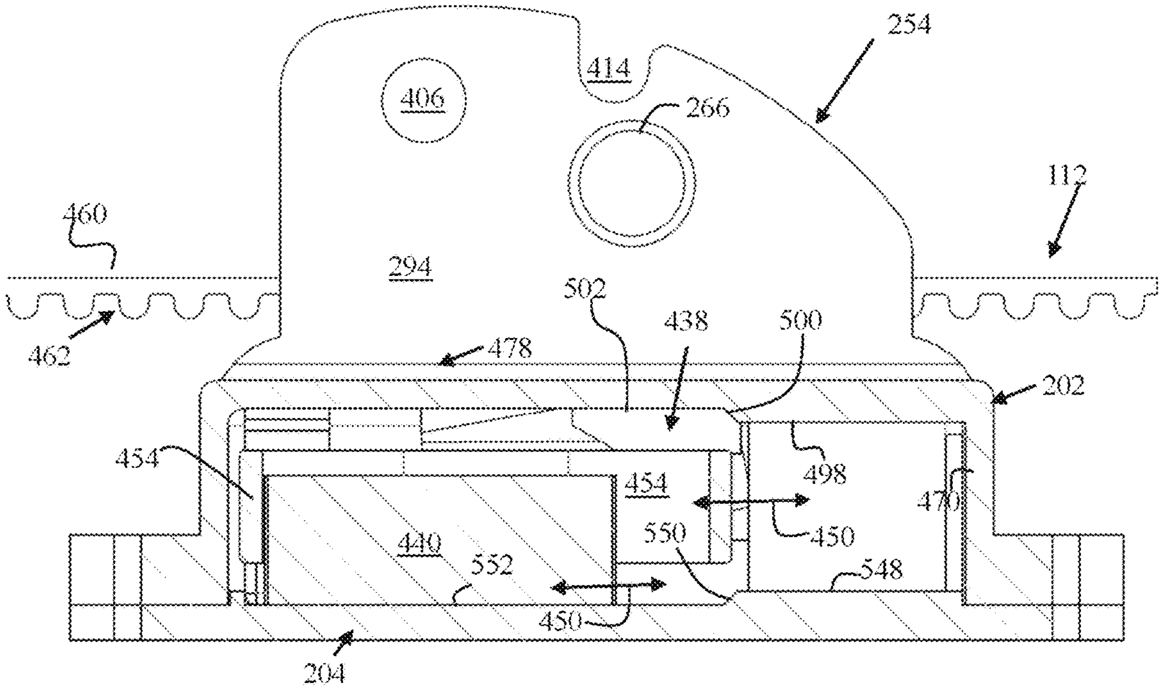

In addition to the base-plate 204, second or internal engagement assembly 416 further includes an internal engagement member 436, an actuator assembly 438 that moves internal engagement member 436, and two weighted mass 440 that upon impact with actuator assembly 438, moves actuator 438 along path 450 (FIG. 5B-1), which, in turn, moves internal engagement member 436 along path 448 (FIG. 5B-1).

As further detailed below, actuator assembly 438 is a yoke like structure comprised of a set of bushings (e.g., rollers) 452 on a crossbar 458 (FIG. 5B-1) associated with a pair of laterals, generally U-shaped impact structures 454 and 456 for facilitating movement of actuator assembly 438.

Figure 4A:
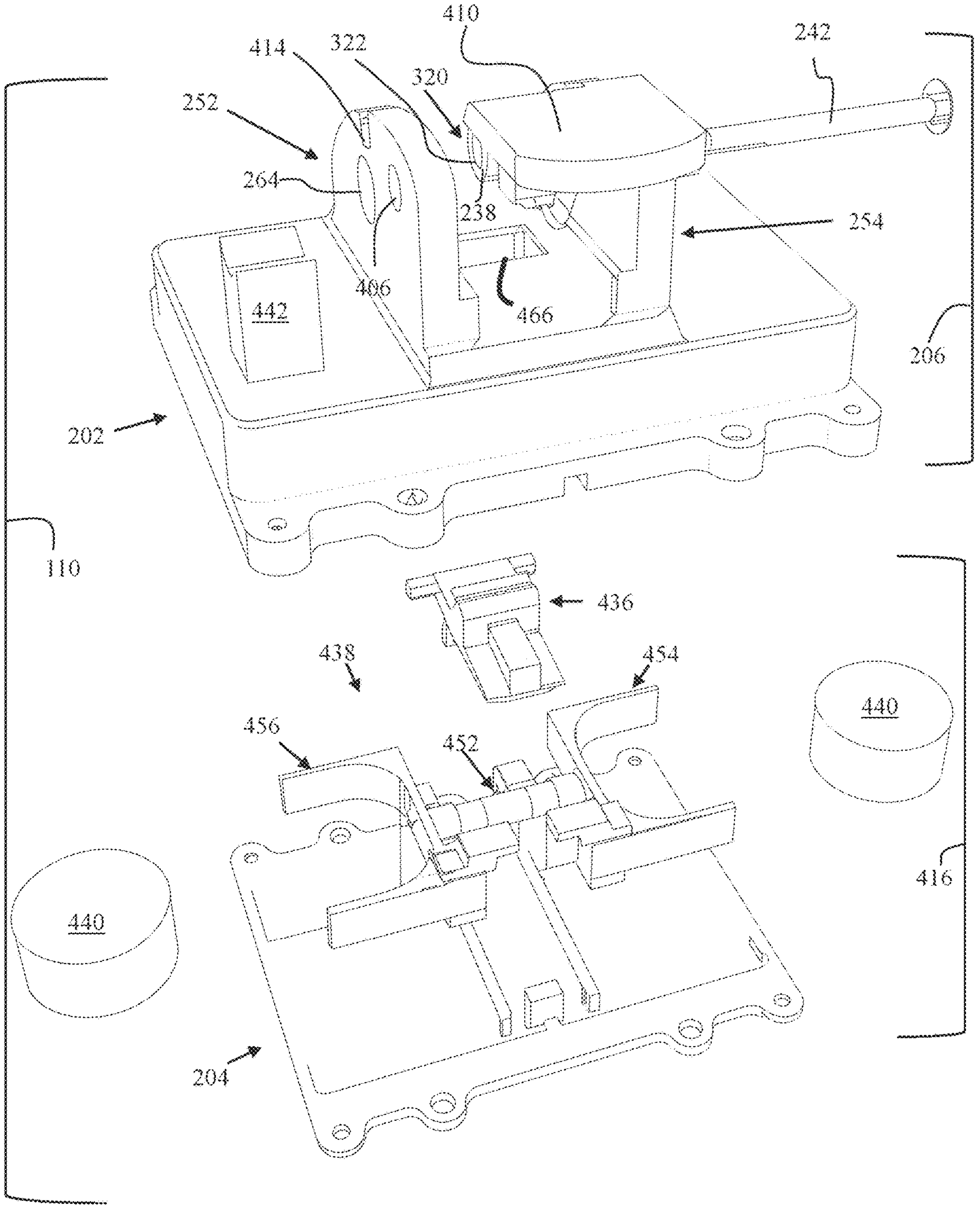
FIGS. 4A to 4E are non-limiting exemplary exploded view illustrations of the various components of the retainer member shown in FIGS. 1A to 3M in accordance with one or more embodiments of the present invention.
Figure 4B:
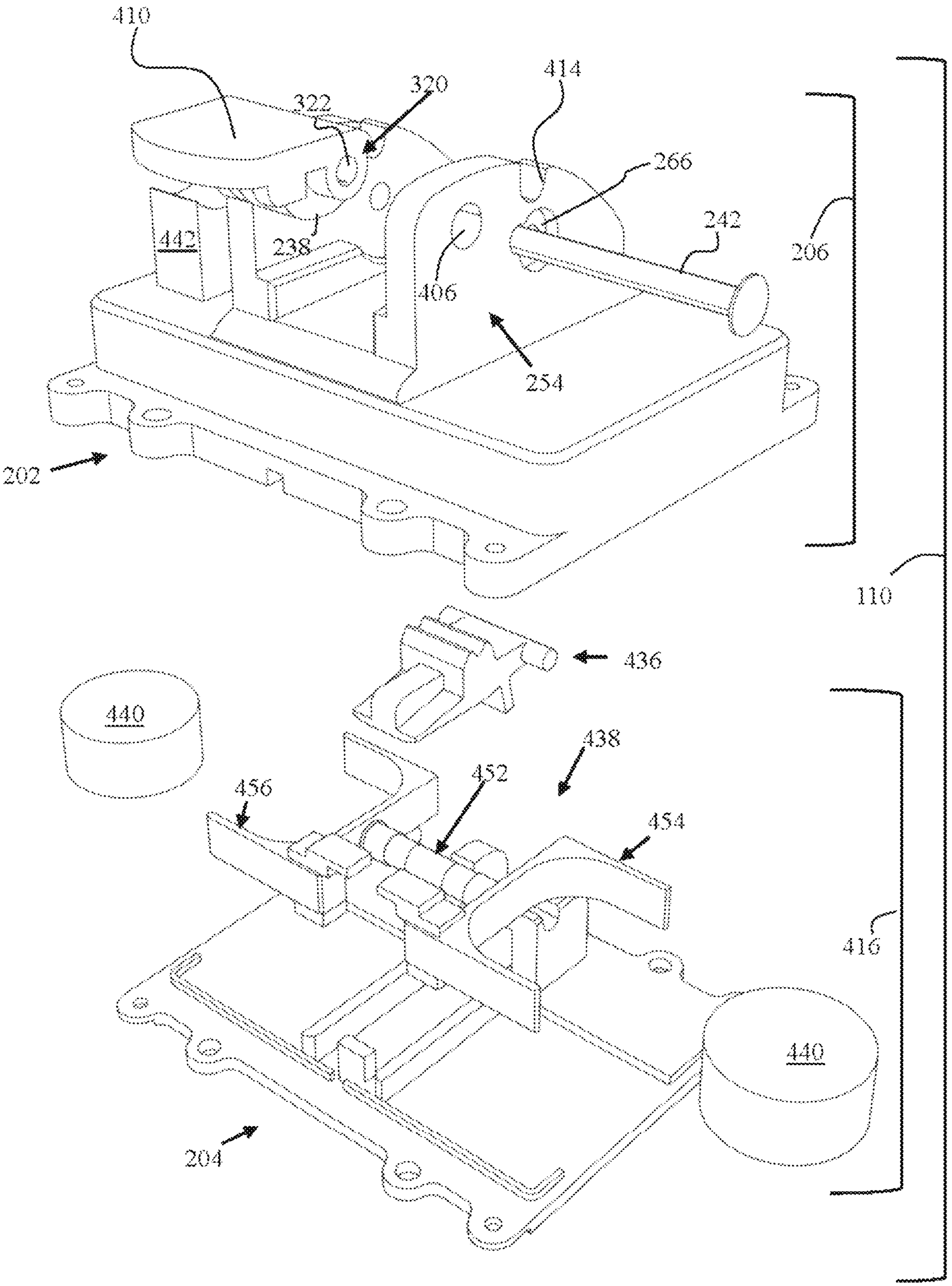
Figure 4C:
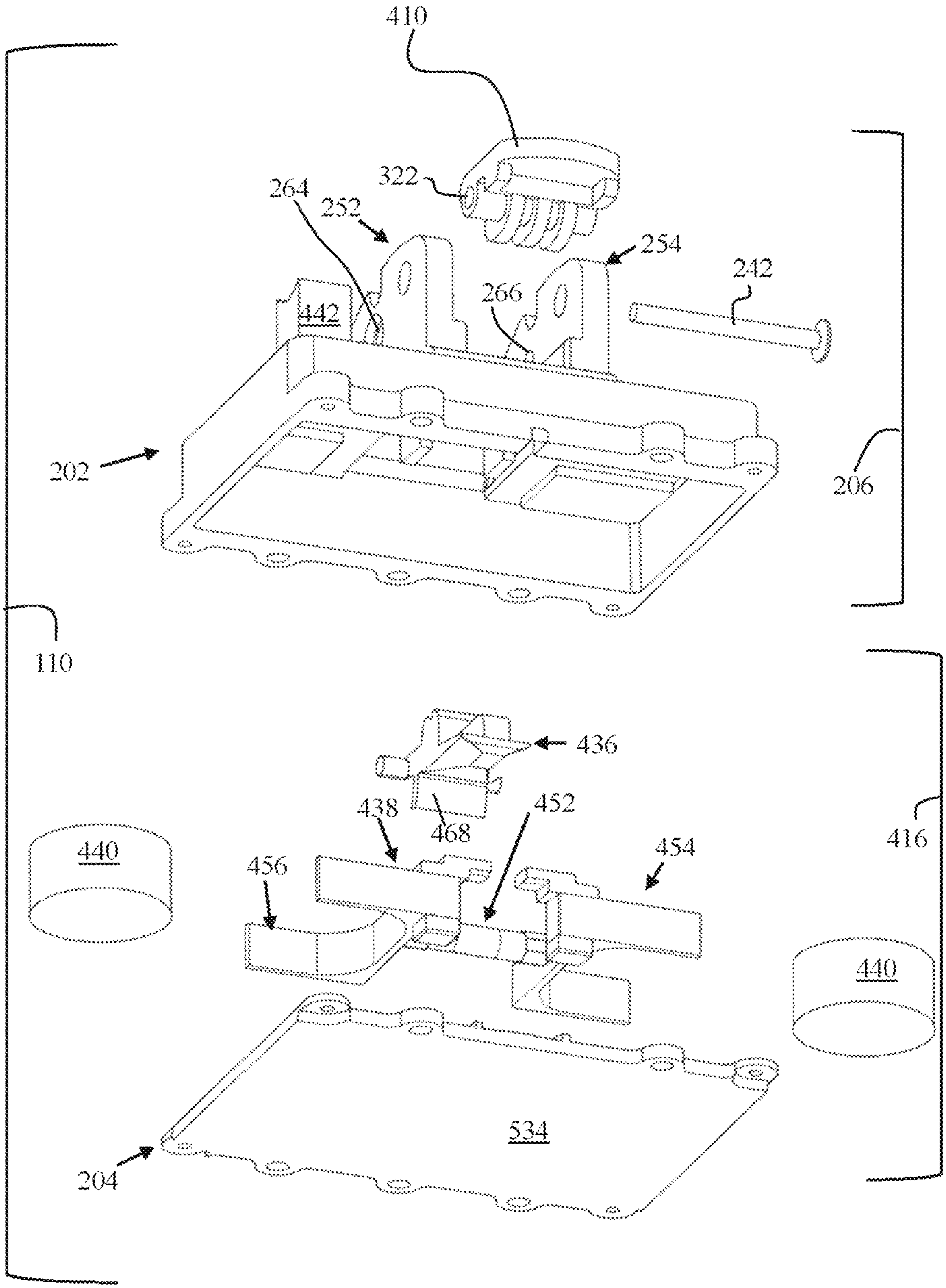
Figure 4D:
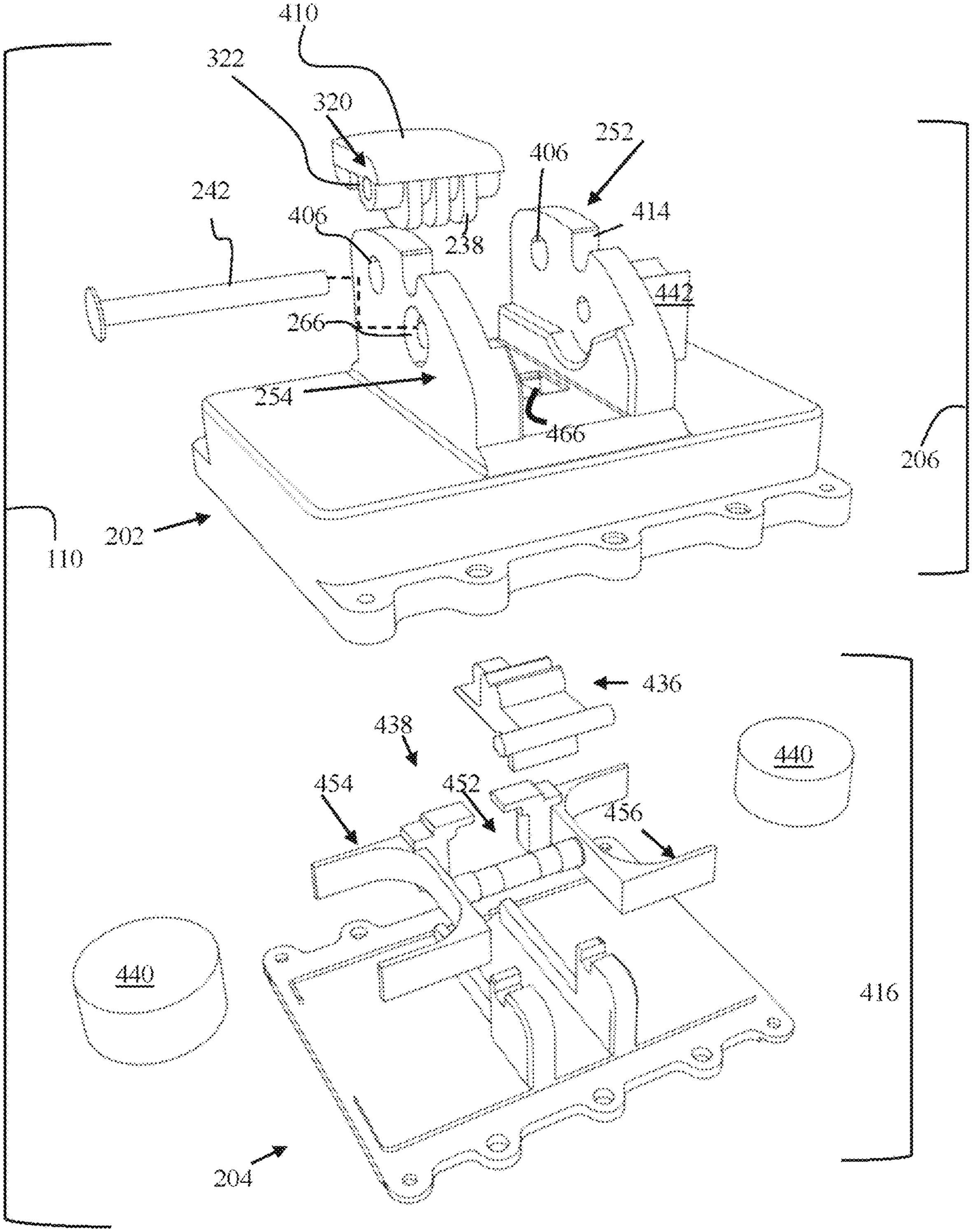
Figure 4E:
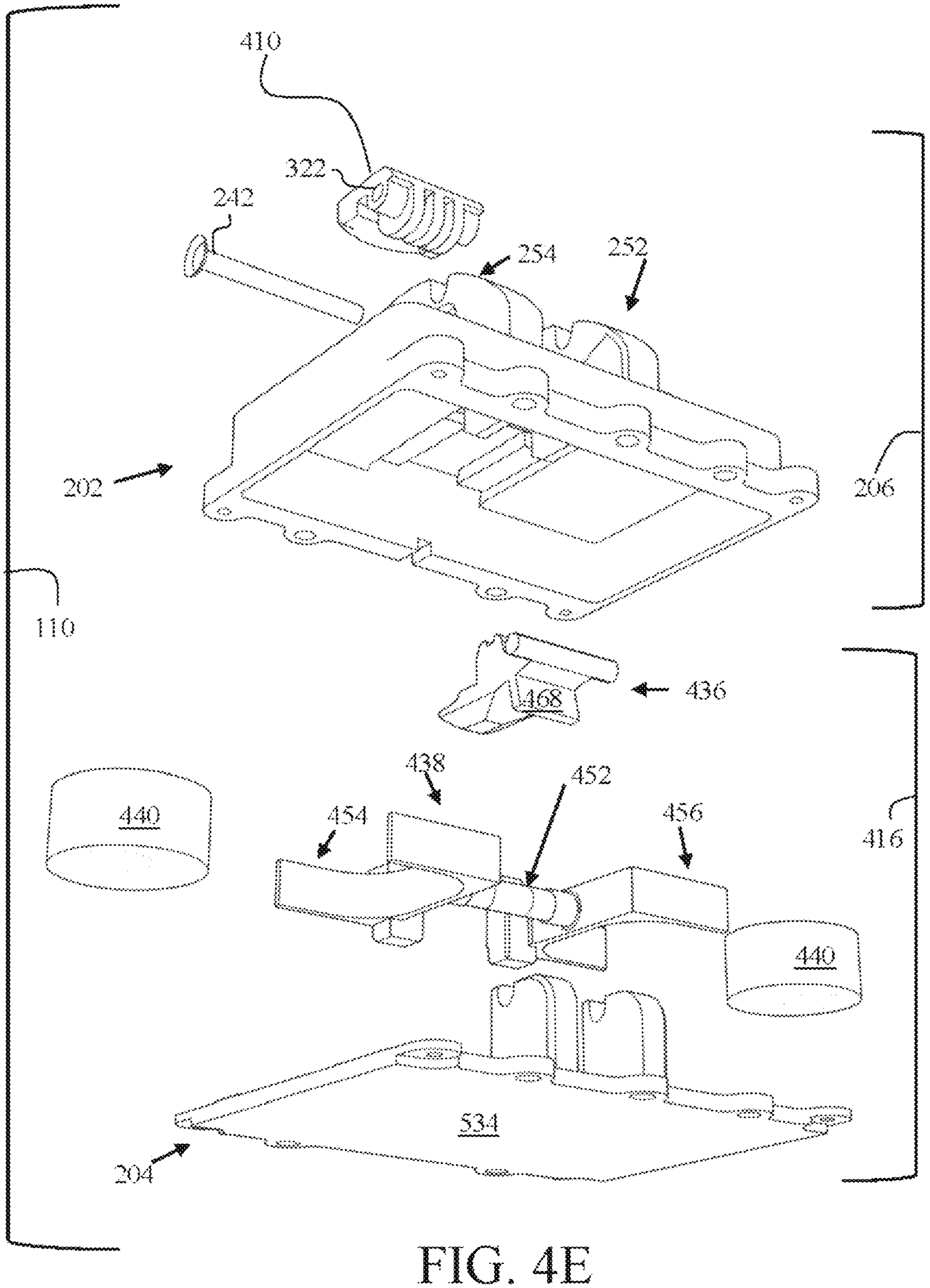

FIG. 5A is a non-limiting, exemplary illustration of the retainer mechanism shown in FIGS. 1A to 4E but without the bin in accordance with one or more embodiments the present invention. FIGS. 5B-1 to 5F-2 are non-limiting, exemplary illustration of the sectional views of the retainer mechanism shown in FIGS. 1A to 5A, progressively illustrating disengagement of the adjusting mechanism from retainer member while external (or first) engagement assembly is in hold position.

Figures 3, 5B:
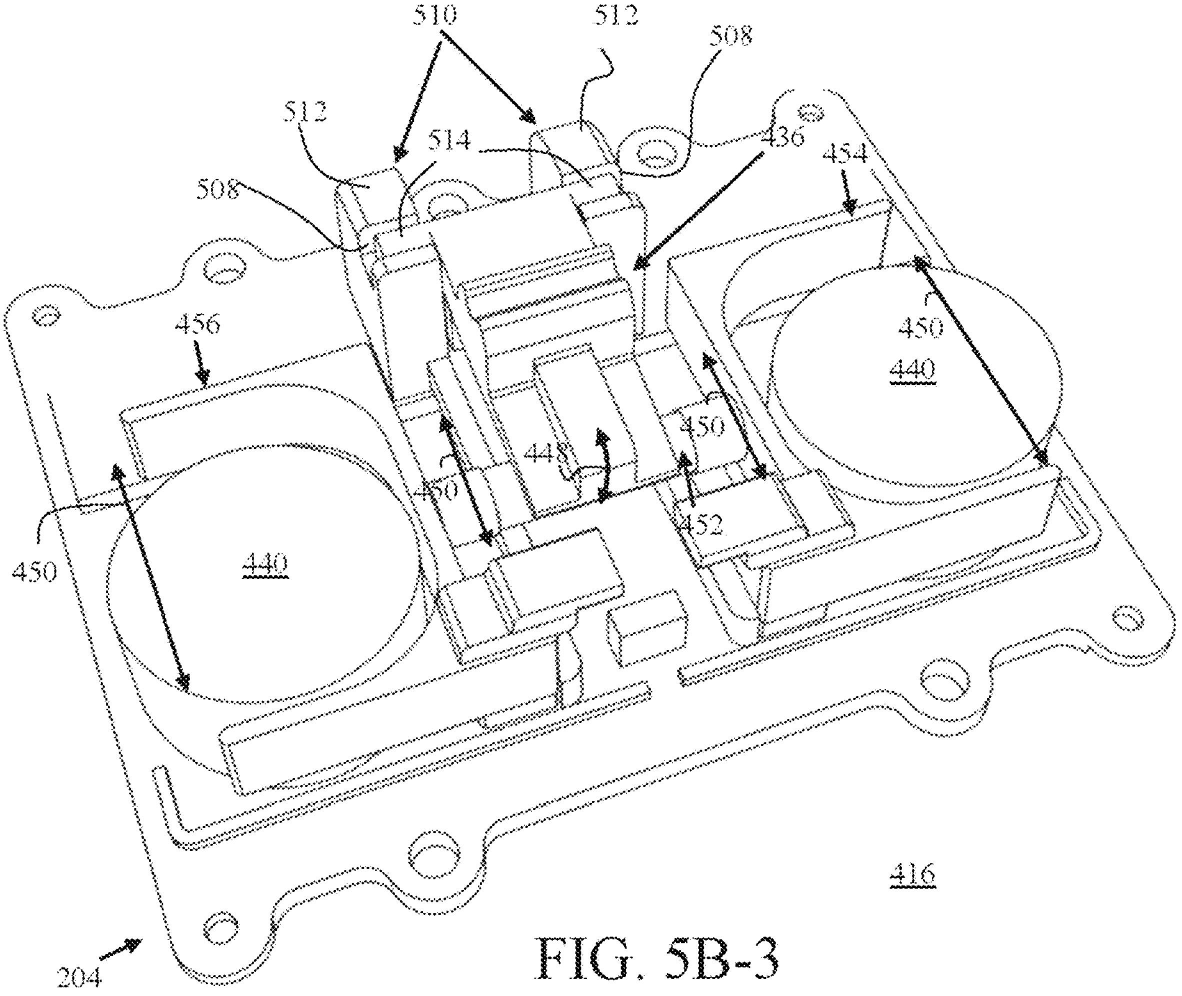
Figures 1, 5C:
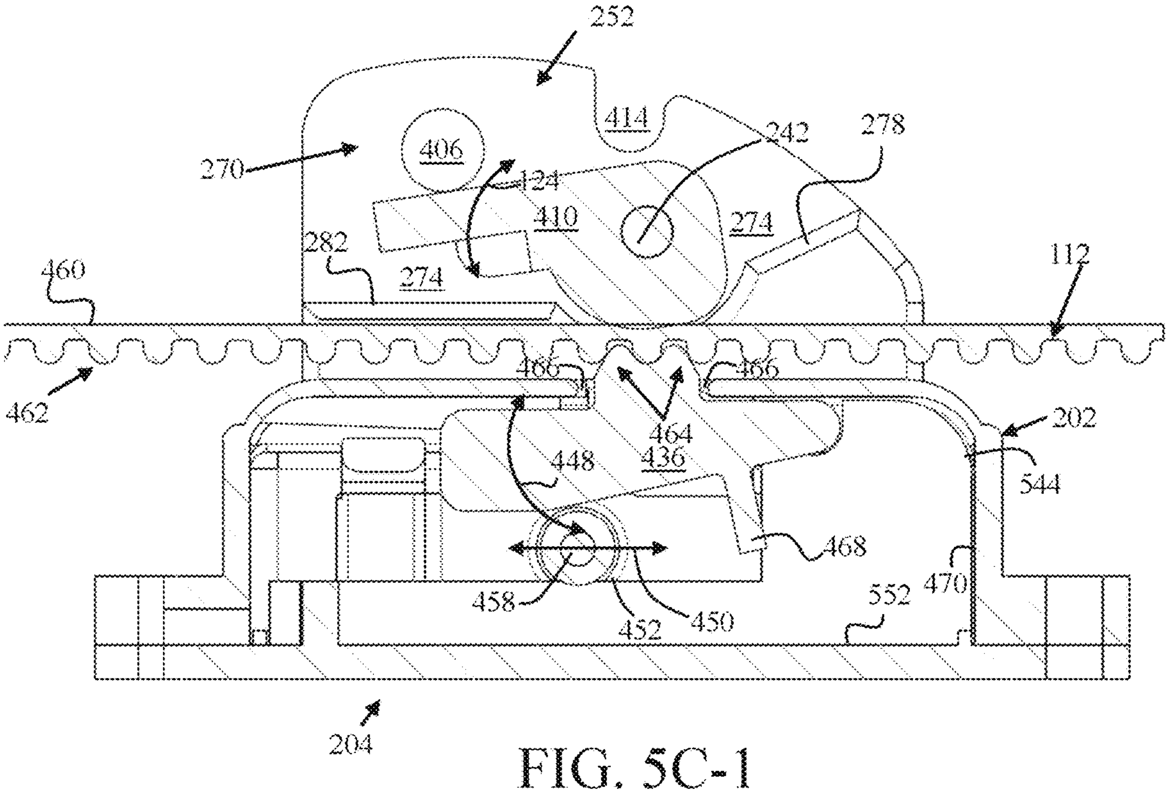
Figures 2, 5C:
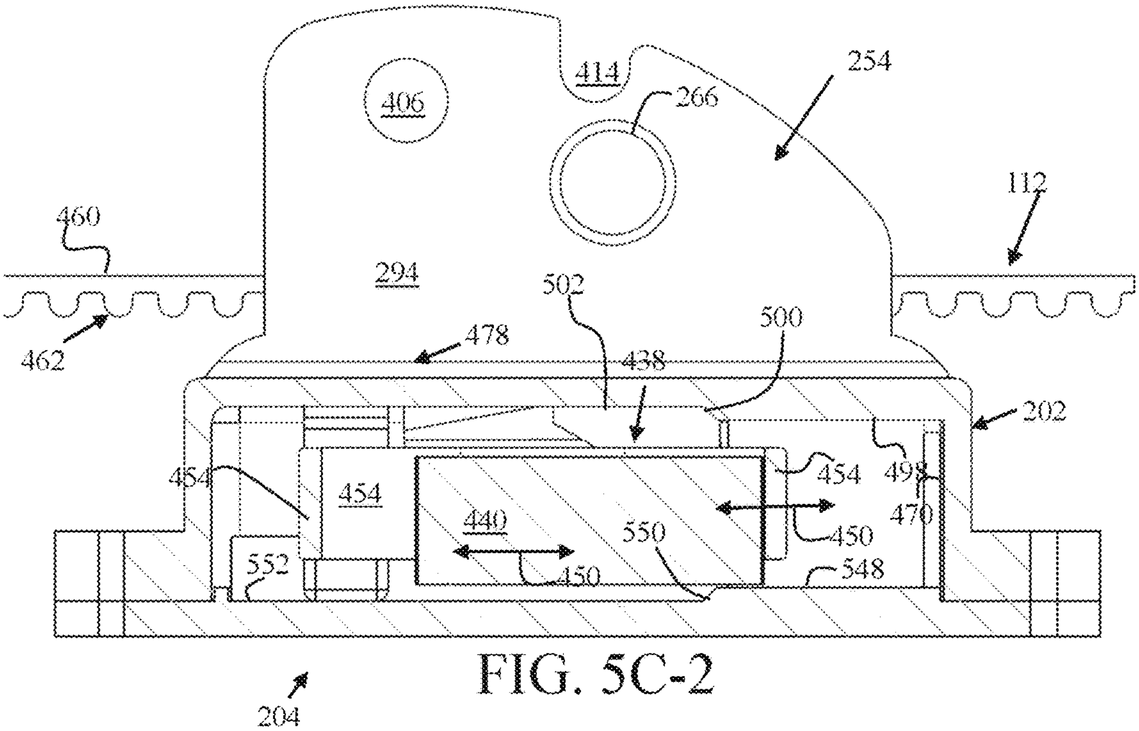
Figures 3, 5C:
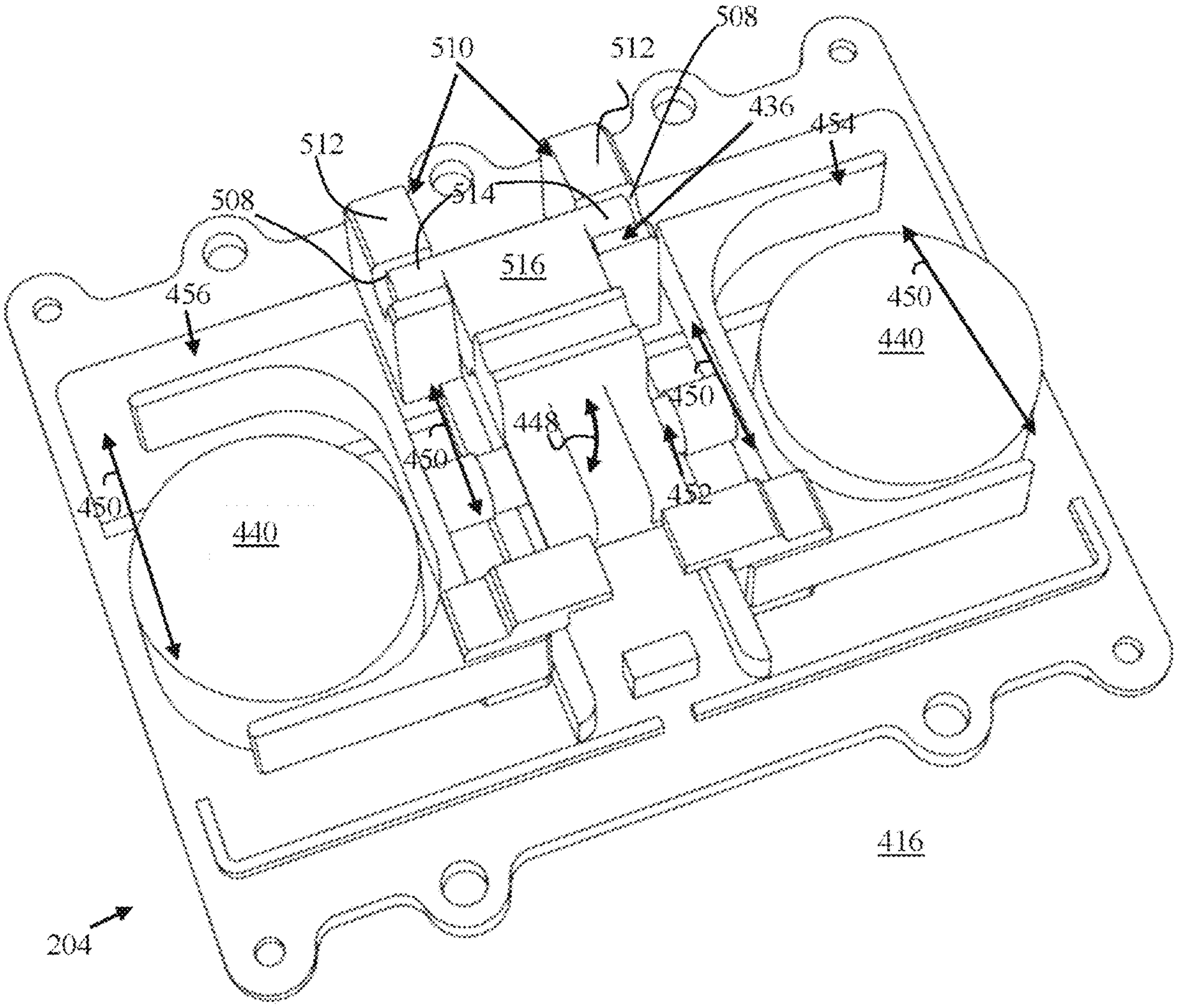
Figures 1, 5D:
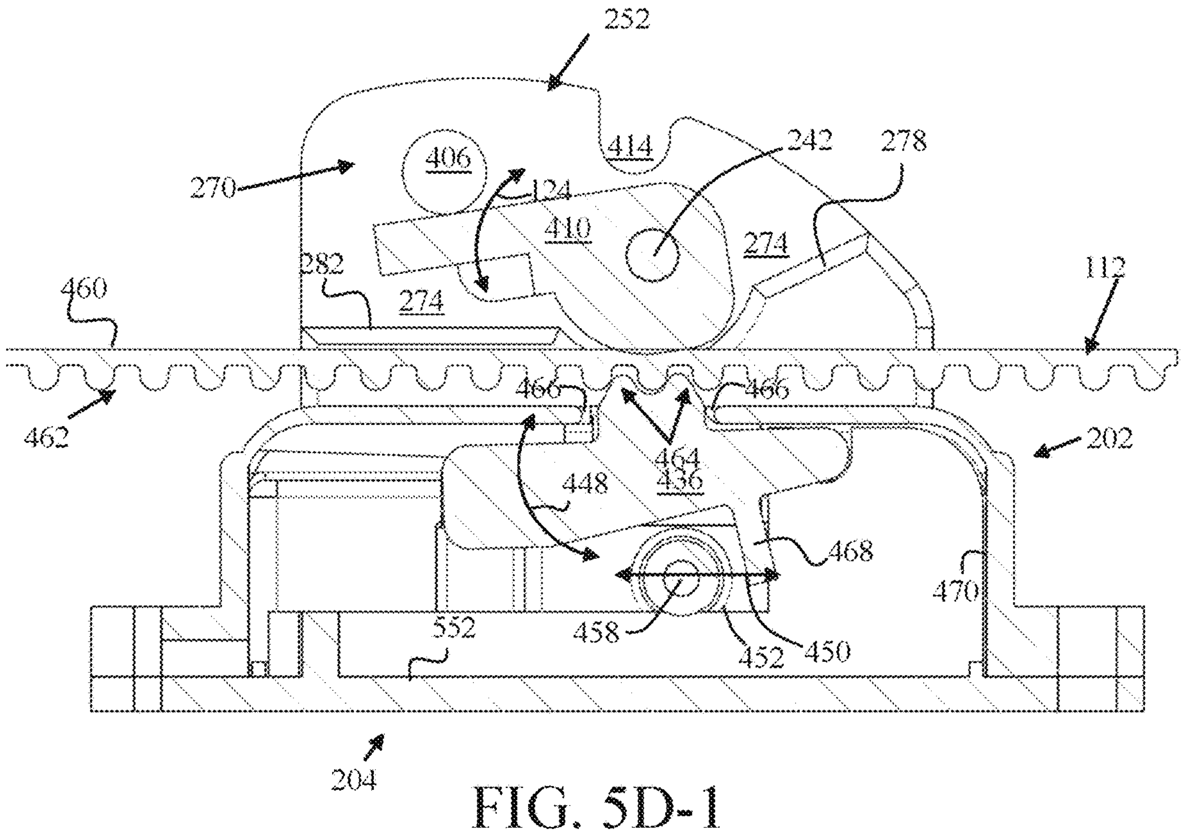
Figures 2, 5D:
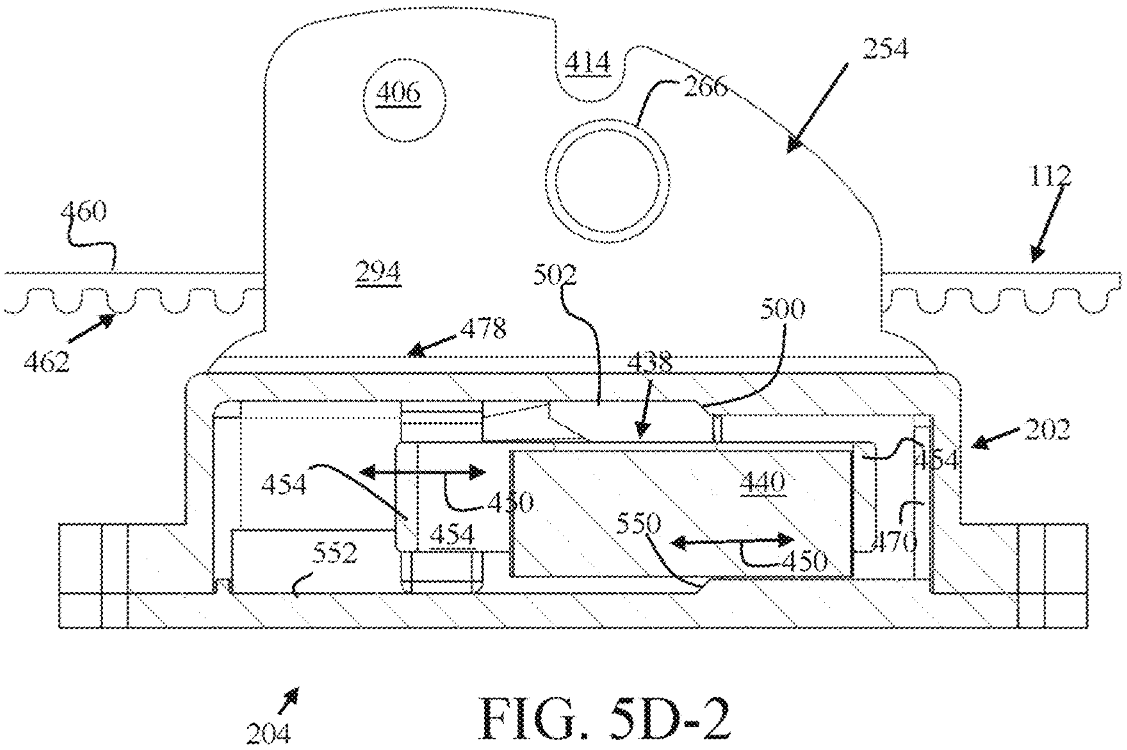
Figures 1, 5E:
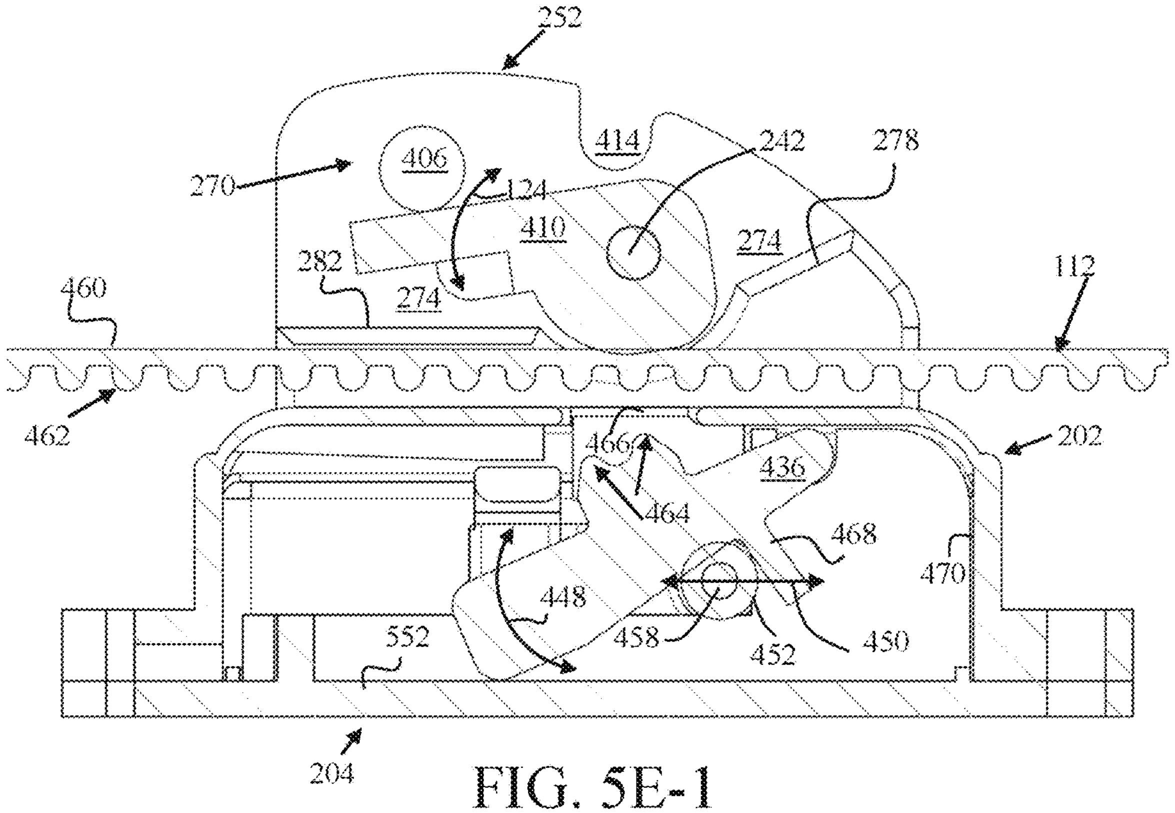
Figures 2, 5E:
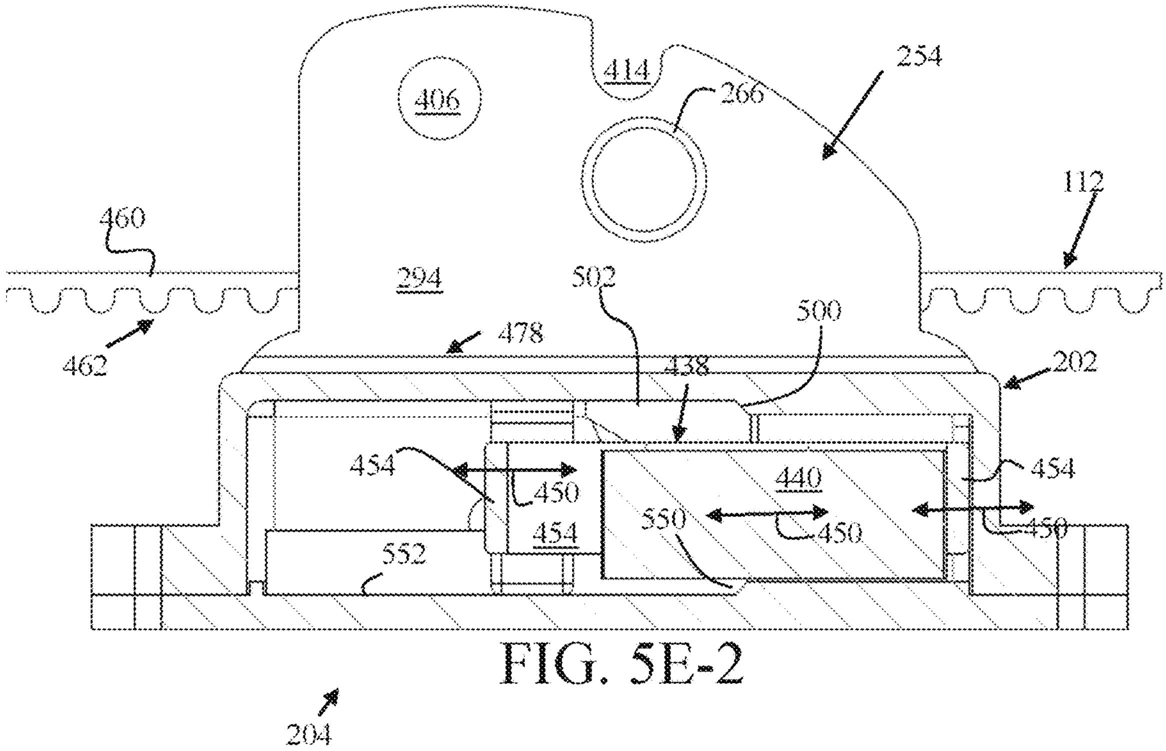
Figures 3, 5E:
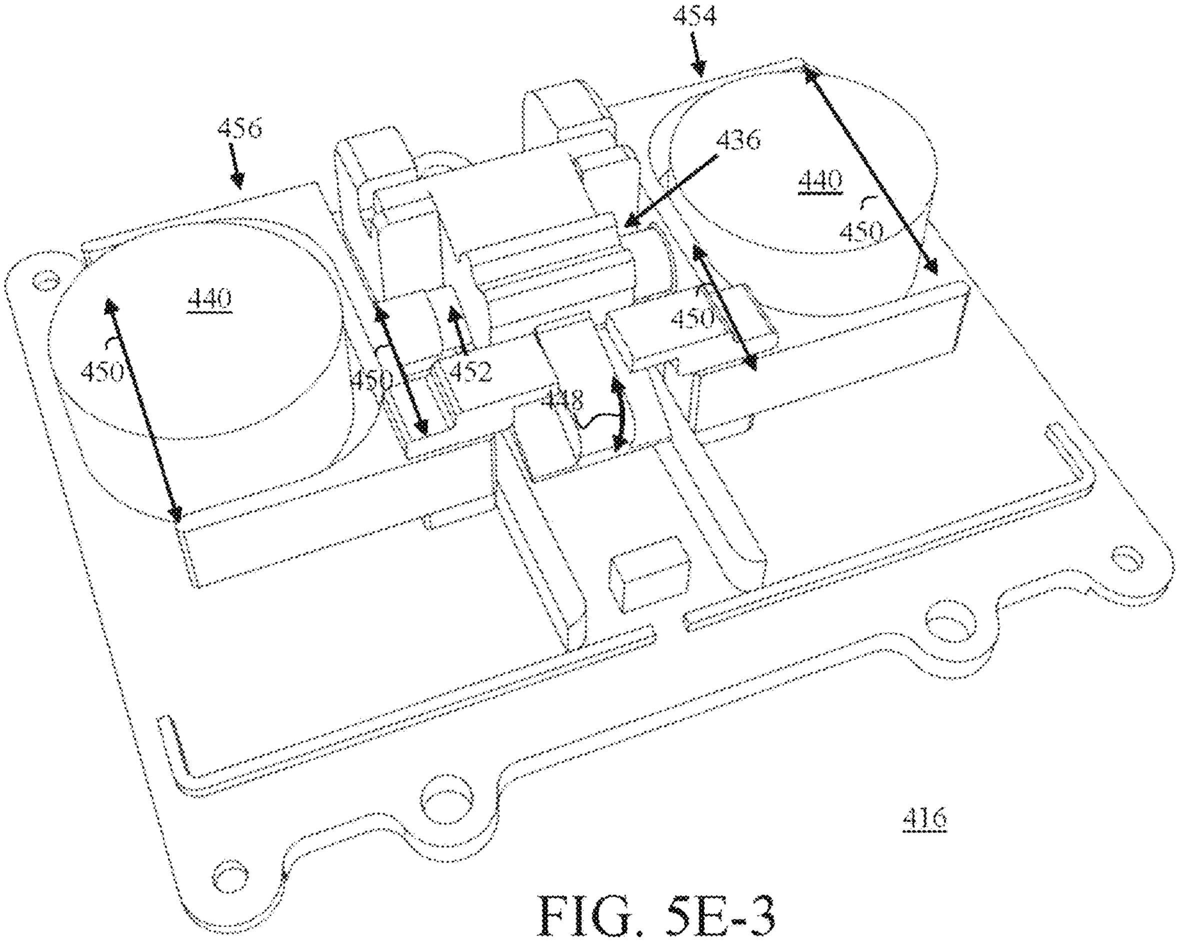
Figures 1, 5F:
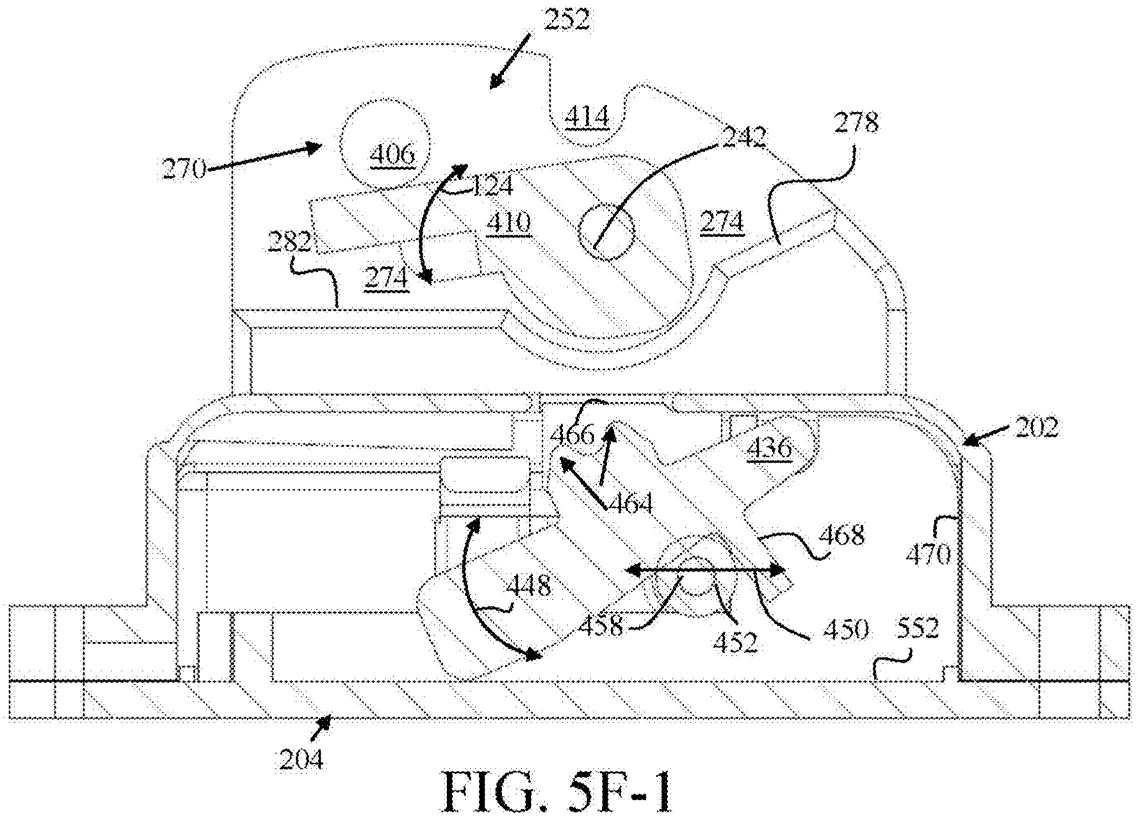
Figures 2, 5F:
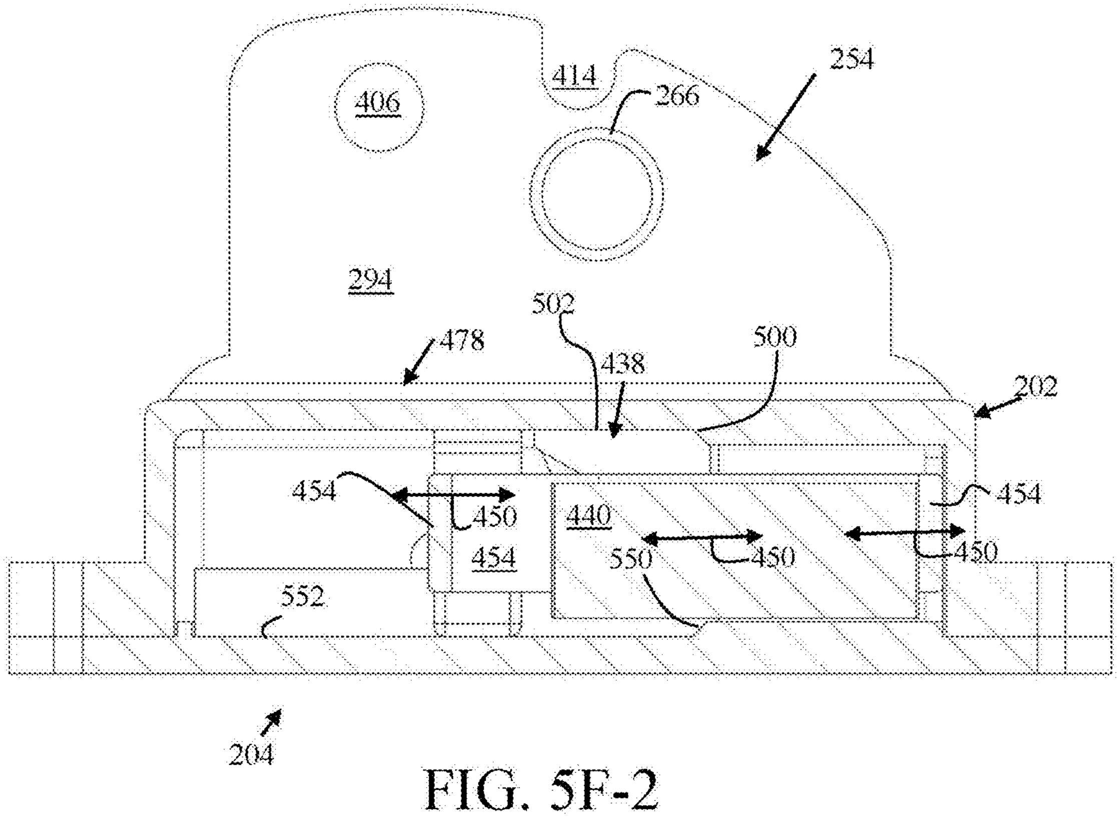
Figures 2, 5G:
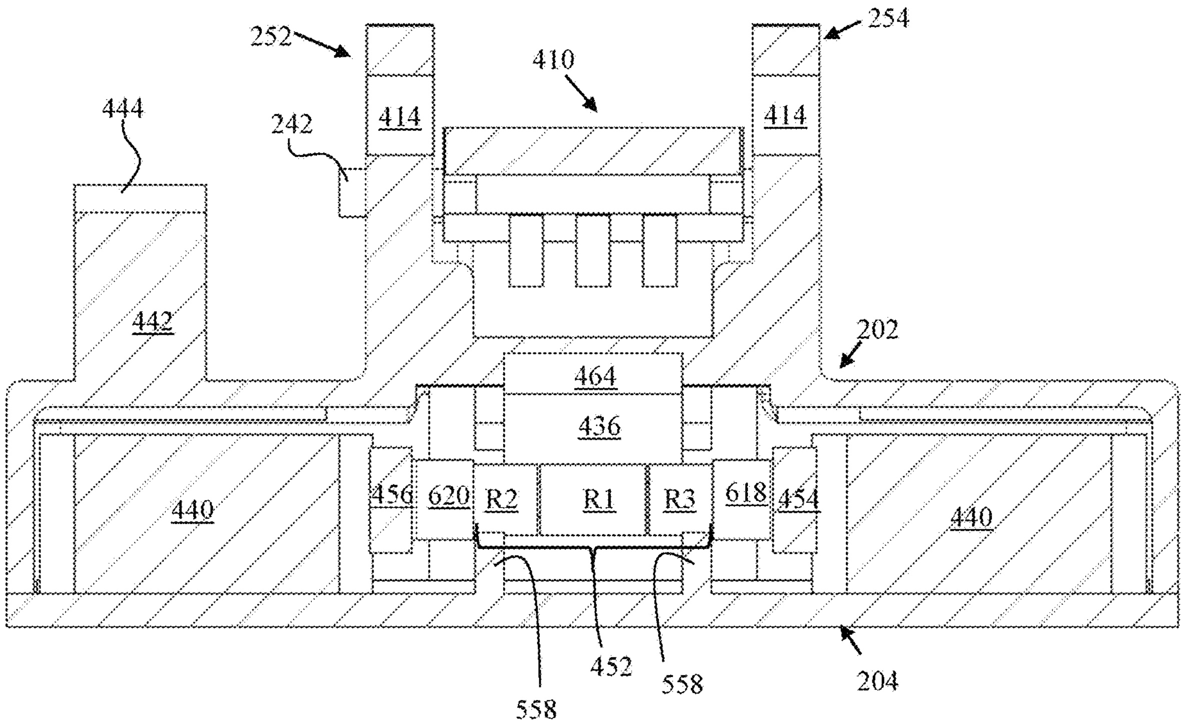
Figures 1, 5G:
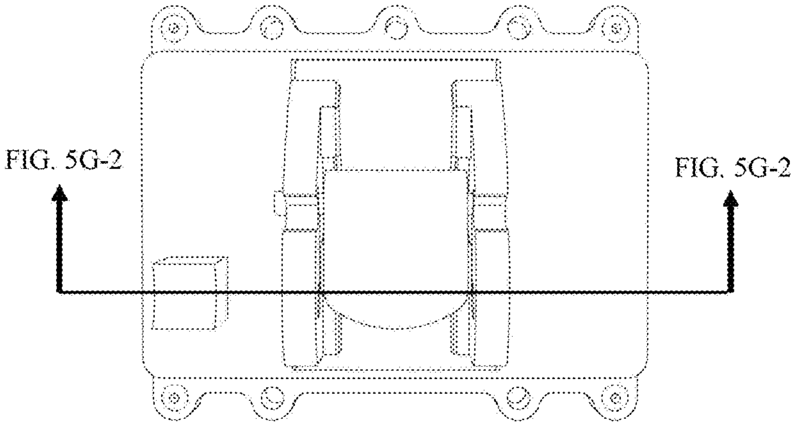
Figures 2, 5H:
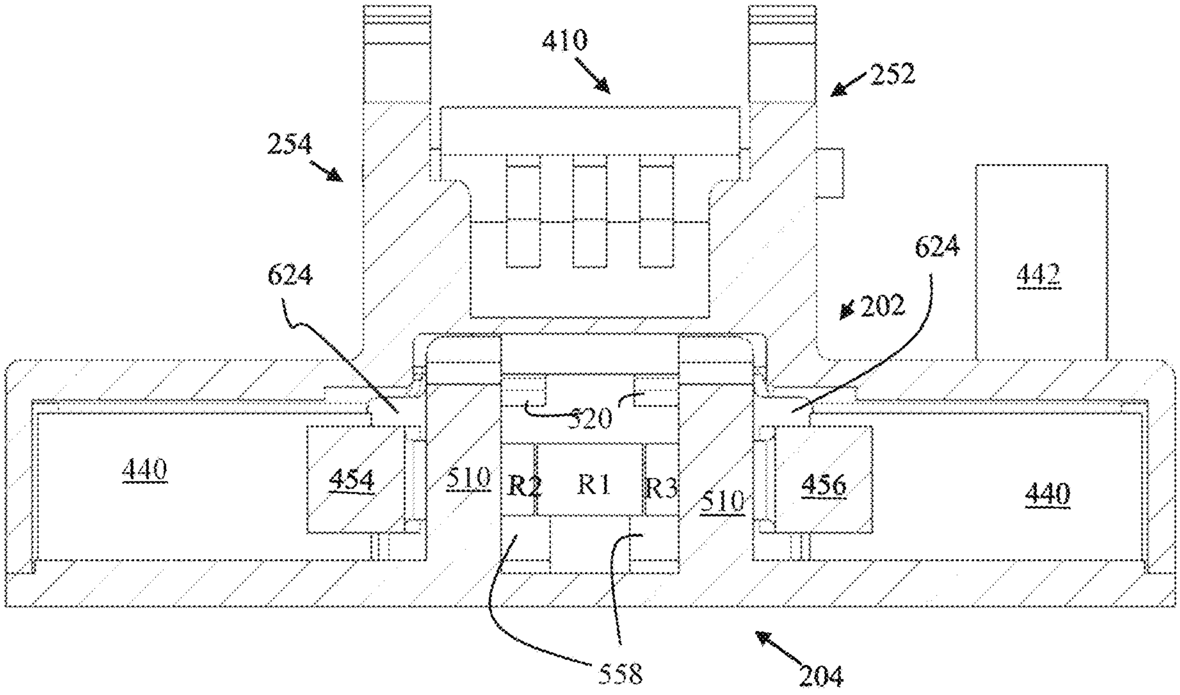
Figures 1, 5H:
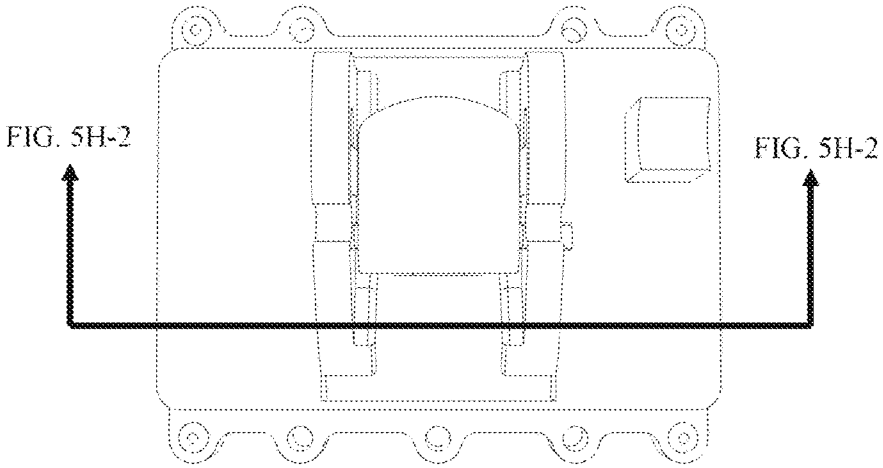
Figures 1, 5I:
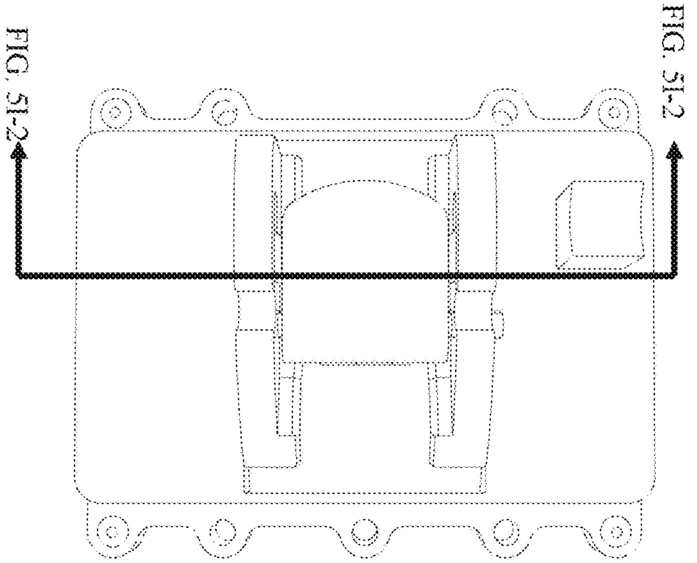
Figures 2, 5I:
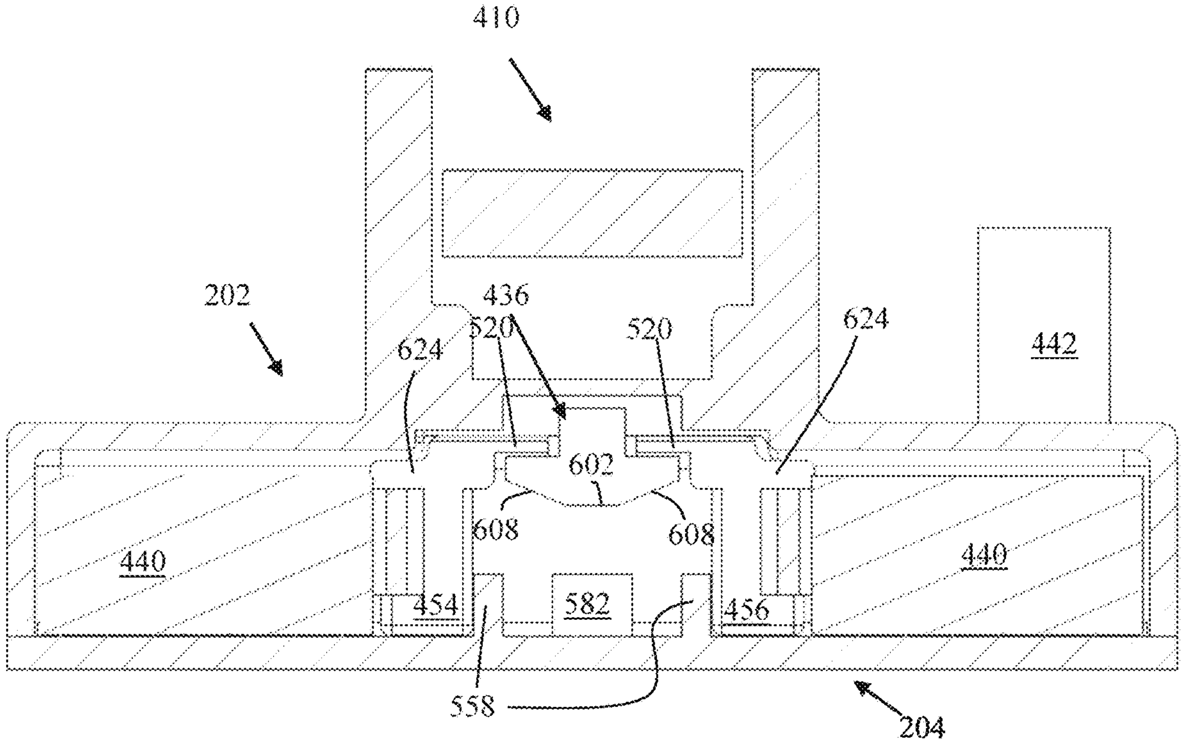

FIGS. 5B-1 to 5B-3 illustrate retainer member 110 at rest or normal vertical orientation, with first engagement assembly 206 at a hold position and second engagement assembly 416 at a hold position.

As illustrated, first engagement assembly 206 is external to retainer member 110, and second engagement assembly 416 is internal to retainer member 110, with a serrated section 464 of internal engagement member 436 of second engagement assembly 416 extending out of an opening 466 of retainer member 110 to engage or interlock with second or serrated side 462 of adjusting member 112.

Adjusting member 112 is positioned between external engagement lever 410 and internal engagement member 436. Accordingly, external engagement lever 410 is operative on a first or non-serrated side 460 of adjusting member 112, and internal engagement member 436 is operative on second or serrated side 462 of adjusting member 112.

As detailed in FIGS. 5B-1 to 5B-3, internal engagement member 436 is maintained at its hold or engagement position against second or serrated side 462 of adjusting member 112 by bushings (hereinafter rollers) 452 on crossbar 458 of actuator assembly 438.

Rollers 452 on crossbar 458 of actuator assembly 438 are maintained at hold position by the two weighted mass 440 that push against the pair of laterals, generally U-shaped impact structures 454 and 456 that are connected together by crossbar 458.

As detailed in FIGS. 5C-1 to 5D-2, as retainer member 110 is moved toward the tilt position to first orientation to allow to empty bin 104, internal engagement member 436 commences to move along reciprocating path 448, moving away from its hold or engagement position against second or serrated side 462 of adjusting member 112 as rollers 452 on crossbar 458 of actuator assembly 438 roll away along path 450.

Rollers 452 move away from hold position by the two weighted mass 440 that push against the pair of laterals, generally U-shaped impact structures 454 and 456 that are connected together by crossbar 458.

The impacting force of weighted mass 440 against impact structures 454 and 456 allows rollers 452 (and hence, crossbar 458) to roll away from underneath internal engagement member 436.

As detailed in FIGS. 5E-1 to 5F-3, when retainer member 110 is at a first orientation to allow bin 104 to empty, internal engagement member 436 moves along reciprocating path 448 to its release position. That is, internal engagement member 436 completely moves away from opening 466 and is fully disengaged from adjusting member 112.

Internal engagement member 436 moves to its release position when rollers 452 on crossbar 458 of actuator assembly 438 are moved along path 450 due to the impacting force of weighted mass 440 against impact structures 454 and 456.

As further illustrated, the momentum and the movement of rollers 452 (and hence, crossbar 458), including the entire actuator assembly 438 is stopped when impact structures 454 and 456 forcefully strike against walls 470 of cover 202.

Further, the momentum and the movement of rollers 452 (and hence, crossbar 458), including the entire actuator assembly 438 is fully experienced by internal engagement member 436 when the rollers on the crossbar 458 forcefully strike against secondary release surface (or push plate) 468 of internal engagement member 436.

The impact of the striking force of rollers on crossbar 458 against plush plate 468 of internal engagement member 436 ensures that internal engagement member 436 is at release position when retainer member 110 is at the first orientation to allow bin 104 to empty.

As shown in FIGS. 5A to 5F-2, throughout the entire process of disengagement of internal engagement member 436 from adjusting mechanism 112, external engagement lever 410 may remain in its locked or hold position.

FIGS. 5G-1 to 5I-2 are non-limiting, exemplary illustration of the retainer member shown in FIGS. 1A to 5F-2 and their respective sectional views in accordance with one or more embodiments of the present invention. Details of the sectional views shown in FIGS. 5G-1 to 5I-2 are described in view of each of the components individually illustrated in FIGS. 6A to 10H.

FIGS. 6A to 6D are non-limiting, exemplary illustrations of the various views of a cover of the retainer member of the retainer mechanism shown in FIGS. 1A to 5I-2 in accordance with one or more embodiments the present invention. As illustrated in FIGS. 1A to 6D, retainer member 110 is comprised of a housing assembly having a cover 202 and base plate 204.

Cover 202 is comprised of an exterior side 472 having lateral support walls 252 and 254, interior facing sides 270 and 272 of which include lateral projections 474 and 476 that function to center adjusting mechanism 112 and function as limiters to prevent external engagement assembly 206 from moving too far to interfere with insertion of adjustment member 112.

More specifically, exterior side 472 of cover 202 includes a raised base 478 and lateral supports 252 and 254 that protrude at an angle (generally vertically) from base 478.

Lateral supports 252 and 254 in combination with base 478 define a channel 218 through which adjusting member 112 is passed and within which serrations 462 of adjusting member 112 engage with serrations 464 of internal engagement member 436 extending out of opening 466 of base 478.

It should be noted that serrations 462/464 may comprise of different configurations, non-limiting examples of which may include a smooth wave profile (e.g., corrugations) or, alternatively, saw-tooth profile or other configurations.

Exterior side 472 of cover 202 includes a pair of mounting flanges 480 and 482 that include a first set of peripheral openings (securing openings) 486 for securing the cover 202 onto base-plate 204.

Cover 202 also includes a second set of peripheral openings (installation openings) 484 for installing retainer member 110 onto a bin 104. It should be noted that location and count of installation or securing openings 484 and 486 may be varied.

It should be noted that the installation and securing methods or mechanism may include or use magnets, glue, spring clip or others to fasten retainer member 110 onto a bin 104 or fasten cover 202 onto base plate 204 instead of using fasteners. Other mechanism for connecting retainer member 110 onto bin 104 is contemplated, including, for example, bin 104 and base-plate 204 having complementary interlocking features that interlock or snap into each other without the use of fasteners (e.g., recess/projection connections). In fact, any well-known mechanism or method for properly securing retainer member 110 onto bin 104 may be used.

Lateral supports 252 and 254 are used to support external engagement assembly 206. Lateral supports 252 and 254 include a pair of openings 264 and 266 that establish a pivot point 320 for external engagement assembly 206, with openings 264 and 266 aligned with opening 322 of external engagement lever 410 to receive fastener (or pivot pin 242).

Lateral supports 252 and 254 have a first side 270 and 272 (inner facing sides that face channel 218) that includes recesses 274 and 276 that define first limiters 278 and 280 at insertion side 208 and second limiters 282 and 284 at extraction side 210. As detailed below, limiters 278, 280, 282, 284 limit the movement of external engagement lever 410 at its extreme hold or release positions. Lateral supports 252 and 254 have a second sides 292 and 294 (outer facing sides in relation to channel 218) that have a generally flat surface.

Second limiter 282 and 284 are alignment supports that generally limit the motion of external engagement lever 410 at hold position while supporting an apex 248 of a protruded (or cam) portion 238 of external engagement lever 410 of external engagement assembly 206 aligned in appropriate relative position in a sliding contact with top surface 460 of adjusting member 112 to impart pressure thereon and move adjusting member 112 into a tight engagement with serrations 464 of an internal engagement member 436 (extended out of main opening 466 of cover 202), with cam portion 238 providing maximum pressure on top surface 460 of adjusting member 112. It should be noted that apex 248 is generally directly underneath or below opening 322 (pivot point 320) of external engagement lever 410.

Recesses 274 and 276 at inner sides 270 and 272 of lateral supports 252 and 254 have sufficient depth to support and facilitate mounting of external engagement assembly 206, with contour of recesses 274 and 276 generally following a profile (or contour) of cam portion 238 of external engagement lever 410 of external engagement assembly 206.

Recesses 274 and 276 accommodate the width of distal end of external engagement lever 410 (which is wider than the width of channel 218), while limiting width of channel 218 at a span that appropriately guides insertion of adjusting member 112 to prevent lateral motion of adjusting member 112 during insertion and removal. Accordingly, cam portion distal end of external engagement lever 410 is made sufficiently wide for added strength, which is accommodated by recesses 274 and 276.

Further, recesses 274 and 276 enable width of channel 218 to be of sufficiently narrow span to receive and release adjusting member 112 without much lateral motion, further facilitating unhindered or unobstructed insertion and release of adjusting member 112. Limiting or preventing lateral motion of adjusting member 112 while being inserted or released prevents improper engagement of serrations 462 and 464. Therefore, channel 218 width operates as a guide or alignment feature for insertion and removal of adjusting member 112.

It should be noted that recesses 274 and 276 (which are mirror images and identical and located on inner side 270 and 272 of lateral supports 252 and 254) do not take away from the overall strength of lateral supports 252 and 254 because a width of lateral supports 252 and 254 may be extended (made wider or thicker) at or from outer sides 292 and 294 (outside of channel 218) as much as needed to compensate for any potential or possible strength that may be lost due to excavated parts that constitute recesses 272 and 274 (if any). Therefore, lateral supports 252 and 254 may be made as thick as desired at or from outer sides, while maintaining all other features (example, channel-base width) as described above.

Recesses 272 and 274 define limiters 278 and 280 at insertion side 208 and limiters 282 and 284 at extraction sides 210 of lateral supports 252 and 254, which limit a range of motion of external engagement lever 410 from a fully open (release) position to a fully latched (or hold) position.

The hold position of external engagement lever 410 is at a first angle (e.g., generally parallel base 478 of cover 202 of retainer member 110), and release or open position is generally a rotation to a second angle (generally passed, but near perpendicular to base 478 of cover 202 of retainer member 110). Accordingly, insertion side 208 limiters 278 and 280 have a higher height that is different than a height of extraction side 210 limiters 282 and 284, which are shorter.

Insertion side limiters 278 and 280 prevent external engagement lever 410 from rotating too far when external engagement lever 410 is at release position. When retainer member 110 is mounted onto a bin and external engagement lever 410 is at release position resting against insertion side limiters 278 and 280, external engagement lever 410 is maintained at release position due to insertion side limiter 278 and 280, which facilitate ease of insertion of adjusting member 112 by preventing external engagement lever 410 from interfering with insertion of adjusting member 112.

Extraction side limiters 282 and 284 operate to prevent external engagement lever 410 from interfering with adjusting member 112 when being removed. That is, extraction side limiters 282 and 284 limit range of motion of external engagement lever 410 to a generally parallel orientation with base 478, preventing external engagement lever 410 from having a hold position that is too far back, which would require external engagement lever 410 from being moved from hold position to release position when bin 104 is emptied.

Figure 7A:
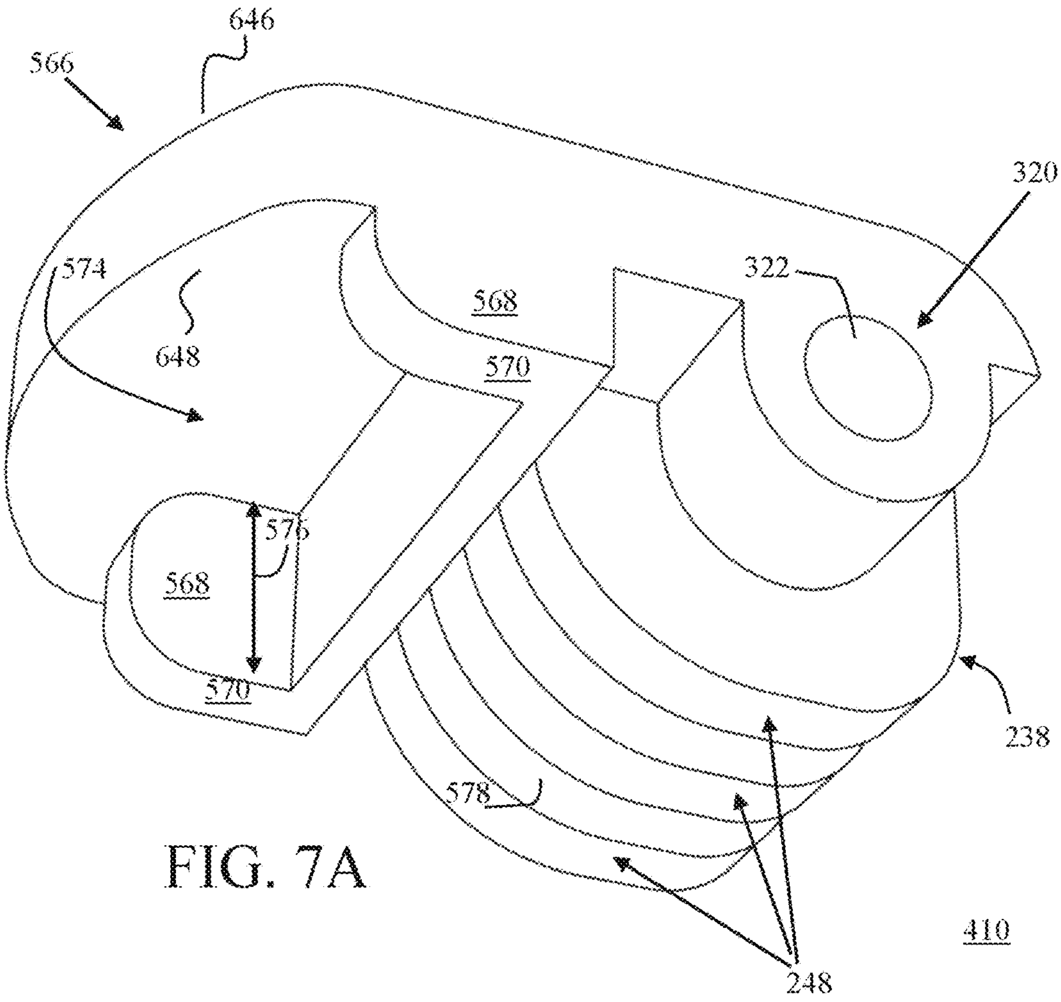
FIGS. 7A and 7B are non-limiting, exemplary illustrations of an external engagement lever of first engagement assembly in accordance with one or more embodiments of the present invention.
Figure 7B:
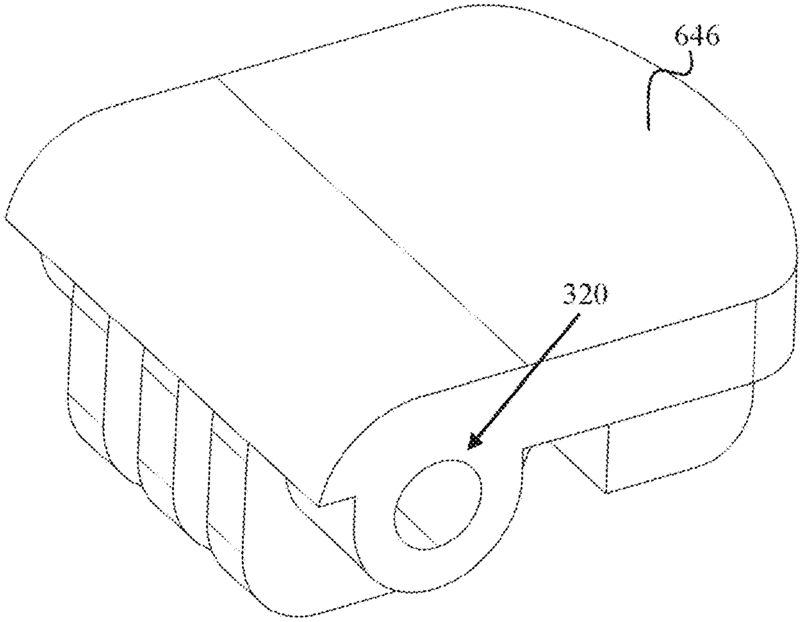
Figure 8A:
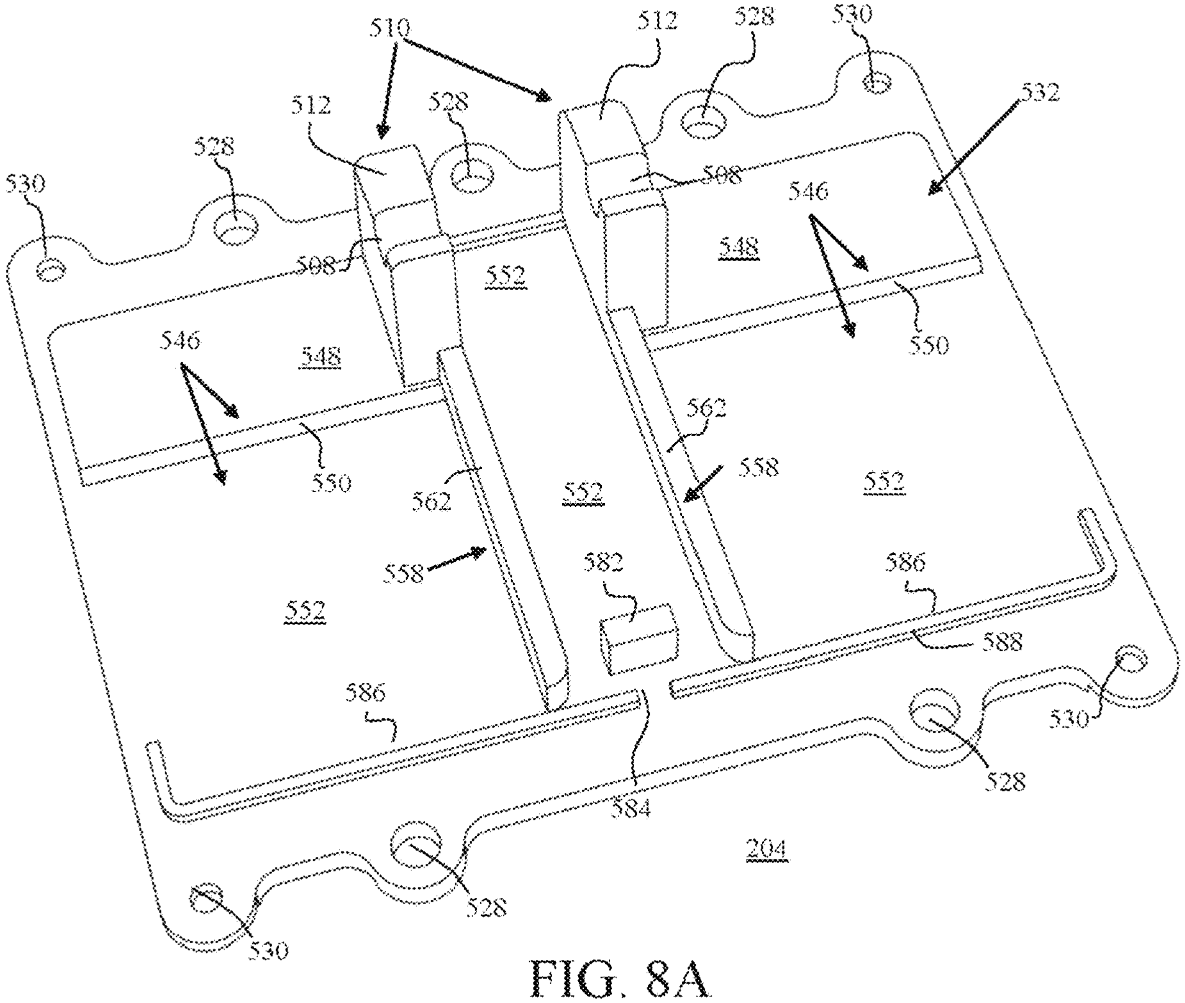
FIGS. 8A to 8D are non-limiting, exemplary illustrations of the various views of a base-plate of the retainer member of the retainer mechanism shown in FIGS. 1A to 7B in accordance with one or more embodiments the present invention.
Figure 8B:
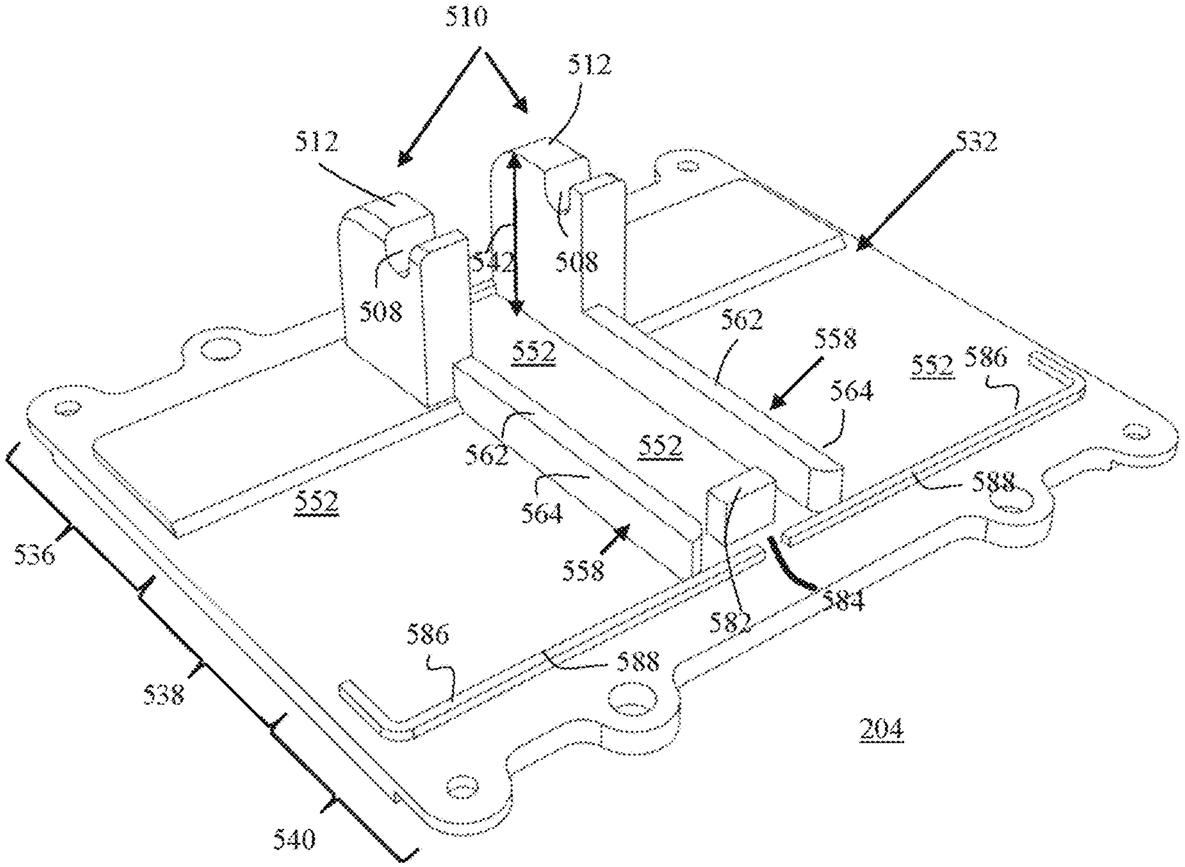
Figure 8C:
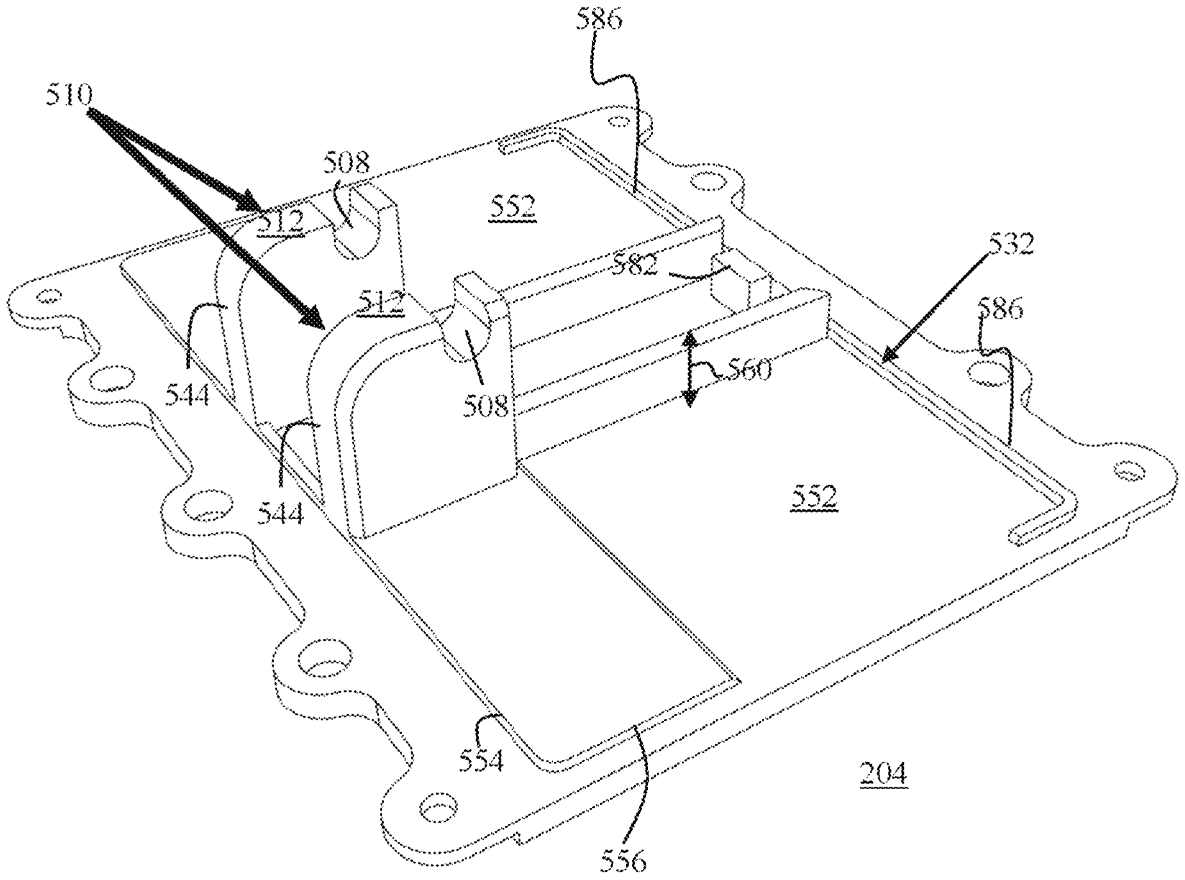
Figure 8D:
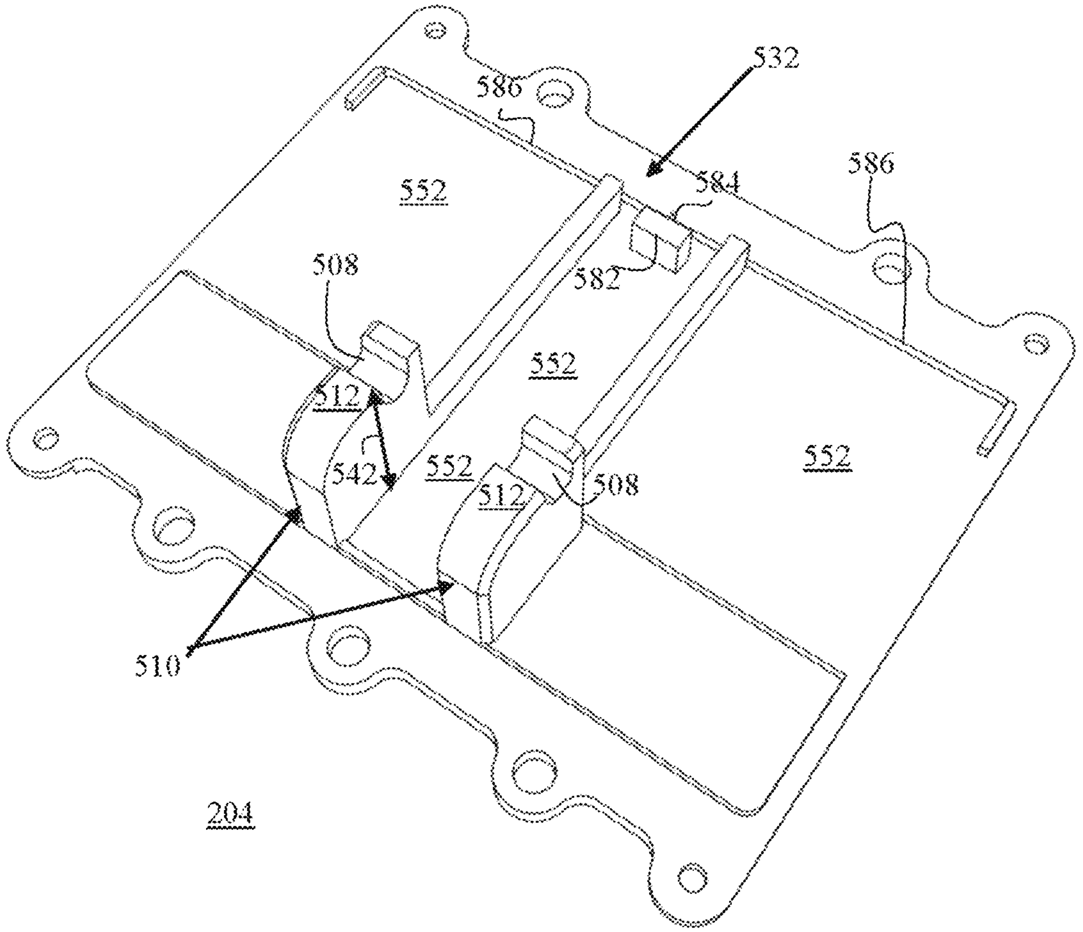
Figure 9A:
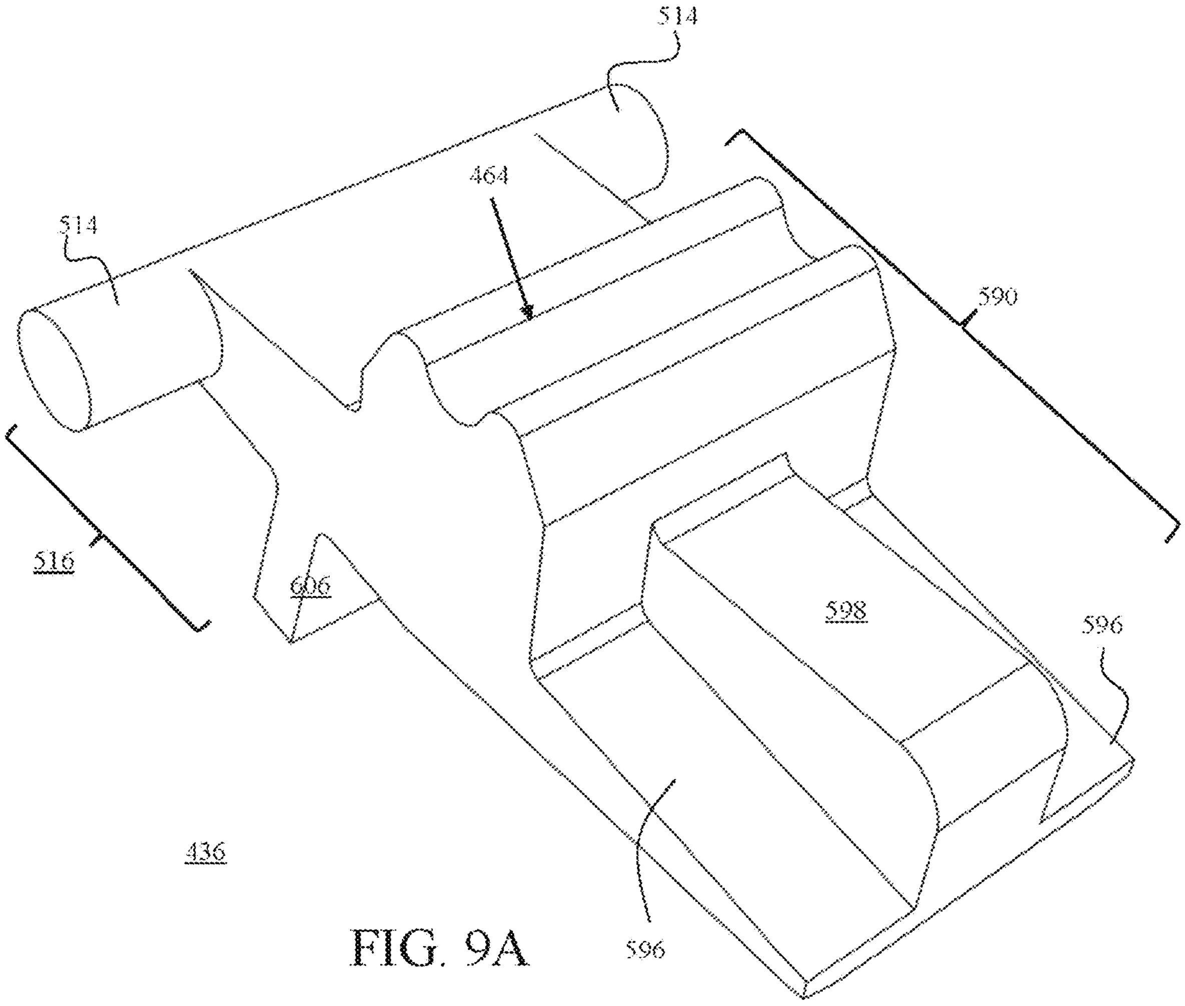
FIGS. 9A to 9E are non-limiting, exemplary illustrations of the various views of an interior engagement member of the second engagement assembly in accordance with one or more embodiments the present invention.
Figure 9B:
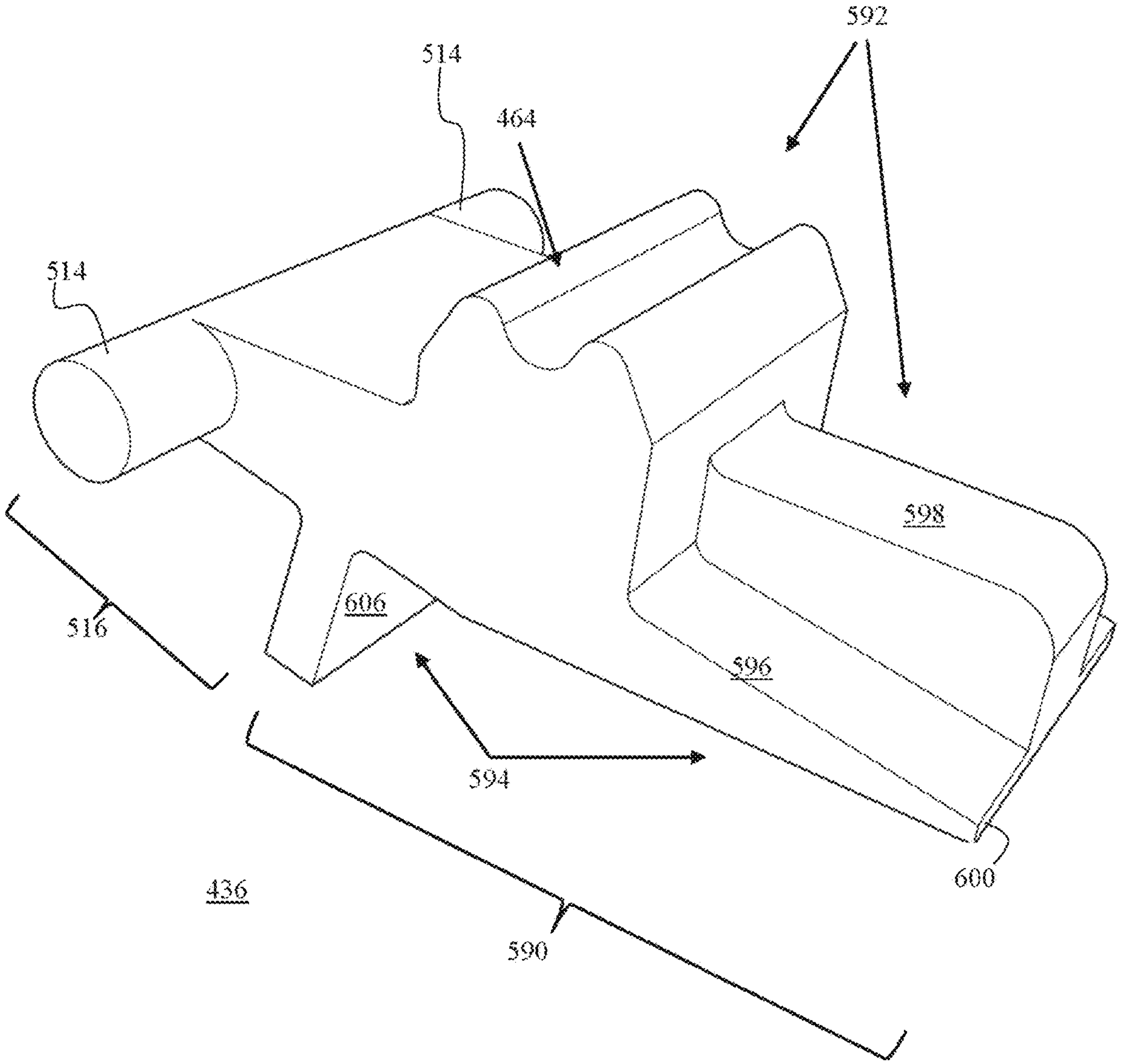
Figure 9C:
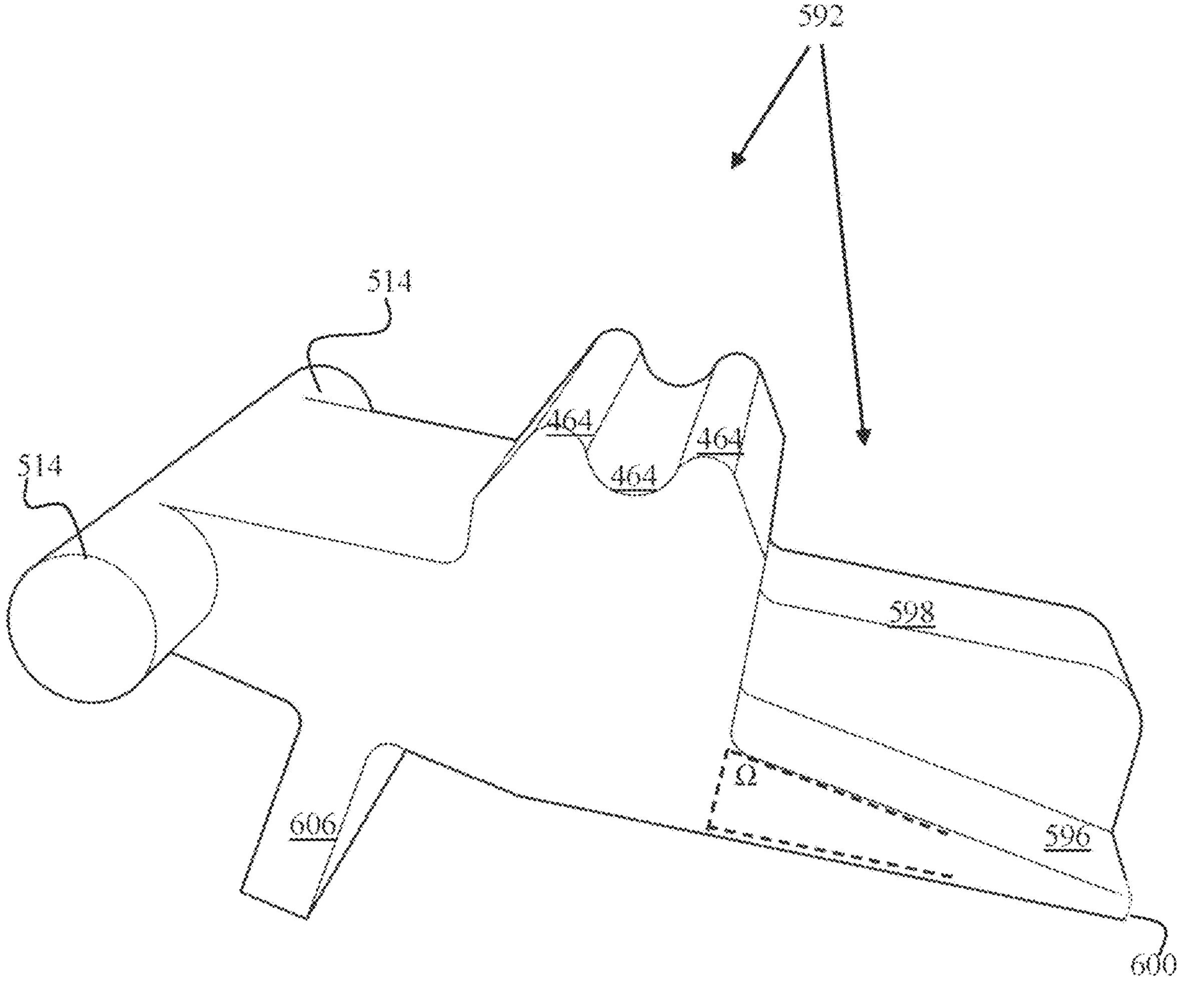
Figure 9D:
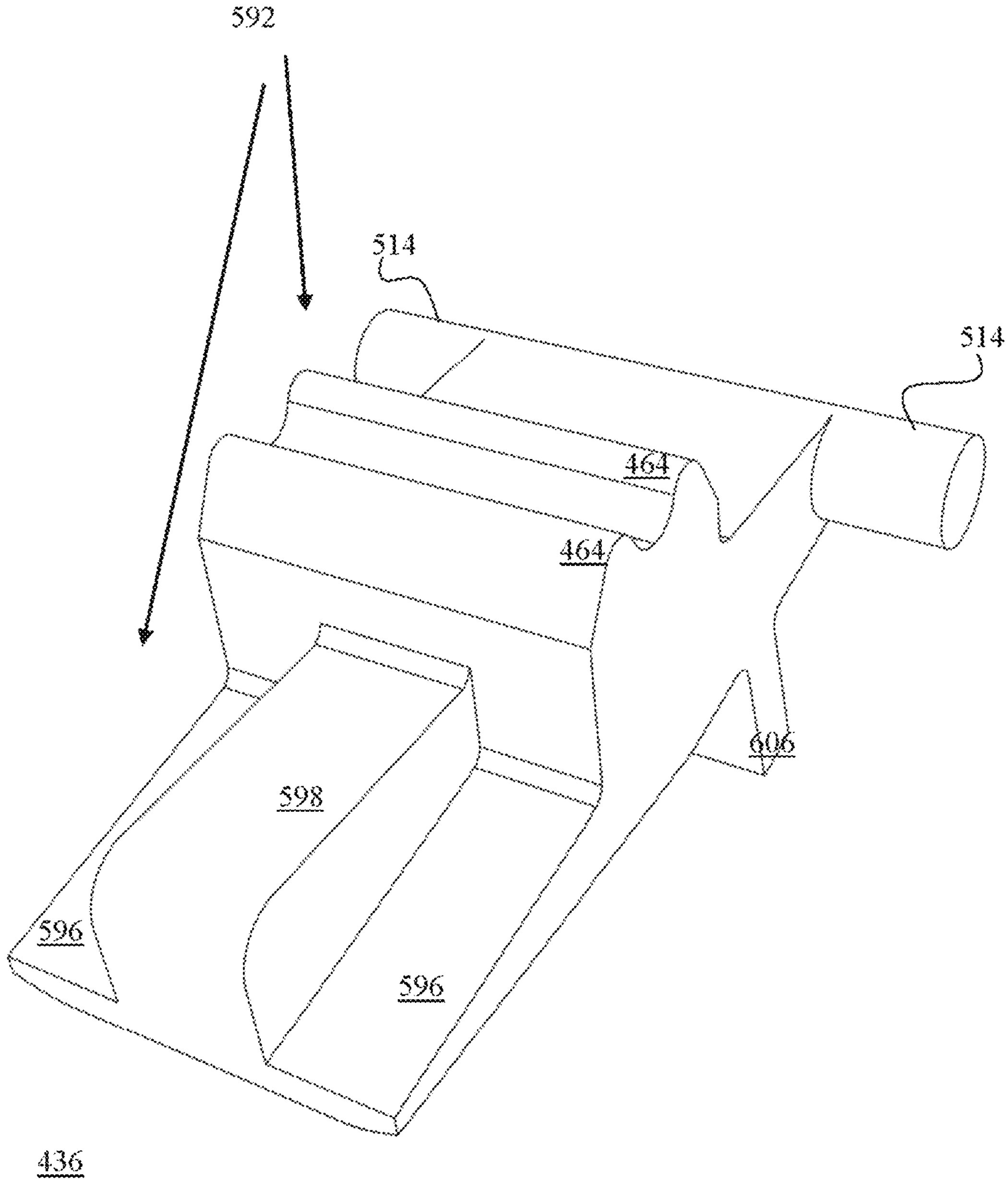
Figure 9E:
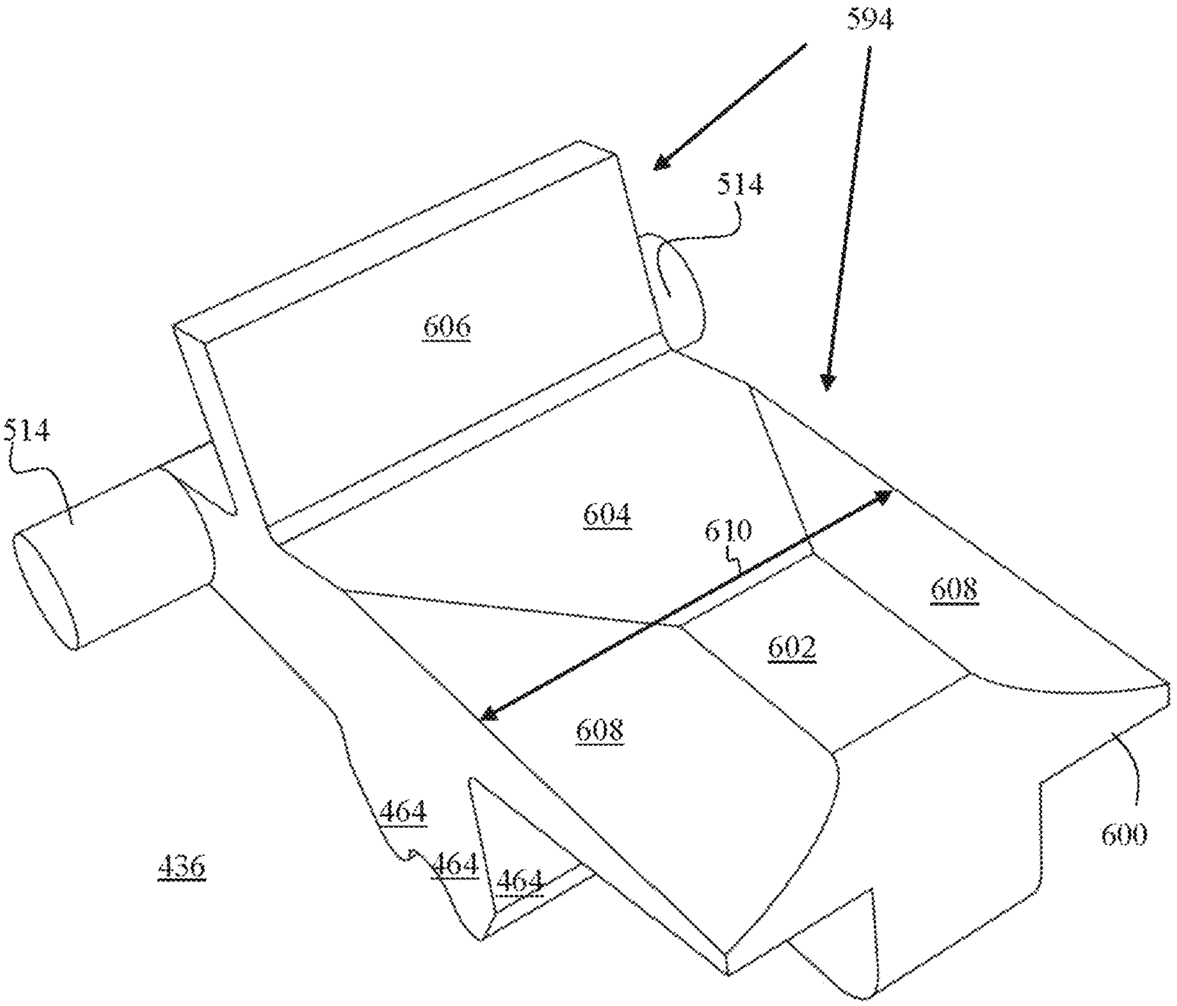

It should be noted that first limiters 278 and 280 and second limiters 282 and 284 may be eliminated from lateral supports 252 and 254 and instead, external engagement lever 410 itself may be modified to provide their functionality. That is, top and bottom surfaces of external engagement lever 410 may comprise of projections (protrusions) that will function as "built-in" limiters. For example (and as best shown in FIG. 7B), top surfaces 646 of operating end 566 of external engagement lever 410 may include first protrusions at lateral sides so that when in open position, the first protrusions would provide the same functionality as first set of limiters 278 and 280. As another example (and as best shown in FIG. 7A), bottom surfaces 648 of operating end 566 of external engagement lever 410 may include second protrusions at lateral sides so that when in closed position, the second protrusions would provide the same functionality as second set of limiters 282 and 284. As a further alternative, instead of the addition of any protrusion on bottom surface 648, elongating a height 576 of lateral extensions 568 would also provide the same functionality as second set of limiters 282 and 284.

As further illustrated, top surfaces of lateral supports 252 and 254 also include a pair of aligned recesses 414 that function as reliefs to allow for assembly of mounting plate adapter 418 onto retainer member 110 and a pair of aligned lock opening 406 for use of lock-and-key mechanism.

Exterior side 472 of cover 202 further includes backing or support 442 that projects vertically and may be used to support cylindrical body 446 of lock mechanism 404*a*. As shown and discussed above in relation to FIGS. 3A to 3I.

Figure 6A:
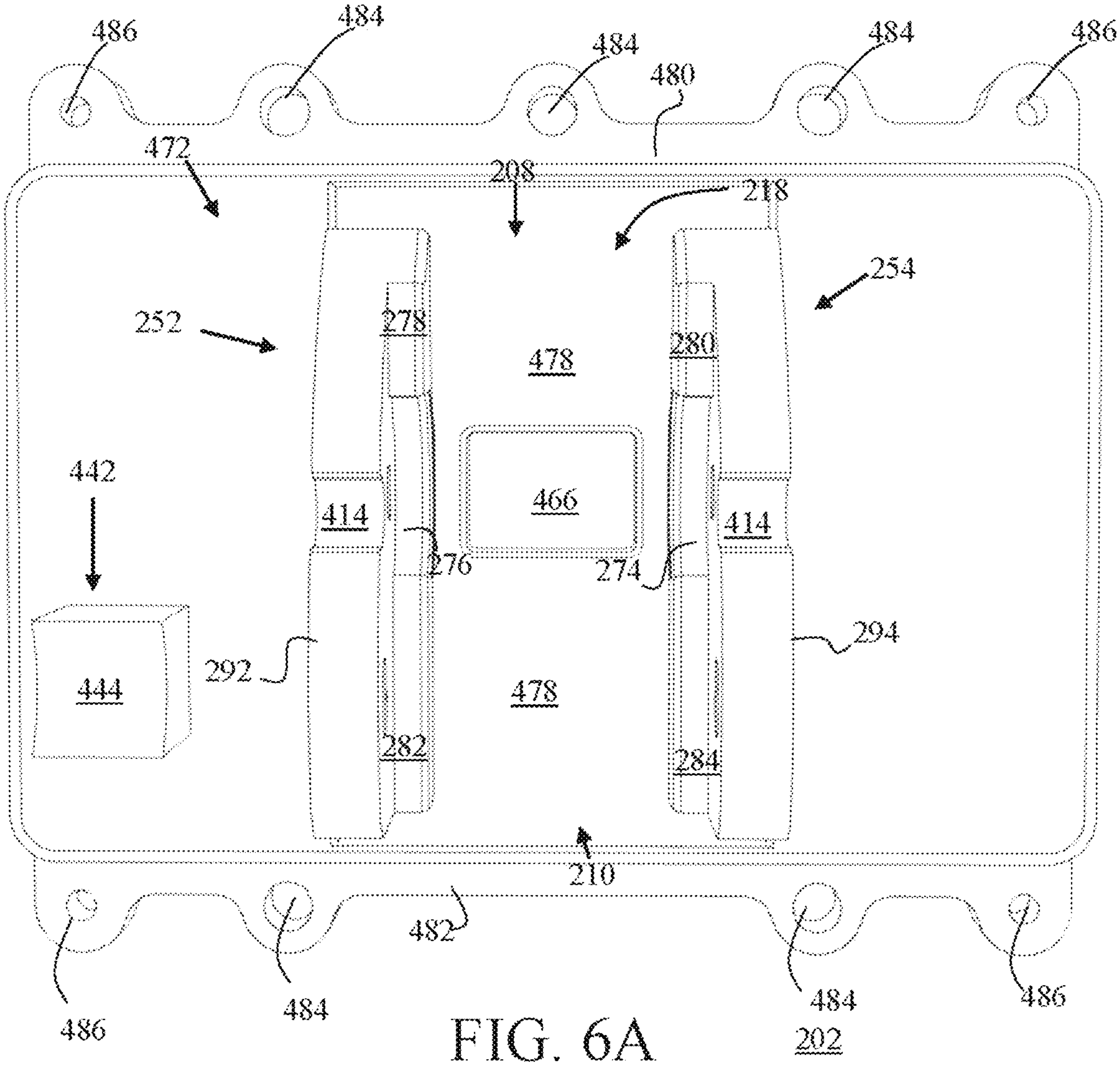
FIGS. 6A to 6D are non-limiting, exemplary illustrations of the various views of a cover of the retainer member of the retainer mechanism shown in FIGS. 1A to 5I-2 in accordance with one or more embodiments the present invention.
Figure 6B:
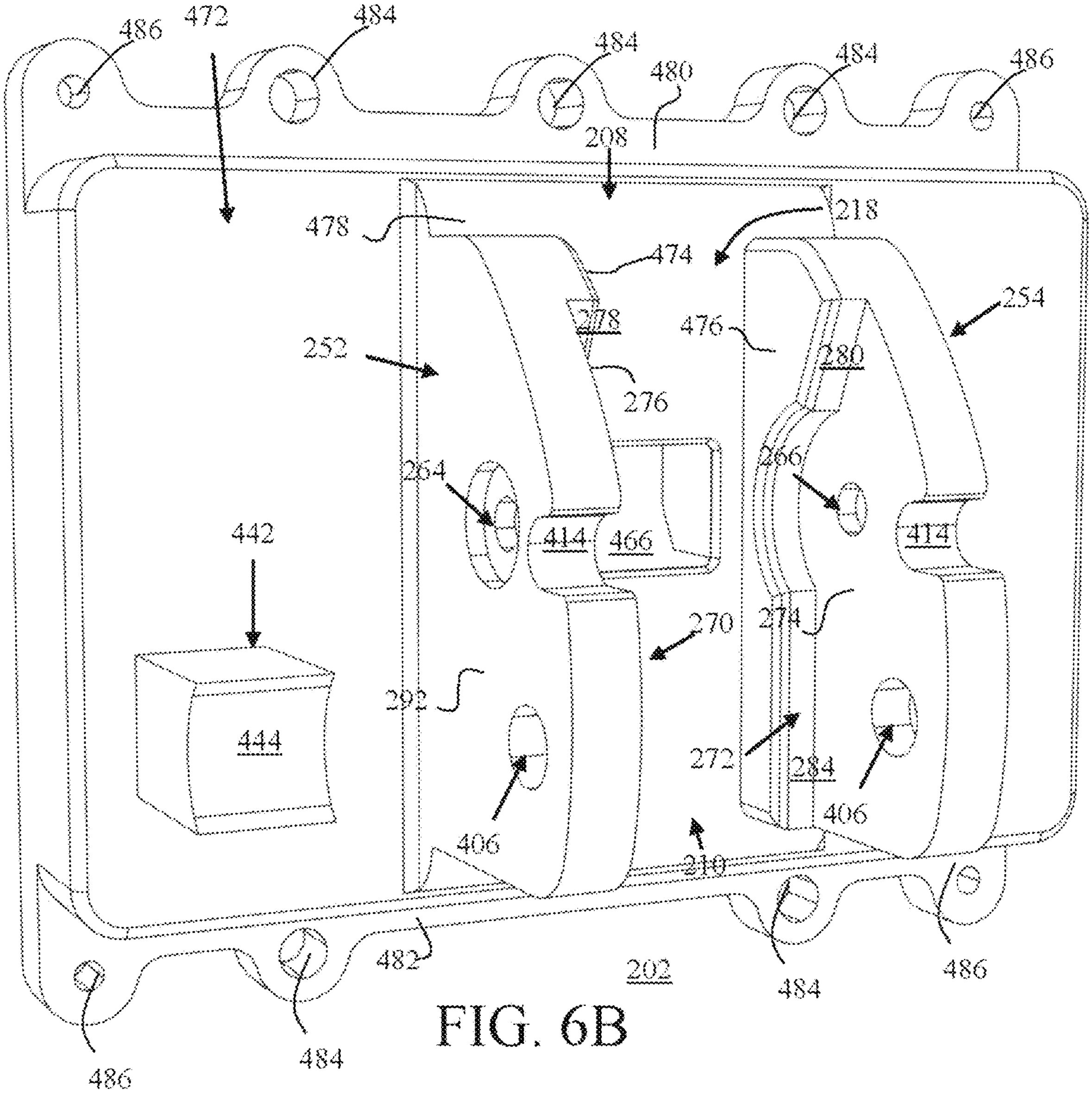
Figure 6C:
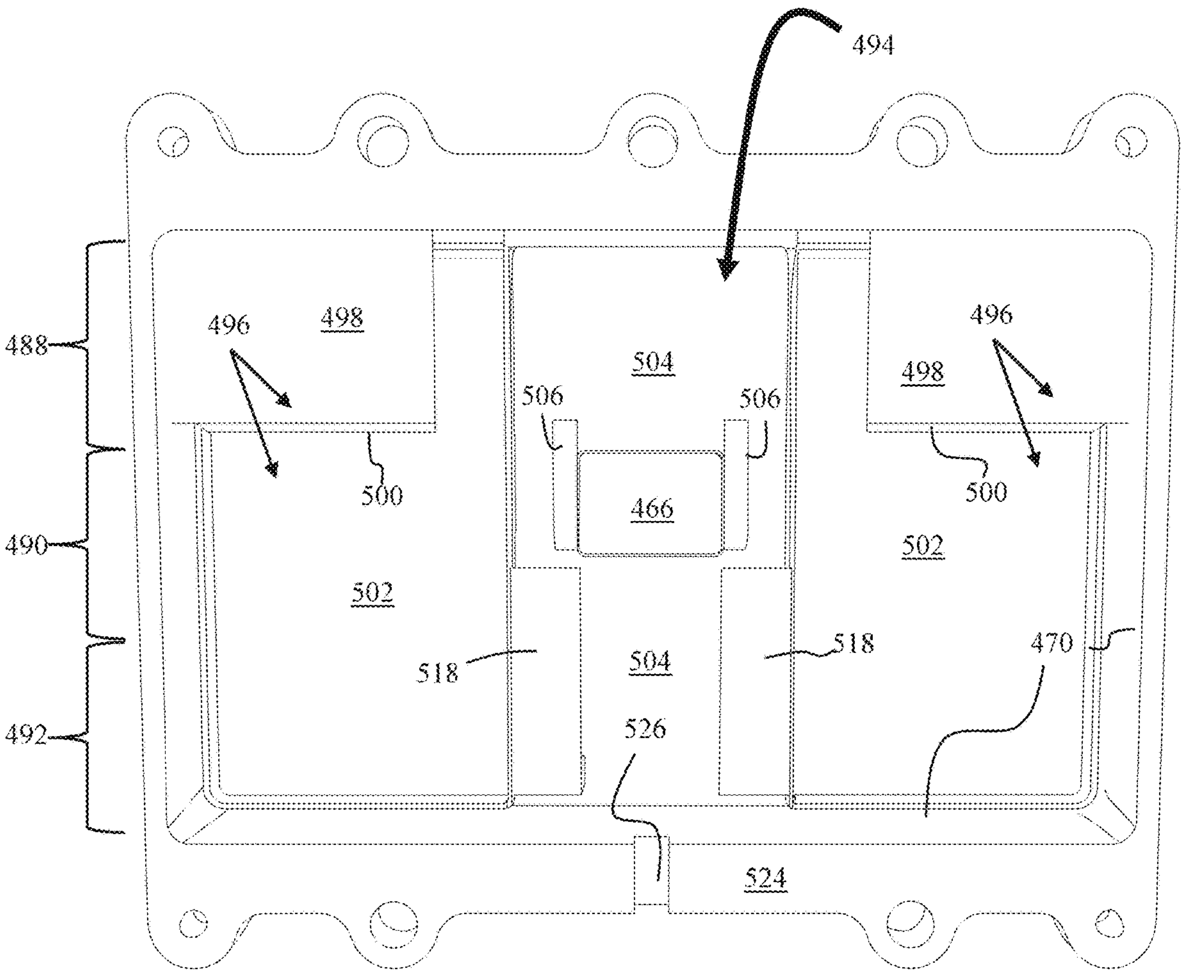
Figure 6D:
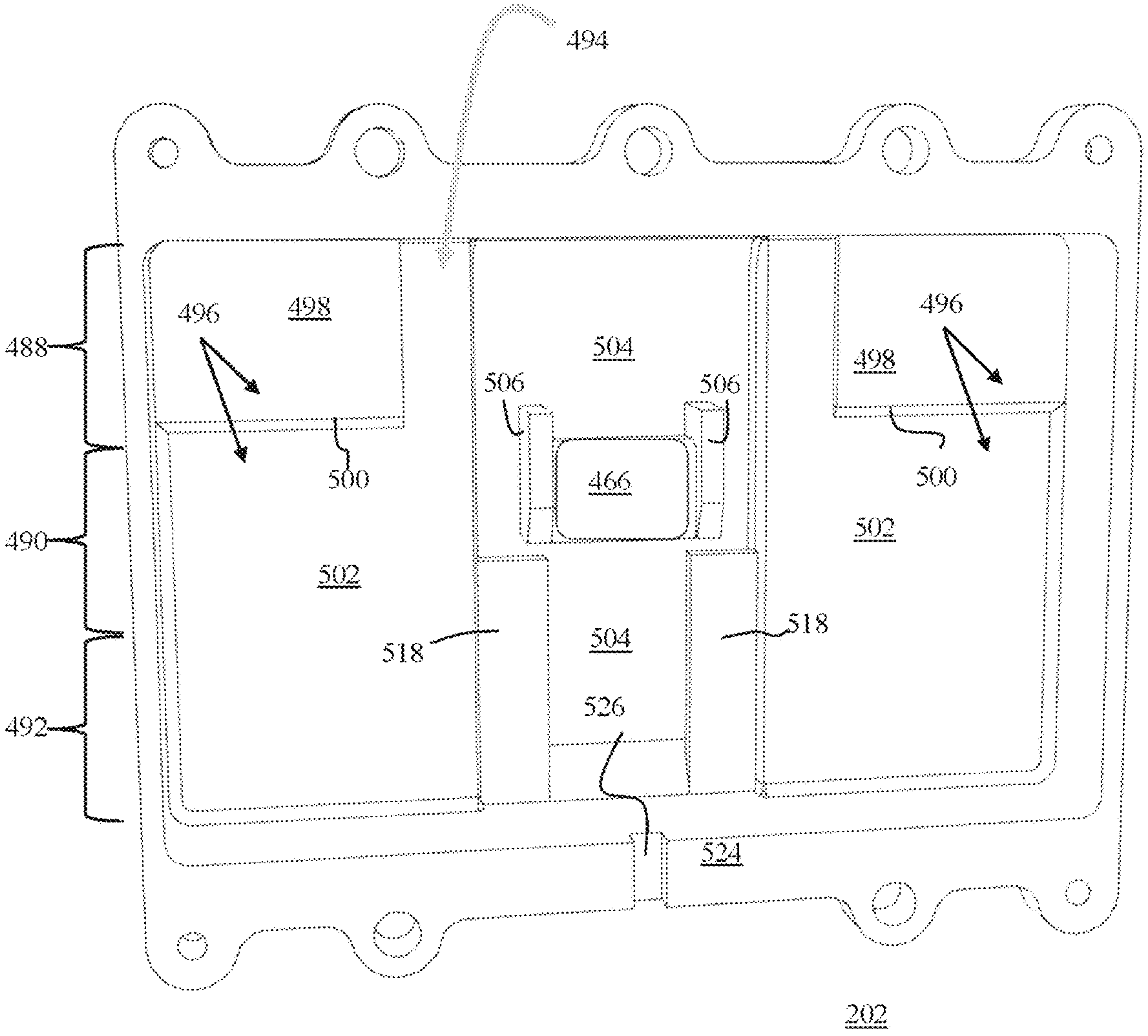

As best shown in FIGS. 1A to 6D and particularly, FIGS. 6C and 6D, cover 202 is further comprised of an interior side 494 with a first section 488, a second section 490, and a third section 492.

First section 488 includes offset, lateral planar surfaces 496 forming raised lateral platforms 498 that have beveled raised edges 500 in relation to a lowered platform 502 of interior side 494.

Beveled raised edges 500 prevent the movement of weighted masses 440 to exert and force impact structures 454 and 456 to the release position in case bin 104 falls onto any of its sides but also function as chamfered edges for guiding weighted masses 440 during proper operation (when bin 104 is tilted upside down for example to first orientation). Accordingly, beveled raised edges 500 serve a dual function based on the state of retainer member 110.

When bin 104 falls onto any one of its sides in any direction and strikes the ground, the random and variable momentum generated by the fall is transferred to weighted masses 440, enabling weighted masses 440 to potentially move from hold position towards release position. However, raised edges 500 (functioning as an "obstacle") may potentially prevent (or obstruct) the random movement of weighted mass 440 towards the impact structures 454 and 456 and hence, prevent accidental movement of internal engagement member 436 from hold position to release position. First section 488 further includes a middle recess portion 504 that functions as a relief for accommodating or housing components of retainer member 110.

The illustrated projecting pair 506 in conjunction with guide-rails 558 provide a stable platform in which actuator member 438 moves deterministically to move internal engagement member 436 to release position. In particular, projecting pair 506 prevent actuator member 438 from lifting off of guide-rails 558 during movement of bin 104. The lifting of actuator member 438 off of the guide-rails 558 may potentially prevent internal engagement member 436 from moving to release position.

Additionally, preventing the actuator member 438 from lifting off the guide-rails 558, prevents the leading top edge 642 of U-shaped impact structures 454 and 456 from being blocked by beveled raised edges 500 of cover 202 during operation.

Further included in middle section 490 is a main opening 466 between the pair of projections 506 through which serrations 464 of internal engagement lever 436 is extended.

Further included in middle section 490 is a pair of runners 518 having a height that project from bottom surface of middle recess portion 504, extending in parallel to near projecting pair 506.

Runners 518 form inclined offset surfaces forming wedge guides, which taper down from projecting pair 506 (at the middle section 490), tapering down towards lower section 492 at bottom surface of middle recess portion 504 cover 202.

As further detailed below, a top surface 522 of a flange section 520 of U-shaped impact structures 454 and 456 of actuator assembly 438 is pushed down (towards base-plate 204) as it slides over runners 518 moving from hold to release positions.

A bottom end section edge 524 of third section 492 includes a notch 526 to drain water (drainage opening), the location and quantity of which may be varied.

FIGS. 7A and 7B are non-limiting, exemplary illustration of an external engagement lever of first engagement assembly in accordance with one or more embodiments of the present invention. As illustrated in FIGS. 1A to 7B, first engagement assembly 206 is comprised of an external engagement lever 410 having a pivot (point) end 320 that includes a pivot axel opening 322 that receives a pivot pin 242 for coupling with exterior side 472 of cover 202.

External engagement lever 410 further includes an operating end 566 that includes lateral extensions 568 with bottom surfaces 570 that function as limiters to prevent external engagement lever 410 from hold position, and further allows for insertion of user finger within space 574 to manually operate external engagement lever 410. It should be noted that alternatively, lateral extensions 568 may be optionally eliminated by raising a height of second limiters 282 and 284 to achieve the same resting level for the external engagement lever 410.

Limiters 570 also allow for alignment of an apex 248 of a cam portion 238 of external engagement lever 410 to maintain maximum compression force against adjusting member 112 at hold position.

The position of bottom surfaces 570 as a function of a height 576 of lateral extensions 568 determine insertion space 574 available for insertion of finger and optimal position of apex 248 of cam portion 238 when external engagement lever 410 is at hold position. The illustrated grooves 578 forming cam 238 are a mere result of manufacturing of external engagement lever 410, which allow for faster cooling of the end product. Grooves 578 may be easily eliminated by allowing for slower cooling of the end product during manufacture.

FIGS. 8A to 8D are non-limiting, exemplary illustrations of the various views of a base-plate of the retainer member of the retainer mechanism shown in FIGS. 1A to 7B in accordance with one or more embodiments the present invention.

As illustrated in FIGS. 1A to 8D, retainer member 110 is further comprised of base-plate 204. Base-plate 204 (just as cover 202) includes a first set of peripheral openings 530 (securing openings) for securing cover 202 onto base-plate 204, and a second set of peripheral openings 528 (installation openings) for installing retainer member 110 onto a bin 104. As with cover 202, location and count of installation or securing openings 528 or 530 may be varied.

Base plate 204 includes an interior facing side 532 (shown in FIGS. 8A to 8D) and an exterior facing side 534 (FIG. 4C). Interior facing side 532 of base plate 204 is comprised of a first section 536, a second section 538, and a third section 540.

First section 536 of interior facing side 532 of base plate 204 includes a pair of vertically elongated projections (or towers) 510 having a height 542 that extend generally parallel to each other from bottom surfaces 552 of interior facing side 532 of base plate 204.

Projections 510 include a top end 512 with indentations or recesses 508 for receiving laterally extending pivot ends 514 of fixed pivot section 516 of internal engagement lever 436.

Height 542 of projections or towers 510 is of sufficient span to house all components of second (or internal) engagement assembly 416 for appropriate operations. For example, it allows for pivoting of internal engagement member 436 from hold to release position prior to contacting with bottom surface 552 of base plate 204. Further, inner perimeter or wall 470 of cover 202 may abut against an outer surface 544 of towers 510.

As further illustrated, first section 536 further includes offset, lateral planar surfaces 546 forming raised lateral platforms 548 that have beveled raised edges 550 in relation to a bottom surface 552 of interior facing side 532.

Rear and lateral side edge 554 and 556 of raised lateral platforms 548 from vertical raised edges for alignment of cover 202 with base-plate 204. That is, inner perimeter wall 470 of cover 202 abuts against these raised side edges 554 and 556.

Beveled or slanted raised edges 550, which taper from raised platforms 548 to bottom surface 552 of base plate 204 prevent the movement of the weighted masses 440 to exert and force U-shaped impact structures 454 and 456 to the release position in case the bin 104 falls onto any of its sides but also function as chamfered edges for guiding weighted mass 440 during proper operation (when bin 104 is tilted upside down for example to first orientation). Accordingly, they serve a dual function based on the state (release or hold) of retainer member 110.

As with cover 202, when bin 104 falls onto any one of its sides in any direction and strikes the ground, the random and variable momentum generated by the fall is transferred to weighted masses 440, enabling weighted masses 440 to potentially move from hold position towards release position. However, raised edges 550 may potentially prevent (or obstruct) the random movement of weighted mass 440 towards the U-shaped impact structures 454 and 456 and hence, prevent accidental movement of the internal engagement member 436 from hold position to release position.

Second section 538 of interior facing side 532 of base-plate 204 includes an identical pair of horizontal guide-rails 558 having height 560 that project from bottom surface 552 of base plate 204 extending in parallel from third section 540 and ending at the foot of the corresponding pair of elongated projections 510.

Top surfaces 562 of guide-rails 558 function as rails for bushings that function as rollers R2 and R3, while exterior facing sides 564 of guide-rails 558 operate as guides to facilitate linear movement of alignment structure 580 of U-shaped impact structures 454 and 456.

Third section 540 of interior facing side 532 of base plate 204 includes a barrier structure 582 to block prying or tampering into retainer member 110 through base plate drainage opening 584 and cover drainage opening 526.

Further included are indexing projections 586 for indexing and alignment of cover 202 with base-plate 204. That is, inner perimeter wall 470 of cover 202 abuts against an outer surface 588 of the indexing projections 586. It should be noted that the "L" end is short to allow for free movement of the weighted mass 440. Alternatively, the indexing projection 586 may be eliminated and instead, during assembly, openings 528 and 530 may be used for indexing and alignment of cover 202 with base-plate 204. Moreover the "L" at the end of projections 586 may also be eliminated without loss of proper functionality.

FIGS. 9A to 9E are non-limiting, exemplary illustrations of the various views of an interior engagement member of the second engagement assembly in accordance with one or more embodiments the present invention. As illustrated in FIGS. 1A to 9E, second engagement assembly 416 is comprised of internal engagement member 436.

Second engagement assembly 416 further includes an actuator assembly 438 that moves internal engagement member 436, and also includes weighted mass 440 that upon impact with actuator assembly 438, moves actuator assembly 438, which, in turn, moves internal engagement assembly 416 to one or a hold or release position, depending on the orientation of bin 104.

Internal engagement member 436 is comprised of a fixed pivot section 516 and an engagement section 590. The fixed pivot section 516 of internal engagement member 436 includes laterally extending pivot ends (forming pivot axis) 514 that pivotally interlock with corresponding recesses 508 associated with an interior facing side 532 of base-plate 204, enabling internal engagement member 436 to operate as a lever and pivot about the laterally extending pivot ends 514 of fixed pivot section 516. Alternatively, extending pivot ends 514 may be replaced by a through-hole opening through which a pin may be inserted. It should be noted that extending pivot ends 514 are further secured in corresponding recesses 508 by cover 202.

Engagement section 590 of internal engagement member 436 includes a first (or top) side 592 (FIGS. 9A to 9D) for engagement and a second (or bottom) side 594 (FIG. 9E) for changing the position of internal engagement member 436.

First side 592 for engagement includes serrations 464 that interlock with corresponding serrations 462 of adjusting member 112. Further included are lateral inclined offset surfaces 596 forming lateral wedge plates, which are offset from top surface 598 of first side 592, and are at an incline (or slanted) angle Ω (FIG. 9C), tapering towards edge 600.

Second side 594 for changing the position of internal engagement member 436 includes a hold surface 602, a primary release surface 604, which is slanted (beveled) and tapering from hold surface 602 towards an optional secondary release surface (push plate) 606, which projects from second side 594. Further included are lateral slanted or beveled relief surfaces 608.

It should be noted that the overall width 610 of second side 594 of engagement section 590 of internal engagement member 436 is longer than length 612 (FIG. 10B) of roller R1 that is situated between rollers R2 and R3 and hence, overlapping a portion of R2 and R3 from top of rollers R2 and R3. It should be noted that the lengths of R1, R2, and R3 may be varied.

Lateral relief surfaces 608 are therefore slanted and tapered and function to accommodate and provide space ("relief") for movement of lateral bushings or rollers. In other words, the lateral relief surfaces 608 prevent second side 594 of internal engagement member 436 to contact and exert pressure on R2 and R3 from the top, which would cause friction, preventing rollers R2 and R3 from rolling freely.

FIGS. 10A to 10H are non-limiting, exemplary illustrations of the various views of an actuator of a second engagement assembly in accordance with one or more embodiments the present invention. As illustrated in FIGS. 1A to 10H, actuator assembly 438 of second engagement assembly 416 is comprised of a yoke like structure having a cross-bar 458 with a first and a second lateral ends 614 and 616, with a first U-shaped impact structure 454 connected to first lateral end 614 via a first collar 618 of first U-shaped impact structure 454, and a second U-shaped impact structure 456 connected to second lateral end 616 via a second collar 620 of second U-shaped impact structure 456. The U-shaped impact structures 454 and 456 are single piece units.

Cross-bar 458 friction fits or is pressed into collars 618 and 620 of first and second U-shaped impact structure 454 and 456. Cross-bar 458 will stay intact as there are no tensile forces acting on actuator assembly 438.

The two weighted masses 440 abut against inner surface of inner lateral sides 470 of cover 202 and inner surface 622 of first and second U-shaped impact structure 454 and 456. Accordingly, there is no room for first and second U-shaped impact structure 454 and 456 to disengage from cross-bar 458.

Optionally, cross-bar 458 may include first, second, and third independent bushings that function as rollers R1, R2, and R3. Method of assembly may include inserting first lateral end 614 of cross-bar 458 into first collar 618 of first U-shaped impact structure 454, mount the rollers R1, R2, and R3 from second lateral end 616 of cross-bar 458, and insert second lateral end 616 of cross-bar 458 into second collar 620 of second U-shaped impact structure 456.

Middle roller (first roller R1) on cross bar 458 underpins internal engagement member 436 (at hold surface 602) to maintain its hold or engagement state when in contact with hold surface 602 of the second side 594 of internal engagement member 436.

Lateral rollers R2 and R3 rest on and move along guide-rails 558 of base-plate 204 and hence, are "pushed up" from their respective bottom while supported on cross-bar 458 of actuator assembly 438. In other words, top sides of rollers R2 and R3 are free and experience no downward forces.

Roller R1 on the other hand, is "pushed down" by hold surface 602 of second side 594 of internal engagement member 436 while supported on cross-bar 458 of actuator assembly 438. In other words, internal engagement member 436 rests on roller R1; bottom side of roller R1 is not supported from the bottom and does not ride on any rails—it experiences no upward forces. Roller R1 mainly is supported by cross-bar 458. Accordingly, rollers R2 and R3 experience an "upward" force due to guide-rails 558 while R1 experiences a "downward" force due to hold surface 602. Given that all rollers R1, R2, and R3 experience a unidirectional force, they are much freer to roll thus substantially eliminating friction compared to a scenario (detailed below) if all rollers were sandwiched between an upward and downward forces.

First and the second U-shaped impact structures 454 and 456 are comprised of a flange section 520 cantilevered on a spacer (or step) 624, which, in turn, is mounted on top side 626 of U-shaped impact structures 454 and 456, and an alignment structure 580 that is projected from bottom side 628 of U-shaped impact structures 454 and 456.

Alignment structure 580 in combination with guide-rails 558 of base plate 204 prevent in-plane rotation (e.g., twisting) of actuator assembly 438. Inner curved corners 630 of the U-shaped impact structures 546 and 458 provide added structural integrity in terms of strength.

There may be instances when bushings (e.g., rollers) strike optional push tab 606 of internal engagement member 436, where the impact from the strike does not translate into sufficient strength to move internal engagement member 436 to release position. Therefore, flange sections 520 of U-shaped impact structures 454 and 456 moving with actuator assembly 438 move towards and over first side 592 of internal engagement member 436, sliding or riding over and pressing down lateral wedge plates 596 that are slanted or inclined tapering to distal ends 600 thereof.

Slanted lateral wedge plates 596 taper from near serrations 464 towards the distal end 600 of internal engagement member 436. As flange section 520 continues to move over lateral wedge plates 596 towards serrations 464 of internal engagement member 436, bottom side 632 of flange sections 520 strike the inclined surfaces of the plates 596, forcing internal engagement member 436 to pivot at its pivot axes 514 and move to disengagement or release position. The wedge configuration when contacting bottom surface 632 of flange sections 520 enables internal engagement member 436 to move to release position.

Figure 10A:
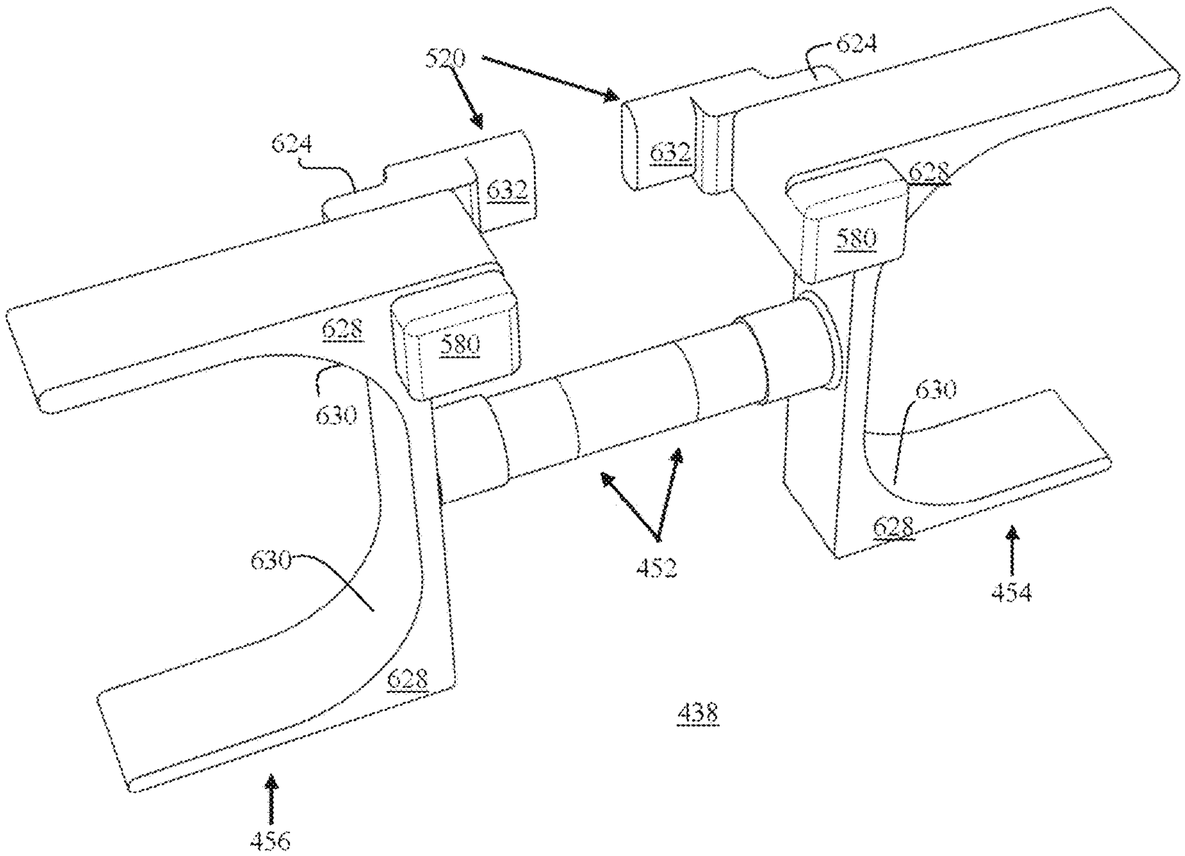
FIGS. 10A to 10H are non-limiting, exemplary illustrations of the various views of an actuator of a second engagement assembly in accordance with one or more embodiments the present invention.
Figure 10B:
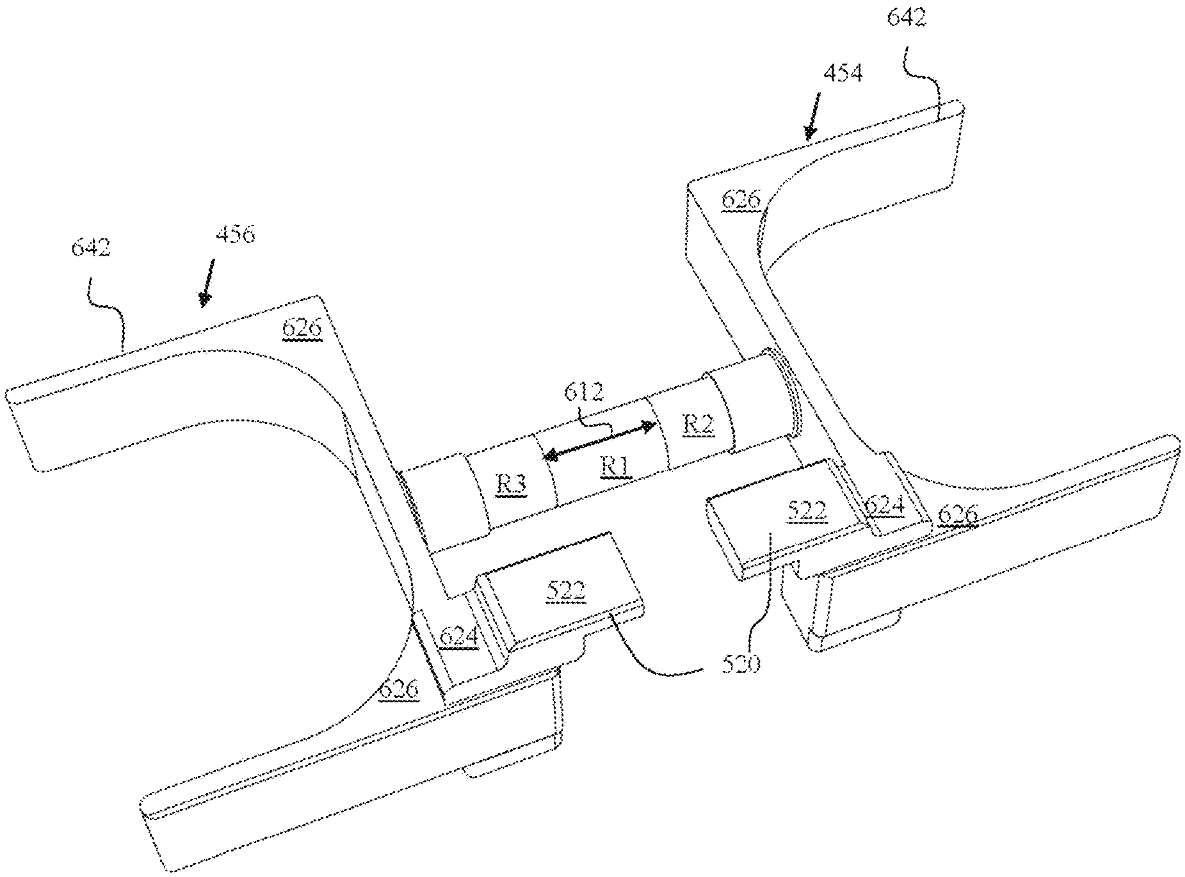
Figure 10C:
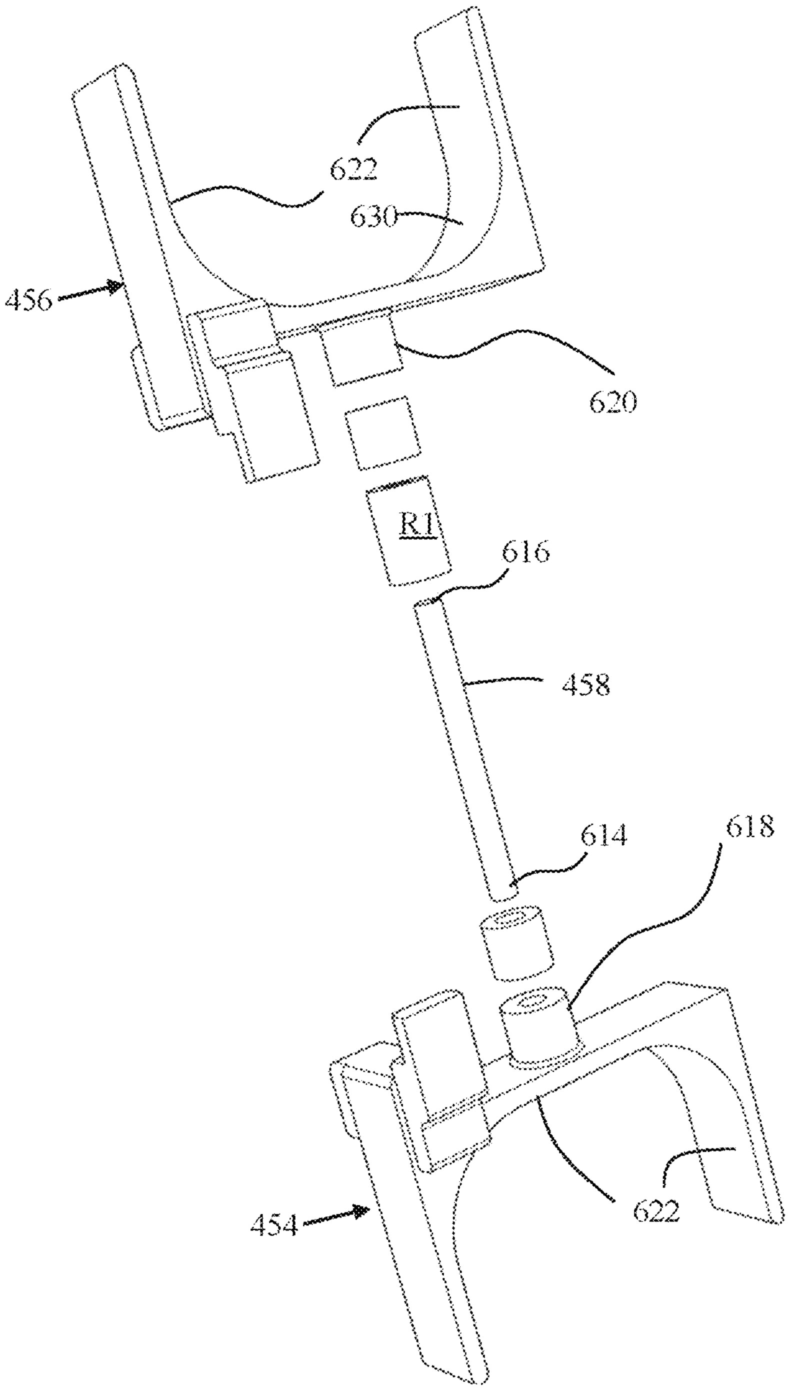
Figure 10D:
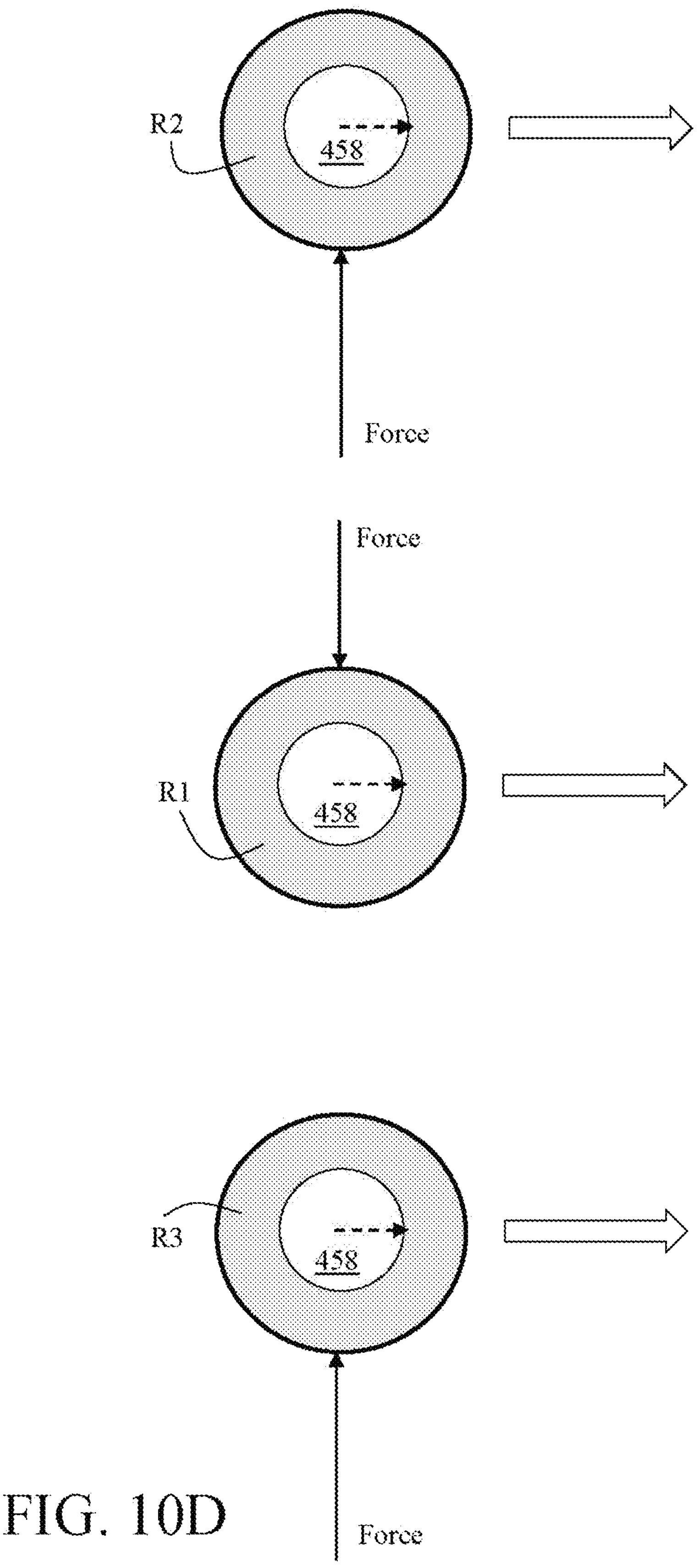

As best illustrated in FIG. 10D, use of three independent rollers reduce friction. Rollers R2 and R3 will independently experience the second forces (upward), and roller R1 will independently experience the first force (downward).

All rollers will be able to roll independently without being pressured or squeezed from both forces at the same time. That is, the translational motion of cross-bar 458 is actually facilitated by the rotational motion of the mounted rollers and thus, significantly reducing friction and hence, requiring a much lighter and smaller sized weighted mass 440 to move actuator assembly 438. This lighter and smaller sized weight 440 advantageously reduces manufacturing, material, and shipping costs and the overall unit ends up with a smaller form factor.

Figure 10E:
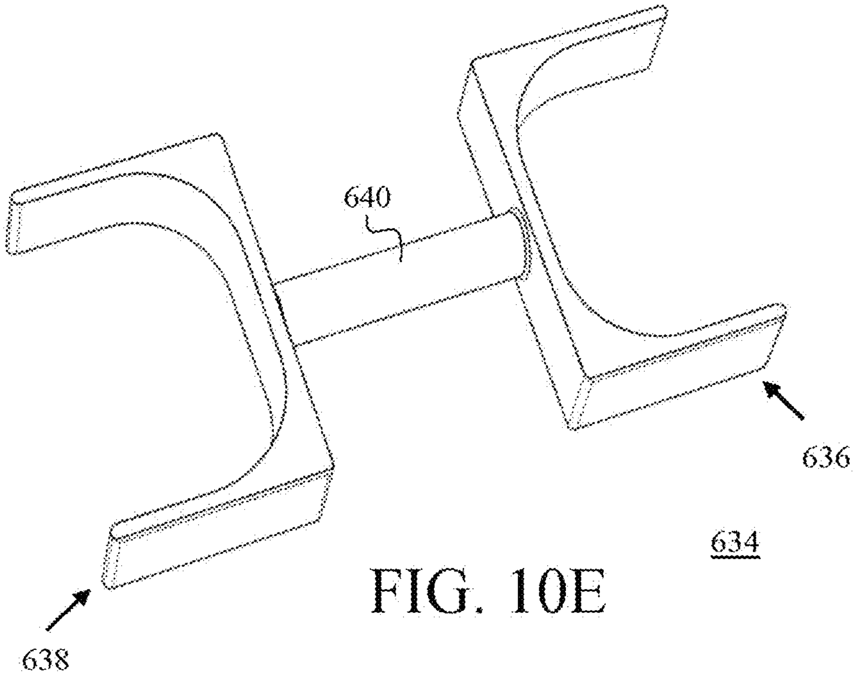
Figure 10F:
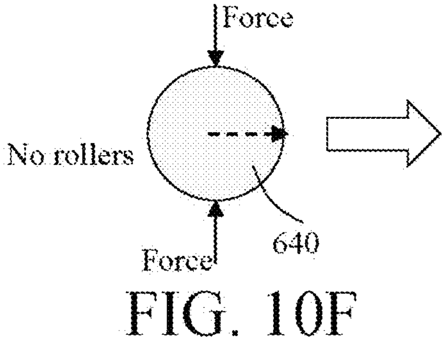

As further illustrated in FIGS. 10E and 10F, actuator assembly 634 of second engagement assembly 416 may comprised of a single integral piece yoke like structure having a cross-bar 640, with U-shaped impact structures 636 and 638 integral with cross-bar 640.

As shown in FIG. 10F, in the no rollers scenario, both downward force (from internal engagement member 436) and upward force (from guide rails 558) are directly exerted onto cross-bar 640. This generates unwanted friction, requiring a much greater weight mass to overcome the opposing forces experienced by cross-bar 640 in order to move actuator assembly 438 to a release position.

It should be noted that cross-bar 640 always has a translational (generally rectilinear) motion and not rotation. That is, cross-bar 640 slides only. In the scenario of using a single continuous, elongated roller, the forces experienced and translational motion would be the same as having no rollers.

The single, continuous, elongated roller will also experience the same opposite forces as cross-bar 458 with no rollers. The single continuous elongated roller would be prevented from having rotational motion and hence, will move translationally with cross-bar 458. The roller would simply slide rather than roll.

Figure 10G:
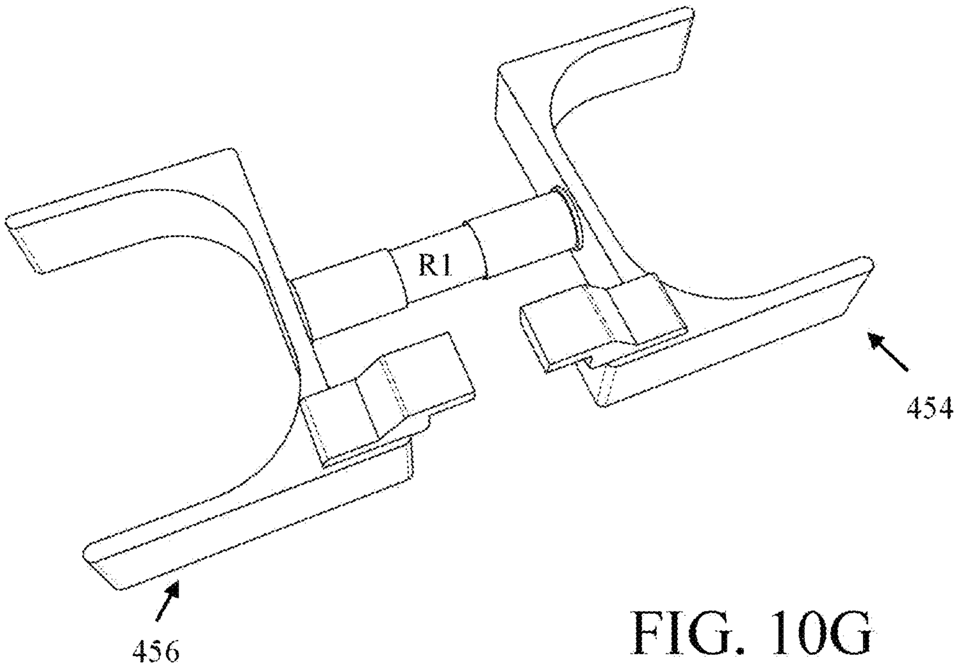
Figure 10H:
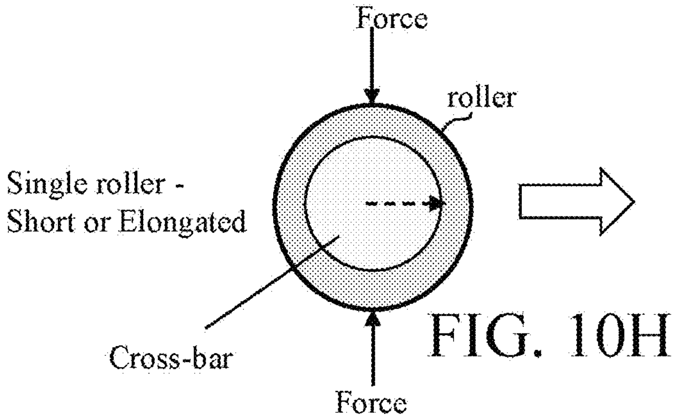

FIGS. 10G and 10H showcase for a single short roller (R1). Here, instead of rollers R2 and R3 experiencing the second (upwards) forces, it would be the collars 618 and 620 of U-shaped impact structures 454 and 456 that would be sliding on guide-rails 458 (assuming collars 618 and 620 are extended to meet lateral sides of the R1). Without collars 618 and 620 extended onto rail guides 458, the U-shaped impact structures 454 and 456 would rest on bottom base of the base plate 204, adding even more friction. R1 will also experience downward force first force, but with no significant reduction in overall friction as collars 618 and 620 would move once forces overcome their respective frictional hold. Accordingly, the embodiment illustrated and described in FIGS. 10A to 10D is preferred.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A retainer mechanism, comprising:

a first engagement assembly that is configured to be actively moved to a hold state of the first engagement assembly and is configured to be actively moved to a release state of the first engagement assembly; and a second engagement assembly that is configured to be passively moved to a hold or a release state of the second engagement assembly;

wherein: first engagement assembly operations and second engagement assembly operations are unconditionally independent of each other and wherein: the first engagement assembly is external to a retainer member; and the second engagement assembly is internal to the retainer member, with a section of the second engagement assembly extending out of an opening of the retainer member.

2. The retainer mechanism as set forth in claim 1, wherein:

the second engagement assembly is configured to be passively moved to the release state of the second engagement assembly when the retainer mechanism is moved to a first orientation.

3. The retainer mechanism as set forth in claim 1, wherein:

the second engagement assembly is configured to be passively moved to the hold state of the second engagement assembly when the retainer mechanism is moved to a second orientation.

4. The retainer mechanism as set forth in claim 1, wherein:

the second engagement assembly is configured to remain at the hold state of the second engagement assembly when the retainer mechanism is at a second orientation.

5. The retainer mechanism as set forth in claim 1, wherein:

the second engagement assembly is configured to remain at the hold state of the second engagement assembly when the retainer mechanism is at an orientation other than a first orientation.

6. The retainer mechanism as set forth in claim 1, wherein:

the first engagement assembly is configured to remain at the hold state of the first engagement assembly, independent of an orientation of the retainer mechanism.

7. The retainer mechanism as set forth in claim 1, wherein:

the second engagement assembly is passively moved to the release state of the second engagement assembly when the retainer mechanism is at a first orientation, and is passively moved to the hold state of the second engagement assembly when the retainer mechanism is at a second orientation.

8. The retainer mechanism as set forth in claim 1, wherein:

the movement of the second engagement assembly is independent of the hold or release states of the first engagement assembly; and the movement of the first engagement assembly is independent of the hold or release states of the second engagement assembly.

9. The retainer mechanism as set forth in claim 1, wherein:

the first engagement assembly is configured to remain at the hold state of the first engagement assembly, and the second engagement assembly is configured to be passively moved to the release state of the second engagement assembly when the retainer mechanism is moved to a first orientation only.

10. The retainer mechanism as set forth in claim 1, wherein:

the first engagement assembly is configured to remain at the hold state of the first engagement assembly, and the second engagement assembly is configured to remain at the hold state of the second engagement assembly when the retainer mechanism is at a second orientation.

11. The retainer mechanism as set forth in claim 1, wherein:

the first engagement assembly is configured to remain at hold state of the first engagement assembly, and the second engagement assembly is configured to remain at hold state of the second engagement assembly when the retainer mechanism is at an orientation other than a first orientation.

12. A retainer mechanism, comprising:

an adjusting member;

a first engagement assembly that is configured to be actively moved to a hold position to engage with and to hold the adjusting member and is configured to be actively moved to a release position to disengage from and to release the adjusting member; and a second engagement assembly that is configured to be passively moved to a hold position to engage with and to hold the adjusting member and is configured to be passively moved to a release position to disengage from and to release the adjusting member;

wherein: first engagement assembly operations and second engagement assembly operations are unconditionally independent of each other and wherein: the first engagement assembly is external to a retainer member; and the second engagement assembly is internal to the retainer member, with a section of the second engagement assembly extending out of an opening of the retainer member.

13. The retainer mechanism as set forth in claim 12, wherein:

the second engagement assembly is configured to be passively moved to the release position to release the adjusting member when the retainer mechanism is moved to a first orientation only.

14. The retainer mechanism as set forth in claim 12, wherein:

the second engagement assembly is configured to remain at the hold position when the retainer mechanism is moved to an orientation other than a first orientation.

15. The retainer mechanism as set forth in claim 12, wherein:

the first engagement assembly is configured to remain at the hold position, independent of an orientation of the retainer mechanism.

16. The retainer mechanism as set forth in claim 12, wherein:

the second engagement assembly is passively moved to the release position when the retainer mechanism is moved to a first orientation.

17. The retainer mechanism as set forth in claim 12, wherein:

the second engagement assembly is passively moved to the hold position when the retainer mechanism is at a second orientation.

18. The retainer mechanism as set forth in claim 12, wherein:

the second engagement assembly remains at the hold position when the retainer mechanism is at an orientation other than a first orientation.

19. The retainer mechanism as set forth in claim 12, wherein:

the second engagement assembly is passively moved to the release position when the retainer mechanism is at a first orientation, and is passively moved to the hold position when the retainer mechanism is at a second orientation.

20. The retainer mechanism as set forth in claim 12, wherein:

the movement of the second engagement assembly is independent of the hold or release position of the first engagement assembly.

21. The retainer mechanism as set forth in claim 12, wherein:

the second engagement assembly is configured to be passively moved to the release position to release the adjusting member when the retainer mechanism is moved to a first orientation.

22. The retainer mechanism as set forth in claim 12, wherein:

the first engagement assembly is configured to remain at the hold position, and the second engagement assembly is configured to be passively moved to the release position when the retainer mechanism is moved to a first orientation only.

23. The retainer mechanism as set forth in claim 12, wherein:

the first engagement assembly is configured to remain at the hold position, and the second engagement assembly is configured to remain at the hold position when the retainer mechanism is at an orientation other than a first orientation.

24. A retainer mechanism, comprising:

a retainer member having:

a first engagement assembly that is configured to be actively moved to a hold position to engage with and to hold an adjusting member and is configured to be actively moved to a release position to disengage from and to release the adjusting member; and a second engagement assembly that is configured to be passively moved to a hold position to engage with and to hold the adjusting member and is configured to be passively moved to a release position to disengage from and to release the adjusting member;

wherein: first engagement assembly operations and second engagement assembly operations are unconditionally independent of each other and wherein: the first engagement assembly is external to the retainer member; and the second engagement assembly is internal to the retainer member, with a section of the second engagement assembly extending out of an opening of the retainer member.

25. The retainer mechanism as set forth in claim 24, wherein:

the second engagement assembly is configured to be passively moved to the release position to release the adjusting member when the retainer member is moved to a first orientation only.

26. The retainer mechanism as set forth in claim 24, wherein:

the second engagement assembly is configured to remain at the hold position when the retainer member is moved to an orientation other than a first orientation.

27. The retainer mechanism as set forth in claim 24, wherein:

the first engagement assembly is configured to remain at the hold position, independent of an orientation of the retainer member.

28. The retainer mechanism as set forth in claim 24, wherein:

the second engagement assembly is passively moved to the release position when the retainer member is moved to a first orientation.

29. The retainer mechanism as set forth in claim 24, wherein:

the second engagement assembly is passively moved to the hold position when the retainer member is moved to a second orientation.

30. The retainer mechanism as set forth in claim 24, wherein:

the second engagement assembly is passively moved to the release position when the retainer member is at a first orientation, and is passively moved to the hold position when the retainer member is at a second orientation.

31. The retainer mechanism as set forth in claim 24, wherein:

the movement of the second engagement assembly is independent of the hold or release positions of the first engagement assembly; and the movement of the first engagement assembly is independent of the hold or release positions of the second engagement assembly.

32. The retainer mechanism as set forth in claim 24, wherein:

the second engagement assembly is configured to be passively moved to the release position to release the adjusting member when the retainer member is moved to a first orientation.

33. The retainer mechanism as set forth in claim 24, wherein:

the first engagement assembly is configured to remain at the hold position, and the second engagement assembly is configured to be passively moved to the release position when the retainer member is moved to a first orientation only.

34. The retainer mechanism as set forth in claim 24, wherein:

the first engagement assembly is configured to remain at the hold position, and the second engagement assembly is configured to remain at the hold position when the retainer member is at an orientation other than a first orientation.

35. A retainer mechanism, comprising:

a retainer member; and an adjusting member associated with the retainer member;

the retainer member accommodates a first engagement assembly and a second engagement assembly;

the first engagement assembly is configured to be actively moved to a hold position to engage with and to hold the adjusting member and is configured to be actively moved to a release position to disengage from and to release the adjusting member; and the second engagement assembly is configured to be passively moved to a hold position to engage with and to hold the adjusting member and is configured to be passively moved to a release position to disengage from and to release the adjusting member;

wherein: first engagement assembly operations and second engagement assembly operations are unconditionally independent of each other and wherein: the first engagement assembly is external to the retainer member; and the second engagement assembly is internal to the retainer member, with a section of the second engagement assembly extending out of an opening of the retainer member.

36. The retainer mechanism as set forth in claim 35, wherein:

the adjusting member is positioned between the first engagement assembly and the second engagement assembly.

37. The retainer mechanism as set forth in claim 35, wherein:

the first engagement assembly is operative on a first side of the adjusting member, and the second engagement member is operative on a second side of the adjusting member.

38. The retainer mechanism as set forth in claim 35, wherein:

the first engagement assembly includes:

an external engagement member that includes an external engagement lever having a pivot end with a protruded portion that functions as a cam configured to make a sliding contact with the adjusting member.

39. The retainer mechanism as set forth in claim 35, wherein:

the second engagement assembly is comprised of:

an internal engagement member;

an actuator that moves the internal engagement member; and a weighted mass that upon impact with the actuator, moves the actuator, which, in turn, moves the internal engagement member.

40. The retainer mechanism as set forth in claim 39, wherein:

the internal engagement member is comprised of:

a pivot section; and an engagement section.

41. The retainer mechanism as set forth in claim 40, wherein:

the engagement section of the internal engagement member has a first side that includes serrations that interlock with corresponding serrations of the adjusting member.

42. The retainer mechanism as set forth in claim 40, wherein;

the engagement section of the internal engagement member has a first side that includes lateral inclined offset surfaces forming lateral wedge plates, which are offset from a top surface of the first side at an angle, forming tapered and sloping lateral plates.

43. The retainer mechanism as set forth in claim 40, wherein:

the engagement section of the internal engagement member has a second side that includes:

a hold surface;

a primary release surface;

a secondary release surface; and lateral relief surfaces.

44. The retainer mechanism as set forth in claim 39, wherein:

the actuator of the second engagement assembly is comprised of an impact absorbing structure.

45. The retainer mechanism as set forth in claim 35, wherein:

when the retainer member is at a first orientation:

the first engagement assembly is in one of the hold or the release position; and the second engagement assembly is in the release position.

46. The retainer mechanism as set forth in claim 35, wherein:

when the retainer member is at an orientation other than a first orientation:

the first engagement assembly is in one of the hold or the release position; and the second engagement assembly is in the hold position.

47. The retainer mechanism as set forth in claim 35, wherein;

the retainer member is comprised of a mounting support assembly having:

a base-plate; and a cover.

48. A retainer mechanism, comprising:

a retainer member having:

an external engagement assembly that is actively moved to a hold state to engage with and to hold an adjusting member and is actively moved to a release state to disengage from and to release the adjusting member;

an internal engagement assembly that is passively moved to a release state to disengage from and to release the adjusting member when the retainer member is moved to a first orientation, independent of the status of the states of the external engagement assembly;

wherein: external engagement assembly operations and internal engagement assembly operations are unconditionally independent of each other and wherein: a section of the internal engagement assembly extends out of an opening of the retainer member.

49. A retainer mechanism, comprising:

an external engagement assembly that is actively moved to a hold position to engage with and to hold an adjusting member and is actively moved to a release position to disengage from and to release the adjusting member;

the external engagement assembly is securely locked by an external lock mechanism in the hold position to hold the adjusting member; and an internal engagement assembly that is passively moved to a release position to disengage from and to release the adjusting member when the retainer mechanism is tilted to a first orientation, independent of a lock status of the external engagement assembly;

wherein: external engagement assembly operations and internal engagement assembly operations are unconditionally independent of each other and wherein: a section of the internal engagement assembly extends out of an opening of a retainer member.

50. A retainer mechanism, comprising:

a retainer member; and an adjusting member associated with the retainer member;

the retainer member includes:

an external engagement assembly that is actively moved to a hold position to engage with and to hold the adjusting member and is actively moved to a release position to disengage from and to release the adjusting member;

an internal engagement assembly that is passively moved to a hold position to engage with and to hold the adjusting member and is actively moved to a release position to disengage from and to release the adjusting member, independent of the external engagement assembly;

wherein: the retainer member passively releases the adjusting member when the retainer member is tilted to a first orientation, independent of the external engagement assembly;

wherein: external engagement assembly operations and internal engagement assembly operations are unconditionally independent of each other and wherein: a section of the internal engagement assembly extends out of an opening of the retainer member.

* * * * *